United States Patent [19]
Ozawa

[11] Patent Number: 5,524,048
[45] Date of Patent: Jun. 4, 1996

[54] TELEPHONE EXCHANGE APPARATUS WITH FACSIMILE BROADCASTING FACILITY, AND FACSIMILE DATA BROADCASTING APPARATUS

[75] Inventor: Isamu Ozawa, Hachioji, Japan

[73] Assignee: Canon Kabushiki Kaisha, Tokyo, Japan

[21] Appl. No.: 63,934

[22] Filed: May 19, 1993

[30] Foreign Application Priority Data

May 20, 1992 [JP] Japan ................................. 4-152972

[51] Int. Cl.⁶ ............................................... H04M 11/00
[52] U.S. Cl. ............................. 379/100; 379/93; 379/94; 379/98
[58] Field of Search ................................. 379/100, 93, 94, 379/98, 97; 375/7, 8; 358/400, 405, 434, 435, 468, 402, 470; 371/32; 370/66, 58.1, 58.2, 58.3, 122, 67; 455/5.1

[56] References Cited

U.S. PATENT DOCUMENTS

| | | | |
|---|---|---|---|
| 4,589,111 | 5/1986 | Adachi | 371/32 |
| 4,760,458 | 7/1988 | Watanabe et al. | 358/470 |
| 4,785,355 | 11/1988 | Matsumoto | 358/257 |
| 4,998,249 | 3/1991 | Bennett et al. | 370/67 |
| 5,027,400 | 6/1991 | Baji et al. | 455/5.1 |
| 5,159,465 | 10/1992 | Maemura et al. | 358/405 |
| 5,170,266 | 12/1992 | Marsh et al. | 379/100 |
| 5,185,784 | 2/1993 | Nashimoto | 379/100 |
| 5,189,525 | 2/1993 | Kotani | 358/407 |
| 5,257,112 | 10/1993 | Okada | 358/402 |

Primary Examiner—Jason Chan
Attorney, Agent, or Firm—Fitzpatrick, Cella, Harper & Scinto

[57] ABSTRACT

In a telephone exchange apparatus or a facsimile data broadcasting apparatus incorporating facsimile communication facility for broadcasting image data to a plurality of facsimile apparatuses, image data is concurrently broadcasted by sharing a single facsimile modem. In this case, the apparatus has (1) an arrangement wherein transmission of image data is assigned to the facsimile modem, and transmission/reception of control signals is assigned to a plurality of V.21 modems corresponding in number to facsimile apparatuses as broadcasting destinations, (2) an arrangement wherein transmission of image data and control signals is assigned to the facsimile modem, and reception of control signals is assigned to a plurality of V.21 demodulators corresponding in number to facsimile apparatuses as broadcasting destinations, and (3) an arrangement wherein transmission of image data and control signals is assigned to the facsimile modem, and reception of control signals is assigned to a plurality of V.21 demodulators fewer than the facsimile apparatuses as broadcasting destinations by adding a V.21 demodulator switching facility.

35 Claims, 50 Drawing Sheets

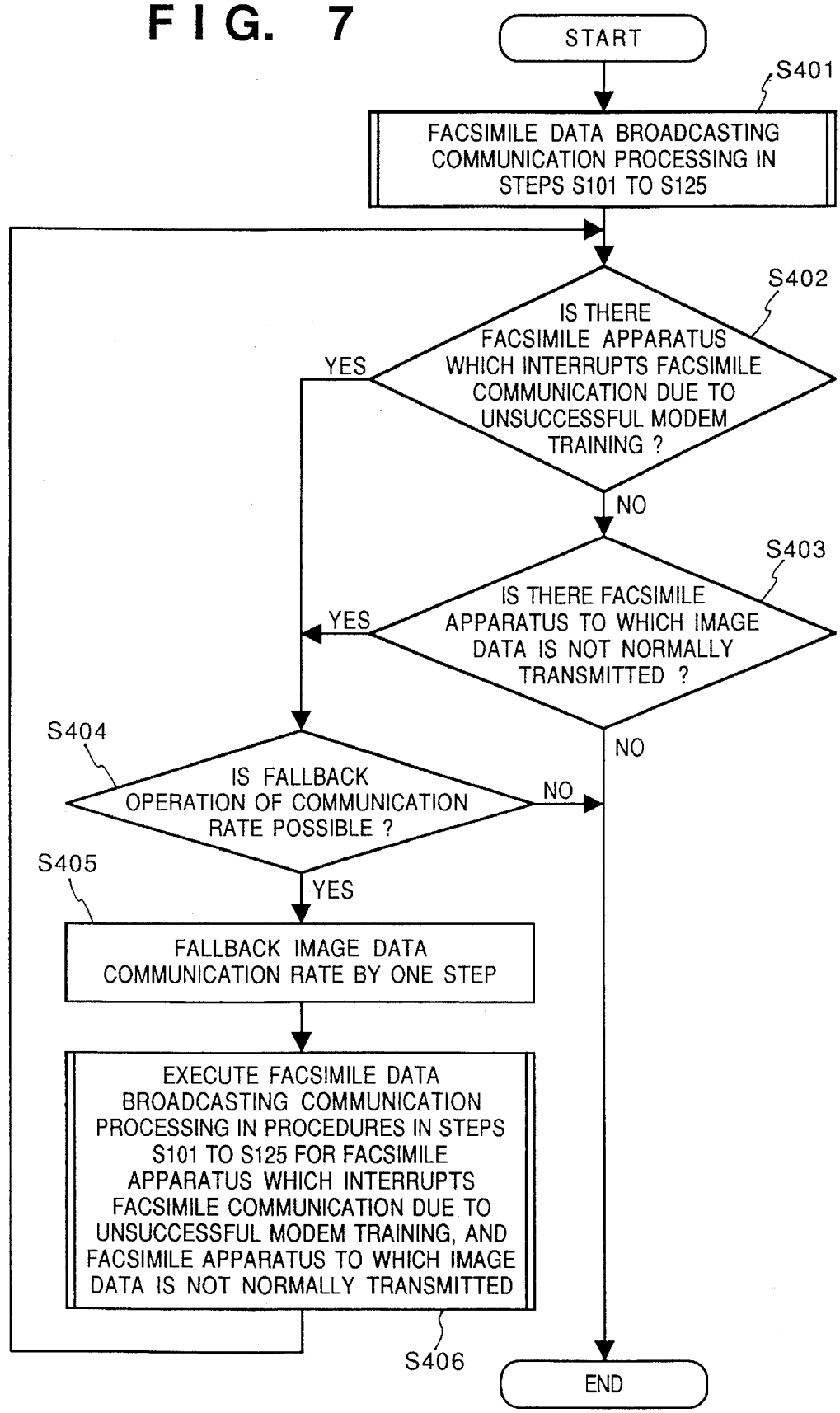

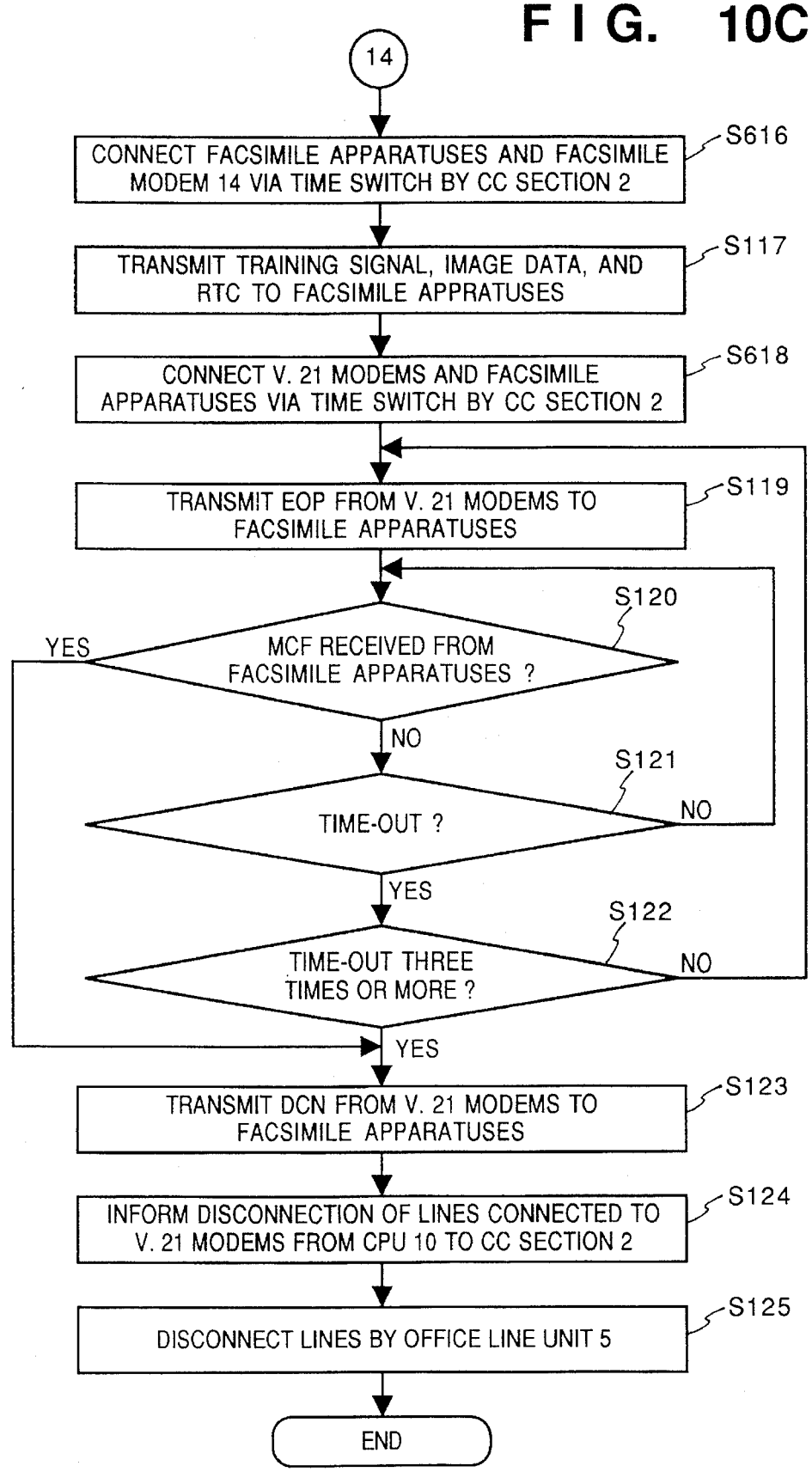

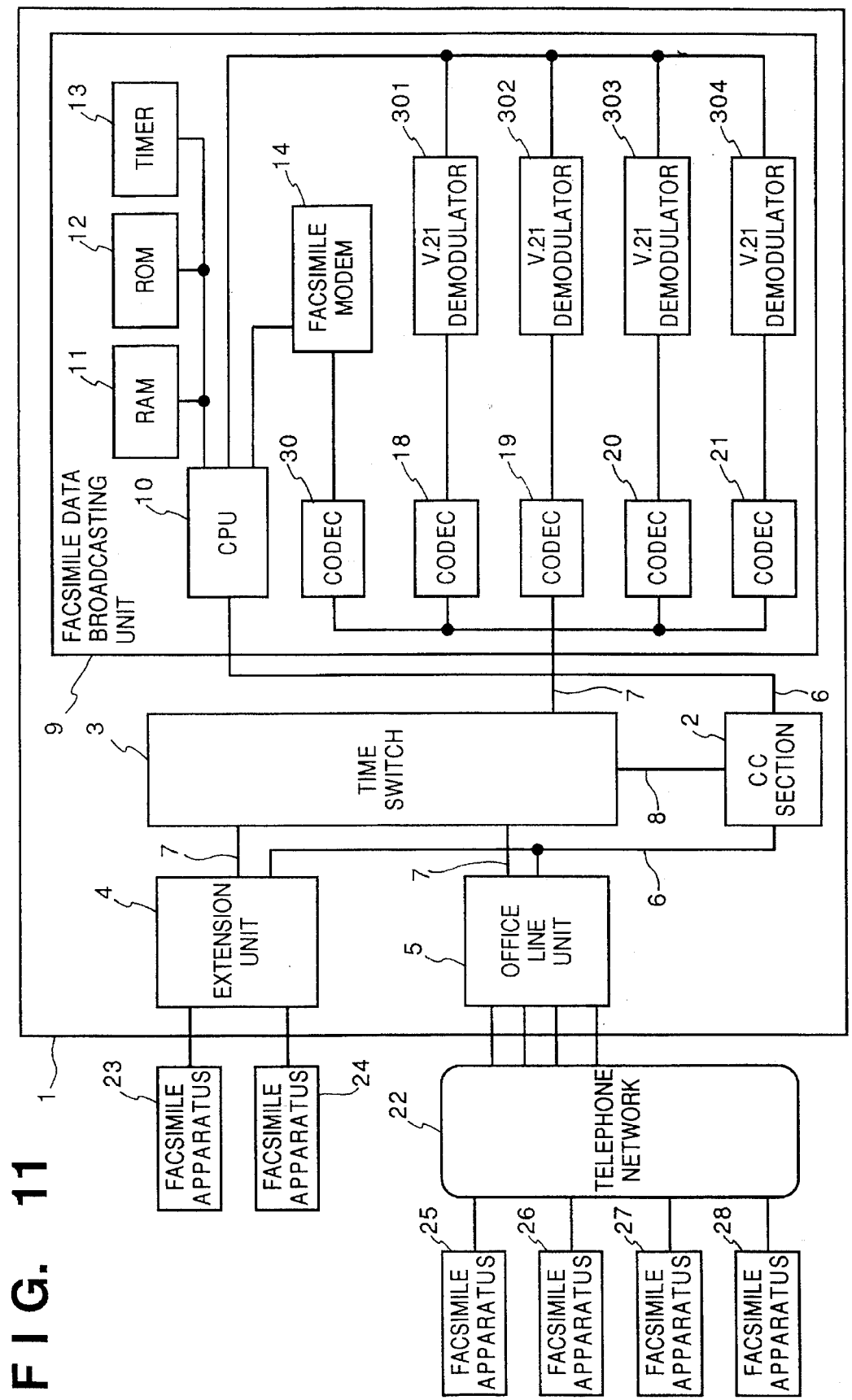

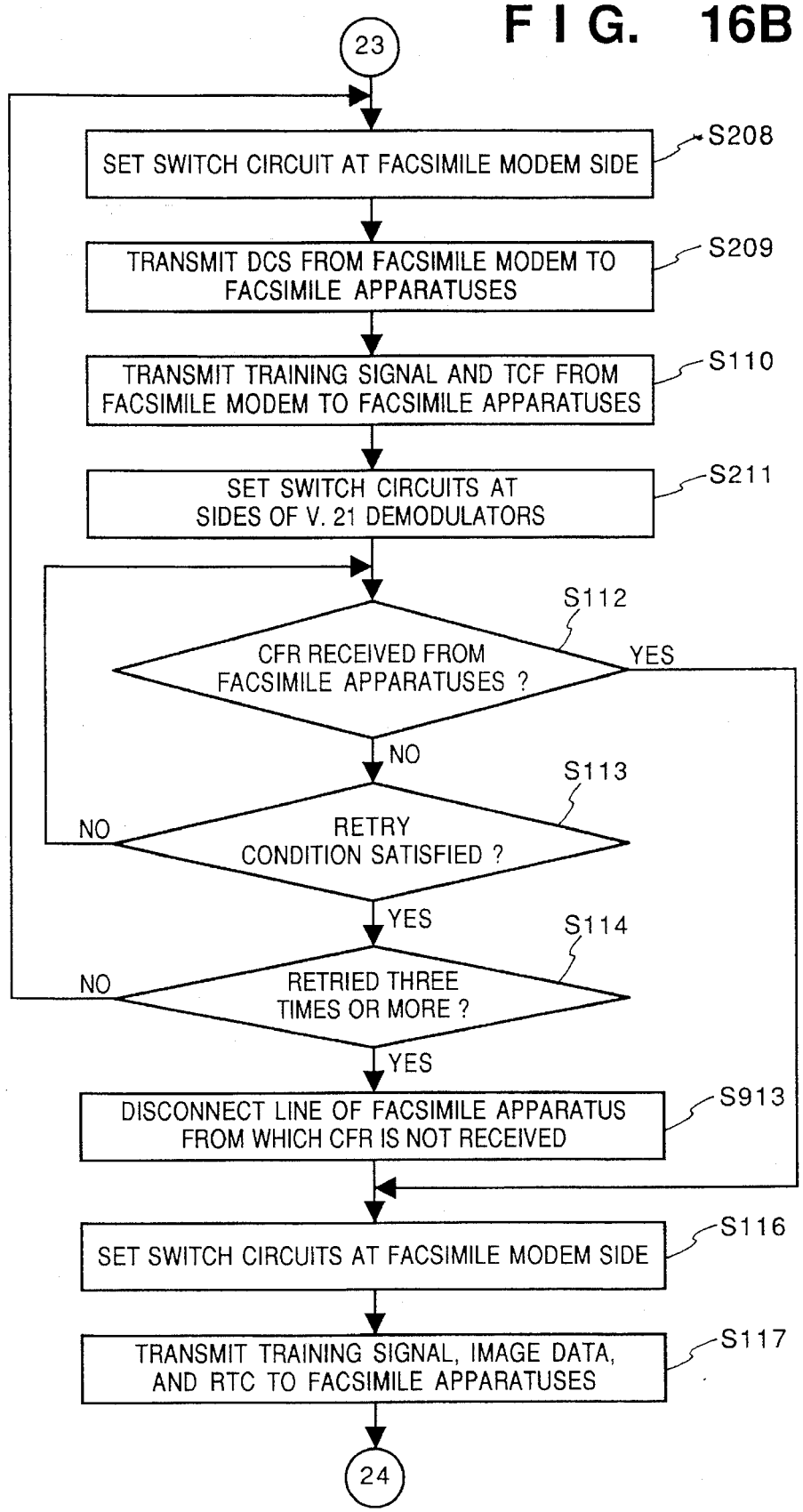

TELEPHONE EXCHANGE APPARATUS WITH FACSIMILE BROADCASTING FACILITY, AND FACSIMILE DATA BROADCASTING APPARATUS

BACKGROUND OF THE INVENTION

This invention relates to a telephone exchange apparatus with a facsimile data broadcasting facility and a facsimile data broadcasting apparatus and, particularly, to a telephone exchange apparatus with a facsimile data broadcasting facility and a facsimile data broadcasting apparatus, which can concurrently broadcast image data to a plurality of destinations.

Conventionally, in, e.g., an office equipped with a telephone exchanger, when image data is to be broadcasted to a plurality of facsimile apparatuses, a system constituted by a telephone exchanger 914 and a facsimile data broadcasting apparatus 901, as shown in, e.g., FIG. 22, is used.

In FIG. 22, reference numeral 901 denotes a facsimile data broadcasting apparatus; 902, a CPU for controlling the facsimile data broadcasting apparatus 901; 903, a RAM for storing image data; 904, a ROM for storing a control program to be executed by the CPU 902; 905, a timer used in, e.g., protocol control for a facsimile communication; 906 to 909, modems for a facsimile communication (to be referred to as facsimile modems hereinafter); 910 to 913, office line interfaces for executing network control under the control of the CPU 902 to connect the modems to an extension unit; 914, a telephone exchanger; 915, an office line unit, included in the telephone exchanger 914, for connection with a telephone network; 916, an extension unit, included in the telephone exchanger 914, for connection with, e.g., extension telephone sets; 917, a telephone network for achieving telephone exchange control; 918 and 919, facsimile apparatuses connected to the extension unit 916 of the telephone exchanger 914; and 920 to 923, facsimile apparatuses connected to the telephone network 917.

A case will be examined below wherein image data output from the facsimile apparatus 918 is broadcasted to the facsimile apparatuses 920 to 923 via the facsimile data broadcasting apparatus 901.

Image data is transmitted from the facsimile apparatus 918 to the facsimile data broadcasting apparatus 901 via the telephone exchanger 914, is received via, e.g., the office line interface 910 and the facsimile modem 906, and is stored in the RAM 903 as image data to be broadcasted.

A case will be described below wherein the stored image data is concurrently broadcasted to the facsimile apparatuses 920 to 923.

The CPU 902 of the facsimile data broadcasting apparatus 901 controls the office line interfaces 910 to 913 to generate calls to the facsimile apparatuses 920 to 923, respectively. The telephone exchanger 914 generates calls to the facsimile apparatuses 920 to 923 from the office line unit 915 to the telephone network 917 on the basis of call generation requests from the extension unit 916. As a result, the office line interface 910 is connected to the facsimile apparatus 920 via the telephone exchanger 914 and the telephone network 917. Similarly, the office line interface 911 is connected to the facsimile apparatus 921, the office line interface 912 is connected to the facsimile apparatus 922, and the office line interface 913 is connected to the facsimile apparatus 923.

According to responses from the facsimile apparatuses, the CPU 902 transmits the image data to be broadcasted stored in the RAM 903 to the facsimile apparatuses via the facsimile modems 906 to 909. Facsimile apparatuses as broadcasting destinations are not limited to ones connected to the telephone network 917, but may be, e.g., the facsimile apparatus 919 and the like connected to the extension unit 916 of the telephone exchanger 914.

Image data can also be concurrently broadcasted to a plurality of facsimile apparatuses using a system having an arrangement shown in FIG. 23. Although constituting elements of the system shown in FIG. 23 are the same as those in FIG. 22, the office line interfaces 910 to 913 of the facsimile data broadcasting apparatus 901 are not connected to the telephone exchanger 914, but are directly connected to the telephone network 917 in the system shown in FIG. 23.

In this system, when image data from the facsimile apparatus 918 is to be broadcasted to the facsimile apparatuses 920 to 923 via the facsimile data broadcasting apparatus 901, image data transmitted from the facsimile apparatus 918 is transmitted to the facsimile data broadcasting apparatus 901 via the telephone exchanger 914 and the telephone network 917. The facsimile data broadcasting apparatus 901 receives this image data via, e.g., the office line interface 910 and the facsimile modem 906, and stores it in the RAM 903.

A case will be described below wherein the stored image data is concurrently broadcasted to the facsimile apparatuses 920 to 923.

The CPU 902 controls the office line interfaces 910 to 913 to generate calls to the facsimile apparatuses 920 to 923, respectively. As a result, the office line interface 910 is connected to the facsimile apparatus 920 via the telephone network 917. Similarly, the office line interface 911 is connected to the facsimile apparatus 921, the office line interface 912 is connected to the facsimile apparatus 922, and the office line interface 913 is connected to the facsimile apparatus 923. Thereafter, the CPU 902 transmits the image data stored in the RAM 903 to the facsimile apparatuses via the facsimile modems 906 to 909 according to responses from the facsimile apparatuses. Note that facsimile apparatuses as broadcasting destinations are not limited to ones connected to the telephone network 917, but may be, e.g., the facsimile apparatus 919 and the like connected to the extension unit 916 of the telephone exchanger 914. In this case, image data is broadcasted via the telephone network 917 and the telephone exchanger 914.

Furthermore, one facsimile apparatus connected to the telephone network 917 can broadcast image data to other facsimile apparatuses connected to the telephone network 917 via the facsimile data broadcasting apparatus 901.

For example, a case will be examined below wherein a facsimile apparatus 924 broadcasts image data to the facsimile apparatuses 920 to 923 via the facsimile data broadcasting apparatus 901. In this case, image data is transmitted from the facsimile apparatus 924 to the facsimile data broadcasting apparatus 901 via the telephone network 917. The image data received by the facsimile data broadcasting apparatus 901 is stored in the RAM 903 via, e.g., the office line interface 910 and the facsimile modem 906 under the control of the CPU 902.

Then, the stored image data is concurrently broadcasted from the facsimile data broadcasting apparatus 901 to the facsimile apparatuses 920 to 923. The CPU 902 controls the office line interfaces 910 to 913 to generate calls to the facsimile apparatuses 920 to 923, respectively. With this control, the office line interface 910 is connected to the facsimile apparatus 920, the office line interface 911 is connected to the facsimile apparatus 921, the office line interface 912 is connected to the facsimile apparatus 922, and the office line interface 913 is connected to the facsimile apparatus 923. According to responses from the facsimile apparatuses 920 to 923, the CPU 902 transmits the image data to be broadcasted stored in the RAM 903 to the facsimile apparatuses 920 to 923 via the facsimile modems 906 to 909.

However, in the system shown in FIG. 22, since the telephone exchanger and the facsimile data broadcasting apparatus are separate apparatuses, the telephone exchanger and the facsimile data broadcasting apparatus, i.e., the extension unit and the office line interfaces of the facsimile data broadcasting apparatus, must be connected by telephone lines. For example, even if the telephone exchanger and the facsimile data broadcasting apparatus are equipped in a single office, of lines which can be accommodated in the extension unit of the telephone exchanger, lines corresponding to those of the facsimile data broadcasting apparatus are required for connection with the facsimile data broadcasting apparatus. This poses a problem in terms of utilization efficiency of extensions.

In the case of the system shown in FIG. 23, since the office line interfaces of the facsimile data broadcasting apparatus are directly connected to the telephone network, the utilization efficiency of extensions of the telephone exchanger can be improved as compared to the system shown in FIG. 22. However, a user of this system must make new contracts with the telephone network supplier. Also, when data is broadcasted to even an extension facsimile apparatus, it must be done via the telephone network. In either case, running cost is considerably increased.

Furthermore, each of the facsimile data broadcasting apparatuses shown in FIGS. 22 and 23 requires expensive facsimile modems corresponding in number to destinations to which data is concurrently broadcasted even though image data to be transmitted remains the same, and a problem associated with apparatus production cost is also posed.

Conventionally, a facsimile data broadcasting apparatus 930, which has an arrangement including only one facsimile modem, as shown in FIG. 24, and can broadcast data to a plurality of destinations without going through any telephone exchanger, is known. The facsimile data broadcasting apparatus 930 has an arrangement obtained by excluding the facsimile modems 907 to 909 and the office line interfaces 911 to 913 from the arrangement of the facsimile data broadcasting apparatus 901 shown in FIGS. 22 and 23.

In a broadcasting transmission using such an apparatus, a sequential broadcasting method for transmitting data to a plurality of destination facsimile apparatuses by sequentially re-connecting a line is normally used.

However, the apparatus shown in FIG. 24 cannot execute concurrent broadcasting since it includes only one facsimile modem.

SUMMARY OF THE INVENTION

Accordingly, it is an object of the present invention to provide a telephone exchange apparatus with a facsimile data broadcasting facility, which integrates a facsimile data broadcasting facility and a telephone exchange facility.

According to the present invention, the foregoing object is attained by providing a telephone exchange apparatus integrating facsimile communication facility comprising reception means for receiving image data from a facsimile apparatus connected to the telephone exchange apparatus via a telephone network and/or directly, storage means for storing the image data, facsimile data communication means for transmitting/receiving the image data as facsimile data, line connection means for concurrently connecting a plurality of lines, exchange means for exchanging data on the plurality of lines, and concurrent broadcasting means for concurrently broadcasting the image data to a plurality of facsimile apparatuses different from the facsimile apparatus using the plurality of lines by sharing the facsimile data communication means.

In accordance with the present invention as described above, image data is concurrently broadcasted to a plurality of facsimile apparatuses via a plurality of lines by sharing a common facsimile data communication means.

It is another object of the present invention to provide a facsimile data broadcasting apparatus capable of concurrently broadcasting data by sharing a single facsimile modem.

According to the present invention, the foregoing object is attained by providing a facsimile data broadcasting apparatus comprising reception means for receiving image data transmitted from a facsimile apparatus, storage means for storing the image data, facsimile data communication means for transmitting/receiving the image data as facsimile data, line connection means for concurrently connecting a plurality of lines, and concurrent broadcasting means for concurrently broadcasting the image data to a plurality of facsimile apparatuses different from the facsimile apparatus using the plurality of lines by sharing the facsimile data communication means, wherein the facsimile data communication means includes a single facsimile modem and a plurality of modems for facsimile control signal.

In accordance with the present invention as described above, image data is concurrently broadcasted to a plurality of facsimile apparatuses via a plurality of lines by sharing a common facsimile data communication means.

According to one aspect of the present invention, in a facsimile data broadcasting mode, control signals are transmitted/received using a plurality of modems for facsimile control signal, and image data is transmitted by sharing a single facsimile modem.

According to another aspect of the present invention, in a facsimile data broadcasting mode, control signals and image data are transmitted by sharing a single facsimile modem, and control signals are received by demodulators for receiving facsimile control signals.

According to still another aspect of the present invention, in a facsimile data broadcasting mode, demodulators for receiving facsimile control signals, which demodulators are fewer than facsimile apparatuses as concurrent broadcasting destinations, and a second switching means are used, and when control signals are received, the demodulators for receiving facsimile control signals, which demodulators are fewer than facsimile apparatuses as broadcasting destinations, are controlled to be able to sequentially receive the control signals.

The invention is particularly advantageous since the telephone exchange apparatus integrates the facsimile communication facility, and can execute a facsimile data broadcasting operation to facsimile apparatuses which are connected to the telephone exchange apparatus directly or via, e.g., a telephone network. For this reason, (1) telephone lines between the telephone exchanger and the facsimile data broadcasting apparatus and line interfaces, arranged between the telephone exchanger and the facsimile data broadcasting apparatus, for connecting a telephone line can be omitted, and cost of the apparatus can be reduced. (2) Extra telephone lines for the facsimile data broadcasting apparatus in addition to telephone lines connected to the telephone exchange apparatus can be omitted, and running cost can be reduced.

Furthermore, since data can be concurrently broadcasted to a plurality of facsimile apparatuses by sharing the facsimile data communication means, the apparatus can, for example, be constituted using a fewer number of expensive facsimile modems, thus reducing apparatus cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a flow chart showing a facsimile data broadcasting communication operation according to a fourth embodiment of the present invention;

FIGS. 10A, 10B and 10C are flow charts showing facsimile data broadcasting communication operations according to the fifth embodiment;

FIG. 11 is a block diagram showing an arrangement of a telephone exchange apparatus capable of executing a facsimile data broadcasting transmission according to a sixth embodiment of the present invention;

FIGS. 16A, 16B, and 16C are flow charts showing facsimile data broadcasting communication operations according to the eighth embodiment;

DESCRIPTION OF THE PREFERRED EMBODIMENTS

Preferred embodiments of the present invention will now be described in detail in accordance with the accompanying drawings.

Some embodiments of a telephone exchange apparatus integrating a facsimile data broadcasting facility complying with the G3 protocol and a facsimile data broadcasting apparatus complying with the G3 protocol will be explained hereinafter. Therefore, various signal names to be referred to in the following description comply with the G3 protocol.

[First Embodiment (FIGS. 1 & 2)]

Figure 1:
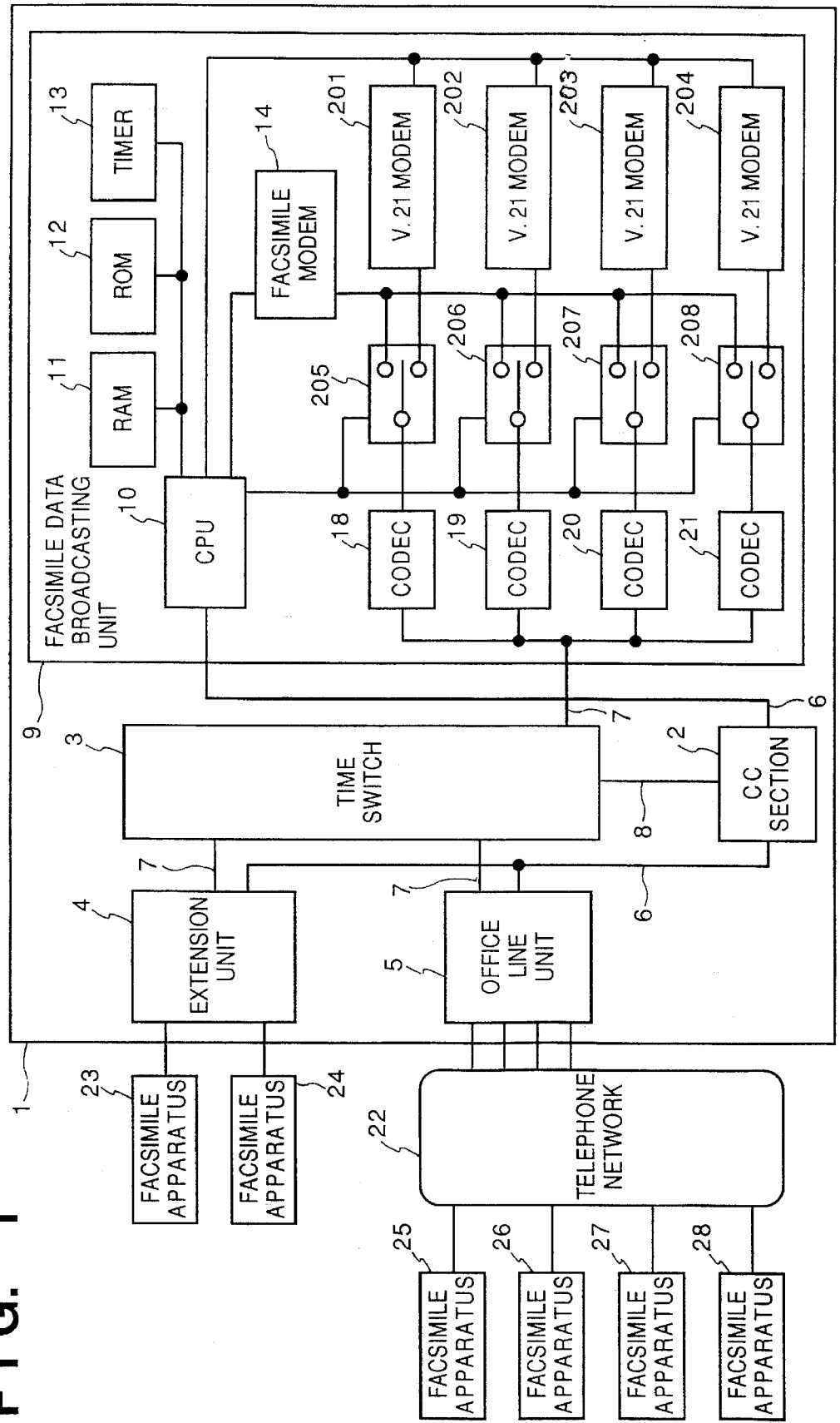
FIG. 1 is a block diagram showing an arrangement of a telephone exchange apparatus capable of executing a facsimile data broadcasting transmission according to a first embodiment of the present invention.

FIG. 1 is a block diagram showing an arrangement of a telephone exchange apparatus integrating a facsimile data broadcasting facility according to a first embodiment.

One important feature of this embodiment is to efficiently use an extension unit, extension lines, and subscriber's lines with a telephone network in the telephone exchange apparatus so as to decrease the required numbers of extension units, extension lines, and subscriber's lines with the telephone network, to broadcast an image by sharing a facsimile modem using a switch circuit, and to transmit/receive control signals using V.21 modems.

In FIG. 1, reference numeral 1 denotes a telephone exchange apparatus; 2, a CC (Communication Controller) section for controlling the overall telephone exchange apparatus; 3, a time switch for attaining time-divisional exchange control of PCM data; 4, an extension unit for connecting extension terminals of the telephone exchange apparatus 1; 5, an office line unit for connection with a telephone network 22; 6, a control line for communicating control information among the extension unit, the office line unit 5, and a facsimile data broadcasting unit 9; 7, a PCM highway for communicating audio PCM data among the time switch, the extension unit 4, the office line unit 5, and the facsimile data broadcasting unit 9 in the telephone exchange apparatus 1; 8, a control line used by the CC section 2 to control the time switch 3; 9, a facsimile data broadcasting unit (to be referred to as a broadcasting unit hereinafter) having a facsimile data broadcasting facility in the telephone exchange apparatus 1; 10, a CPU for controlling the broadcasting unit 9; 11, a RAM for storing, e.g., image data; 12, a ROM storing a control program and the like; 13, a timer used in, e.g., protocol control for a G3 facsimile apparatus; 14, a facsimile modem for a facsimile communication, which is controlled by the CPU 10; 18 to 21, CODECs for converting analog signals into PCM data or vice versa to connect the PCM highway 7 and the facsimile modem 14; 22, a telephone network for connecting the office line unit 5 to facsimile apparatuses 25 to 28 to exchange information; and 23 to 28, facsimile apparatuses connected to the extension unit 4 or the telephone network 22.

Furthermore, reference numerals 201 to 204 denote V.21 modems for communicating facsimile control signals; and 205 to 208, switch circuits for switching connections between the CODECs 18 to 21 and the facsimile modem 14 or the V.21 modems 201 to 204 under the control of the CPU 10.

In the system with the above-mentioned arrangement, reception of image data to be broadcasted at the broadcasting unit 9 will be explained below.

For example, in order to transmit an image to be broadcasted from the facsimile apparatus 23 to the facsimile apparatuses 25 to 28, a call addressed to the broadcasting unit 9 is generated to the extension unit 4. Upon reception of this call, the extension unit 4 of the telephone exchange apparatus 1 informs call generation information addressed to the broadcasting unit 9 to the CC section 2 via the control line 6. The CC section 2 controls the time switch 3 via the control line 8 on the basis of this call generation information to connect the facsimile apparatus 23 and the CODEC 18 on the PCM highway 7. The CC section 2 sends, to the CPU 10 via the control line 6, a message indicating that the CODEC 18 and the facsimile apparatus 23 have been connected. Upon reception of this message, the CPU 10 controls the switch circuit 205 to switch its connection to the facsimile modem 14 side. Also, the CC section 2 sends, to the extension unit 4 via the control line 6, a message indicating that the call generated by the facsimile apparatus 23 has been connected to a called party. The extension unit 4 executes response processing to a line to which the facsimile apparatus 23 has been connected on the basis of the message from the CC section 2.

In this manner, the facsimile apparatus 23 and the facsimile modem 14 are connected. The CPU 10 of the broadcasting unit 9 executes a communication with the facsimile apparatus 23 via the facsimile modem 14 on the basis of the facsimile communication protocol, thereby receiving image data to be broadcasted from the facsimile apparatus 23. The received image data is stored in the RAM 11.

Figure 2A:
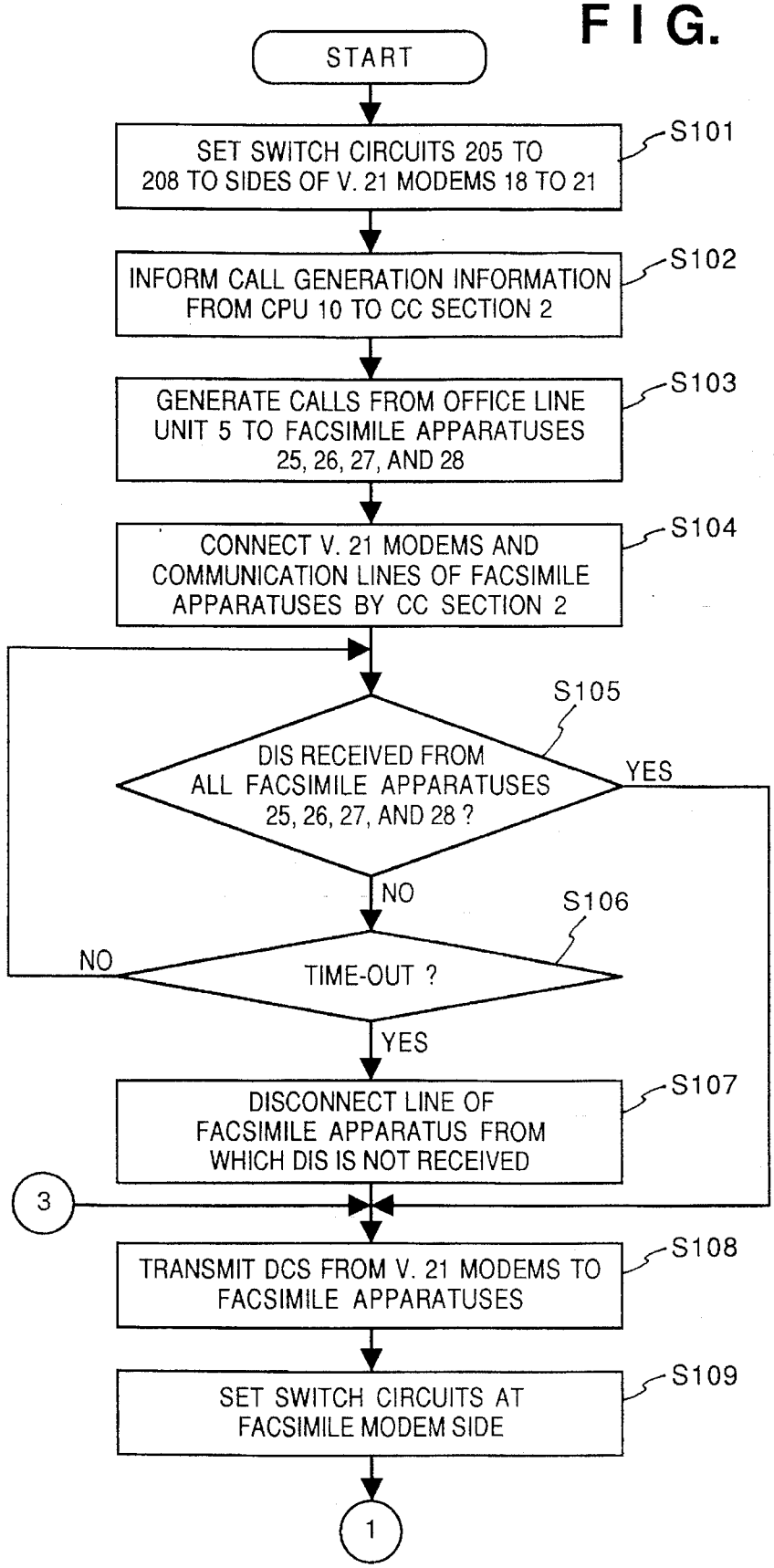
FIGS. 2A, 2B, and 2C are flow charts showing facsimile data broadcasting communication operations according to the first embodiment.
Figure 2B:
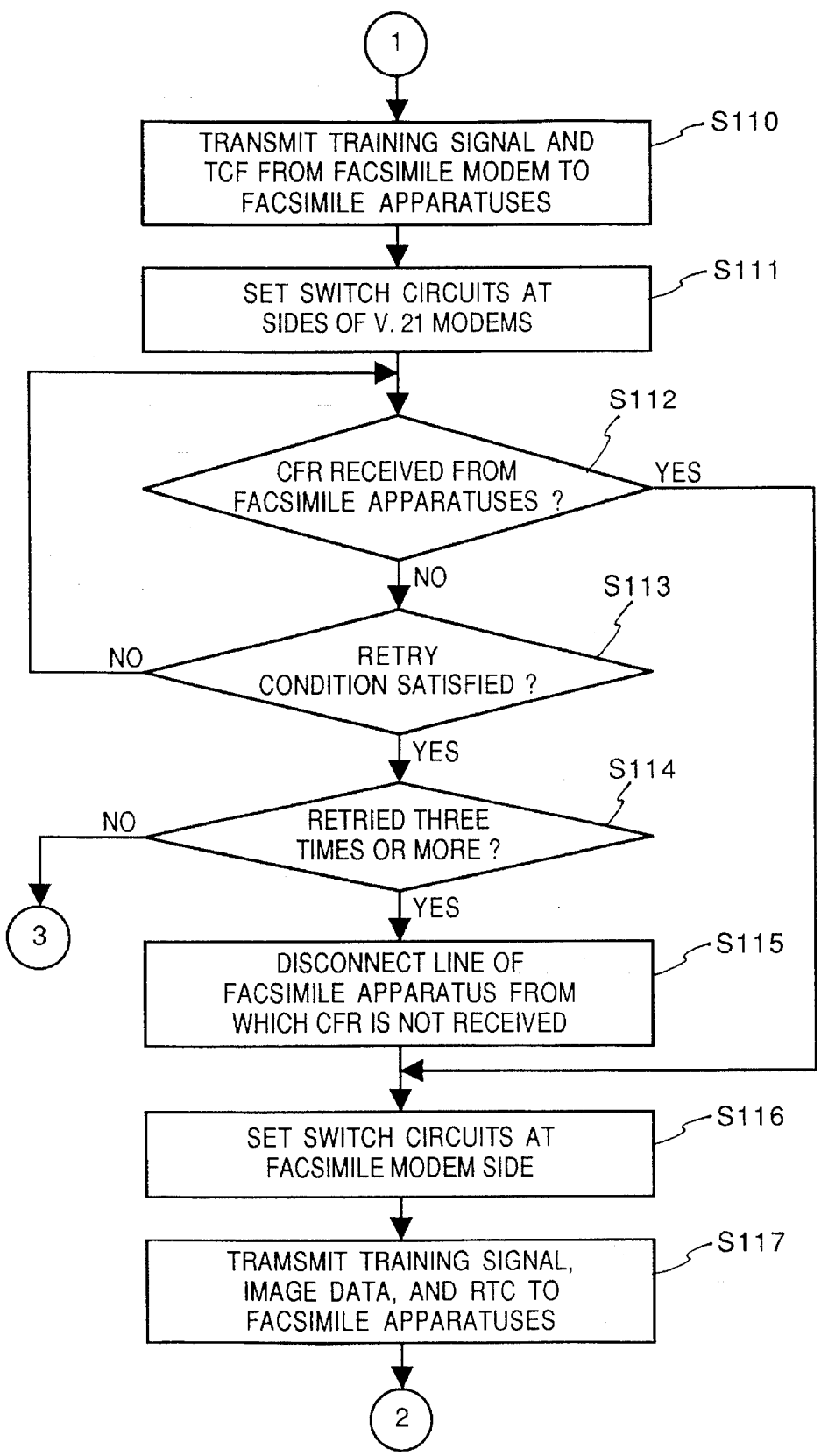
Figure 2C:
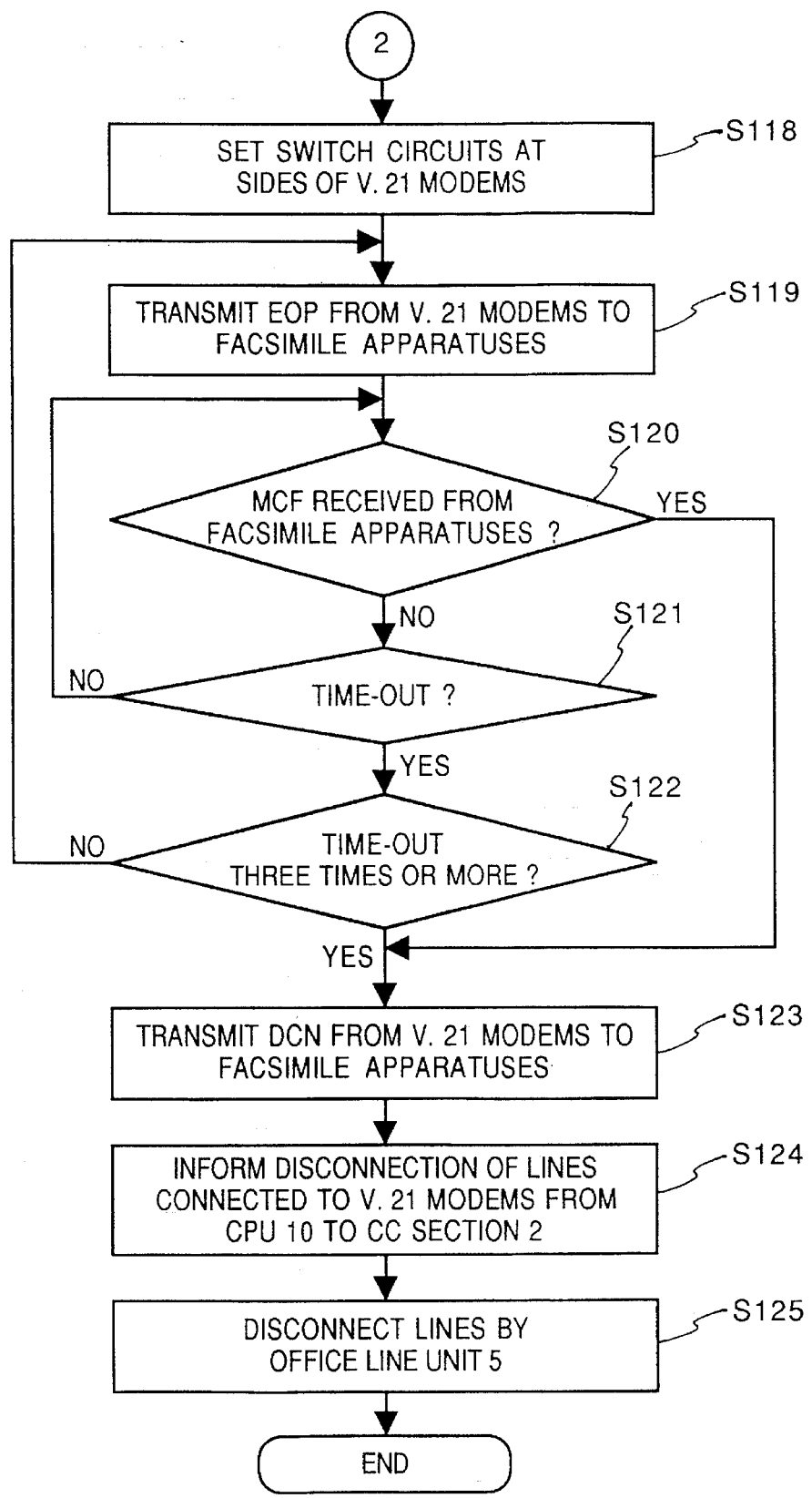

Operations executed when the stored image data is concurrently broadcasted from the broadcasting unit 9 to the facsimile apparatuses 25 to 28 will be described below with reference to the flow charts shown in FIGS. 2A to 2C. Note that the stored image data has an amount corresponding to one page.

In step S101, the CPU 10 controls the switch circuits 205 to 208 to be connected to the sides of the V.21 modems 201 to 204, so that the CODECs 18 to 21 are connected to the V.21 modems 201 to 204 and the V.21 modems 201 to 204 can respectively receive signals from the facsimile apparatuses 25 to 28.

In step S102, the CPU 10 of the broadcasting unit 9 sends call generation information of broadcasting destinations to the CC section 2 via the control line 6. In step S103, the CC section 2 controls the office line unit 5 via the control line 6 on the basis of this call generation information to generate calls to the facsimile apparatuses 25 to 28 via telephone lines connected to the office line unit 5 and the telephone network 22. Furthermore, with processing in step S104, communication lines between the facsimile apparatus 25 and the V.21 modem 201, between the facsimile apparatus 26 and the V.21 modem 202, between the facsimile apparatus 27 and the V.21 modem 203, and between the facsimile apparatus 28 and the V.21 modem 204 are connected, thus allowing communications.

In step S105, the control waits for DIS signals from the facsimile apparatuses 25 to 28. If the CPU 10 determines in step S105 that DIS signals are received from all the facsimile apparatuses 25 to 28, the flow advances to step S108. On the other hand, if the CPU 10 determines in step S105 that DIS signals are not received from all the facsimile apparatuses, the flow advances to step S106 to check if the timer has reached a time-out state in the G3 protocol procedure. If it is determined that the timer has not reached a time-out state, the flow returns to step S105 to keep monitoring whether or not DIS signals from all the facsimile apparatuses are received. In contrast to this, if it is determined a timer has reached a time-out state before DIS signals are received from all the facsimile apparatuses, the flow advances to step S107.

In step S107, in order to execute processing for disconnecting a line connected to the facsimile apparatus from which a DIS signal is not received, the CPU 10 sends a message indicating this to the CC section 2 via the control line 6. In response to this message, the CC section 2 controls the office line unit 5 via the control line 6 to disconnect the line connected to the facsimile apparatus from which a DIS signal is not received.

For example, when a DIS signal from the facsimile apparatus 28 is not received via the office line unit 5 and the V.21 modem 204, and a time-out state occurs, the CPU 10 instructs the CC section 2 to disconnect the telephone line connected to the V.21 modem 204. In response to this instruction, the CC section 2 controls the office line unit 5 to disconnect one, connected to the facsimile apparatus 28, of the telephone lines of the office line unit 5.

With this line disconnection processing, an unnecessary communication with a facsimile apparatus from which a DIS signal is not received, i.e., a facsimile apparatus which cannot perform a normal communication, can be avoided.

In step S108, DCS signals are transmitted from the V.21 modems connected to effective lines (lines which are connected to the facsimile apparatuses from which DIS signals are received, and hence, are not disconnected) to the corresponding facsimile apparatuses. In step S109, the CPU 10 controls the switch circuits connected to the effective lines to be switched to the facsimile modem 14 side. For example, if the line connected to the facsimile apparatus 25 is an effective line, the facsimile apparatus 25 is connected to the facsimile modem 14 via the switch circuit 205 and the CODEC 18. Other effective lines are similarly connected to the facsimile modem 14. In the processing in step S10, the facsimile modem connected to the effective lines transmits a modem training signal for training with distant facsimile modems and a TCF signal to the corresponding facsimile apparatuses. In step S111, the CPU 10 controls the switch circuits connected to the effective lines to be switched to the V.21 modem side. For example, if the line connected to the facsimile apparatus 25 is an effective line, the facsimile apparatus 25 is connected to the V.21 modem 201 via the switch circuit 205 and the CODEC 18. Other effective lines are similarly connected to the corresponding V.21 modems.

In step S112, the CPU 10 monitors CFR signals from the facsimile apparatuses via the V.21 modems. When CFR signals are received from all the facsimile apparatuses connected to the effective lines, the flow jumps to step S116 to start image data transmission processing. On the other hand, when CFR signals are not received from all the facsimile apparatuses connected to the effective lines, the flow advances to step S113 to check based on the G3 facsimile communication protocol if a condition for retrying modem training of the facsimile apparatus from which a CFR signal is not received yet is satisfied. If the retry condition is not satisfied, the flow returns to step S112 to keep monitoring CFR signals received from the distant facsimile apparatuses. In contrast to this, if the retry condition is satisfied, the flow advances to step S114 to check if the retrial count is 3 or more. If it is determined that the retrial count is less than 3, the flow returns to step S108 to transmit DCS signals to the distant facsimile apparatuses so as to retry modem training. In contrast to this, if it is determined that the retrial count is 3 or more, the flow advances to step S115 to disconnect the line connected to the facsimile apparatus from which a CFR signal is not received.

For example, when a CFR signal from the facsimile apparatus 27 cannot be received via the office line unit 5 and the V.21 modem 203, and the retrial count becomes 3 or more, the CPU 10 instructs the CC section 2 to disconnect the telephone line connected to the V.21 modem 203. In response to this instruction, the CC section 2 controls the office line unit 5 to disconnect one, connected to the facsimile apparatus 27, of the telephone lines of the office line unit 5.

With this line disconnection processing, an unnecessary communication with a facsimile apparatus from which a CFR signal is not received, i.e., a facsimile apparatus which cannot perform a normal communication, can be avoided. In this manner, since a facsimile apparatus as a broadcasting destination, which is disconnected from a line due to a communication disable state is disconnected from the line to the apparatus of this embodiment, it can execute another communication, and line utilization efficiency and facsimile use efficiency can also be improved.

If at least one of the facsimile apparatuses connected to the effective lines makes unsuccessful modem training, modem training signals are re-supplied to the facsimile apparatuses which have already made successful modem training and transmitted CFR signals. In this case, the facsimile apparatuses which made successful modem training similarly respond to retry modem training signals even after the successful modem training as in the first modem training, and send back the modem training result again. In this manner, the modem training end timings of the plurality of facsimile modems connected to the effective lines are synchronized.

In step S116, the CPU 10 controls the switch circuits connected to the effective lines to be switched to the facsimile modem 14 side as in the processing in step S109. In step S117, the facsimile modem 14 connected to the facsimile apparatuses simultaneously transmits a modem training signal, the image data stored in the RAM 11, and an RTC signal to the facsimile apparatuses which are connected to the effective lines, and completed modem training. After these signals are transmitted, the CPU 10 controls the switch circuits connected to the effective lines to the sides of the V.21 modems in step S118 like in step S111. In step S119, the V.21 modems connected to the effective lines transmit EOP signals to the corresponding facsimile apparatuses.

In step S120, the CPU 10 monitors MCF signals sent back from the facsimile apparatuses via the V.21 modems. When MCF signals are received from all the facsimile apparatuses connected to the effective lines, the flow jumps to step S123. In contrast to this, when MCF signals are not received from all the facsimile apparatuses connected to the effective lines, the flow advances to step S121 to check based on the G3 protocol procedure if the timer has reached a time-out state. If the timer has not reached a time-out state, the flow returns to step S120 to keep monitoring the MCF signals. In contrast to this, when the timer has reached a time-out state before MCF signals are received from all the facsimile apparatuses connected to the effective lines, the flow advances to step S122 to check if the time-out count is 3 or more. If it is determined in step S122 that the time-out count is less than 3, the flow returns to step S119 to re-transmit EOP signals. In contrast to this, if it is determined in step S122 that the time-out count is 3 or more, the flow advances to step S123.

In this manner, if at least one of the facsimile apparatuses connected to the effective lines fails to receive image data or fails to receive an EOP signal, and cannot transmit an MCF signal, EOP signals are re-transmitted from the V.21 modems even to the facsimile apparatuses which have already transmitted the MCF signals. At this time, the facsimile apparatuses, which have already transmitted the MCF signals, also respond to the EOP signals based on the G3 protocol like in the first EOP signal reception, and send back MCF signals again. In this manner, the image data transmission end timings of the plurality of facsimile apparatuses connected to the effective lines are synchronized.

In step S123, the CPU 10 controls the V.21 modems connected to the effective lines to transmit DCN signals to the corresponding facsimile apparatuses. In step S124, the CPU 10 instructs the CC section 2 to disconnect the telephone lines connected to the V.21 modems. In response to this instruction, the CC section 2 controls the office line unit 5 to disconnect ones, connected to the facsimile apparatuses, of the telephone lines of the office line unit 5 in step S125.

Therefore, according to this embodiment, the CPU 10 concurrently transmits image data while sharing the single facsimile modem by controlling the switch circuits 205 to 208 to switch connections between the CODECs 18 to 21 and the facsimile modem 14 or the V.21 modems 201 to 204.

[Second Embodiment (FIGS. 3 to 4D)]

Figure 3:
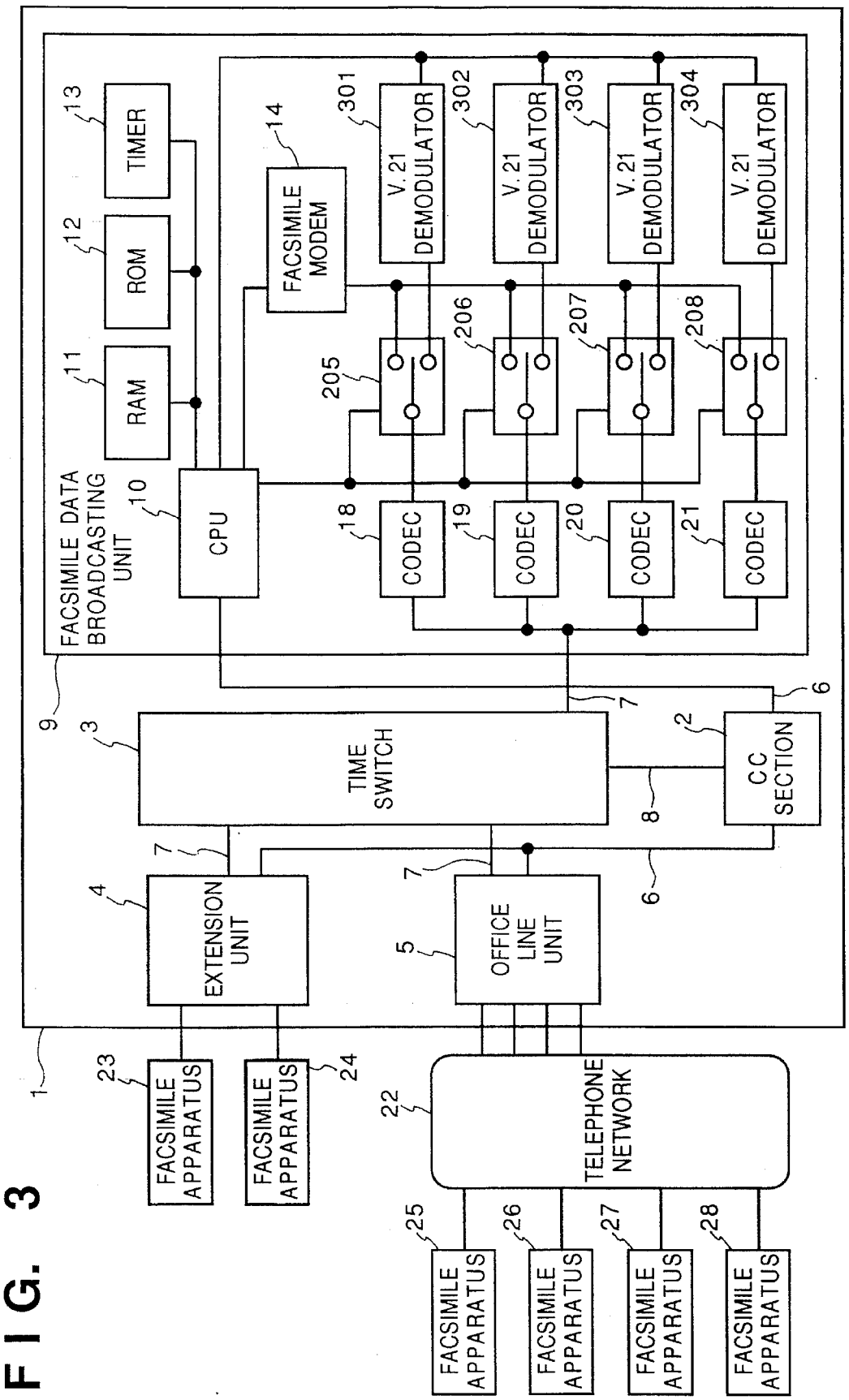
FIG. 3 is a block diagram showing an arrangement of a telephone exchange apparatus capable of executing a facsimile data broadcasting transmission according to a second embodiment of the present invention.
Figure 4A:
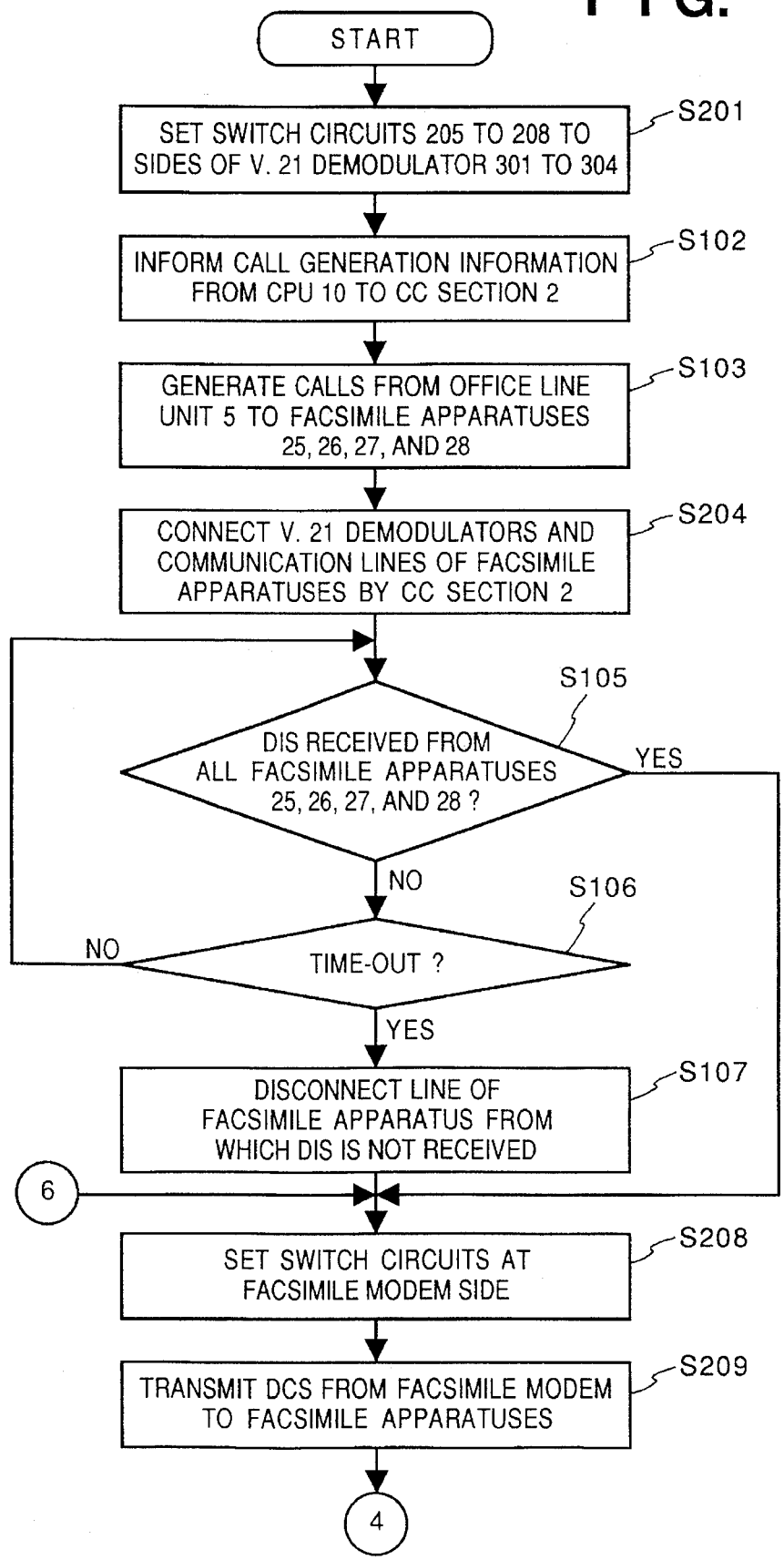
FIGS. 4A, 4B, 4C, and 4D are flow charts showing facsimile data broadcasting communication operations according to the second embodiment.
Figure 4B:
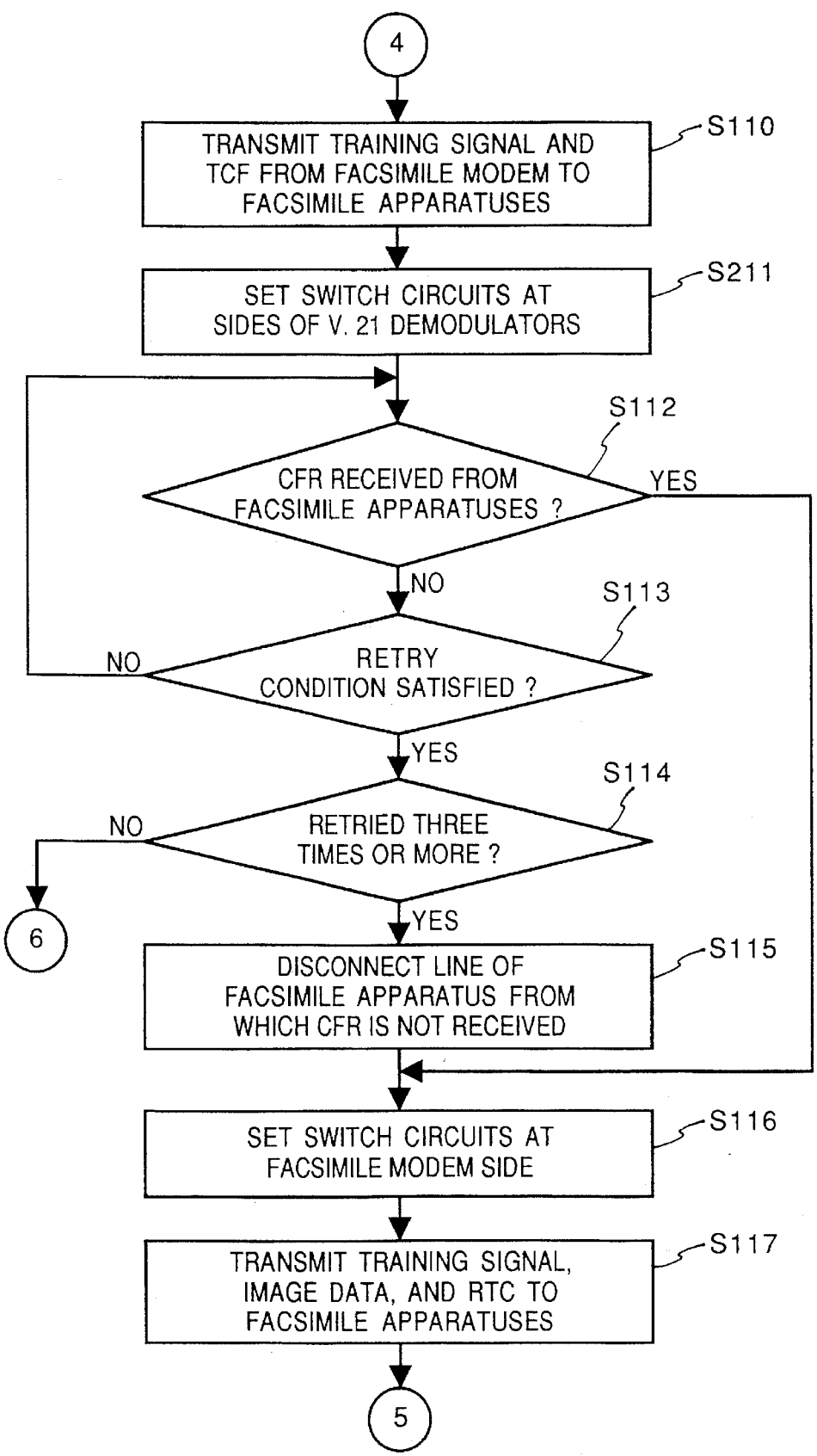
Figure 4C:
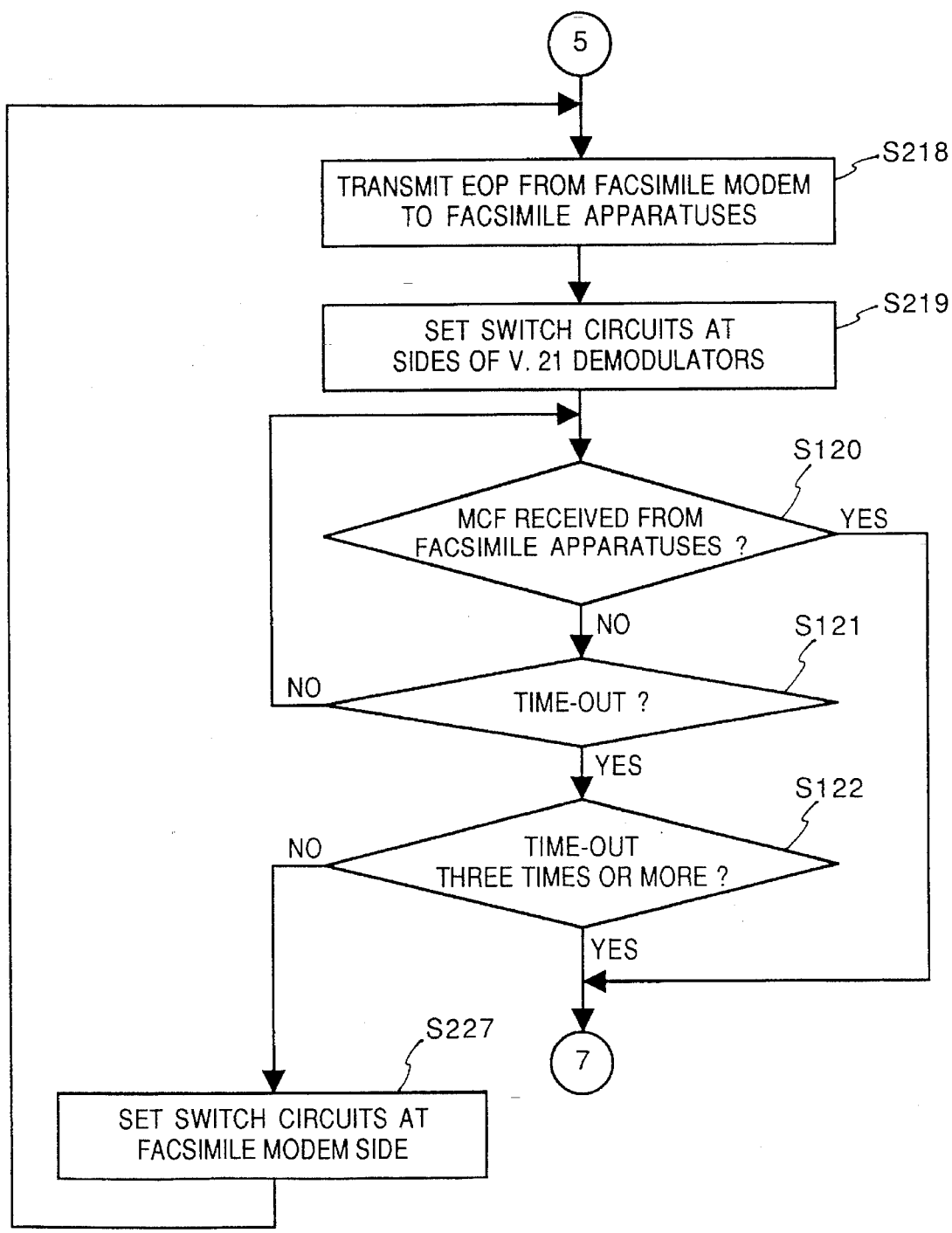
Figure 4D:
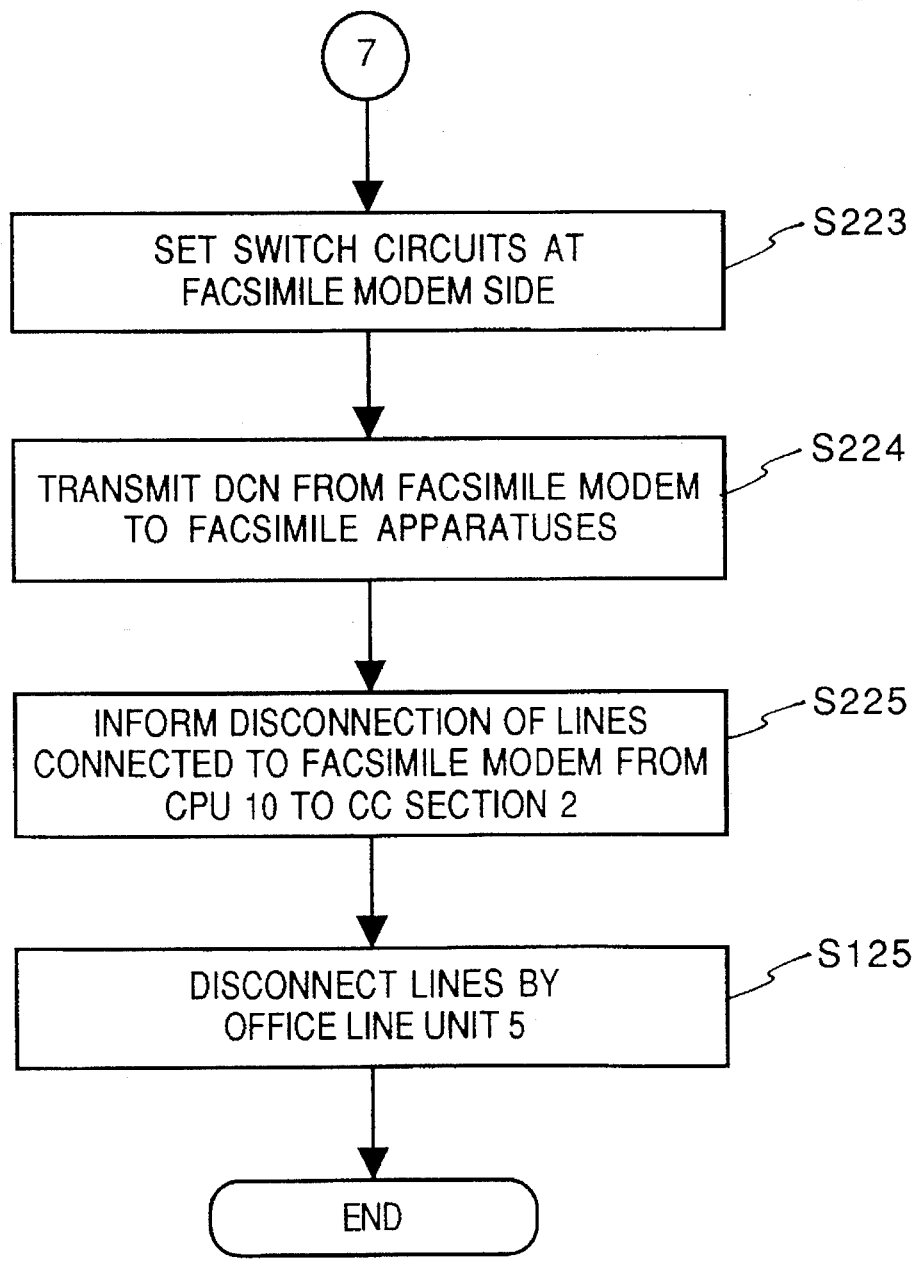

FIG. 3 is a block diagram showing an arrangement of a telephone exchange apparatus integrating a facsimile data broadcasting facility according to this embodiment.

In FIG. 3, the same reference numerals denote the same parts as in the first embodiment, and a detailed description thereof will be omitted. Only components as the characteristic features of this embodiment will be described below. In FIG. 3, reference numerals 301 to 304 denote V.21 demodulators controlled by the CPU 10 and used for receiving facsimile control signals.

One important feature of this embodiment is that a single facsimile modem performs transmission of control signals and image data, and a plurality of V.21 demodulators corresponding in number to facsimile apparatuses as broadcasting destinations receive control signals from the facsimile apparatuses as broadcasting destinations.

In this embodiment, the broadcasting transmission of facsimile data will be examined like in the first embodiment. Since an image transmission operation from the facsimile apparatus 23 to the broadcasting unit 9 is the same as that in the first embodiment, a detailed description thereof will be omitted.

Operations executed when stored image data is concurrently broadcasted from the broadcasting unit 9 to the facsimile apparatuses 25 to 28 will be described below with reference to the flow charts shown in FIGS. 4A to 4D. Note that image data to be transmitted has an amount corresponding to one page as well. In the following description, only processing steps as the characteristic features of this embodiment will be explained. The same processing steps as those described in the first embodiment will be referred to using the same step reference numbers, and a detailed description thereof will be omitted.

In step S201, the CPU 10 controls the switch circuits 205 to 208 to be switched to the sides of the V.21 demodulators 301 to 304, so that the CODECs 18 to 21 are respectively connected to the V.21 demodulators 301 to 304, and the V.21 demodulators 301 to 304 can receive signals from the facsimile apparatuses 25 to 28.

With processing in steps S102 and S103, and processing in the subsequent step S204, communication lines between the facsimile apparatus 25 and the V.21 demodulator 301, between the facsimile apparatus 26 and V.21 demodulator 302, between the facsimile apparatus 27 and the V.21 demodulator 303, and between the facsimile apparatus 28 and the V.21 demodulator 304 are respectively connected to allow communications.

With processing in steps S105 to S107, for example, when a DIS signal from the facsimile apparatus 28 cannot be received via the office line unit 5 and the V.21 demodulator 304, and the timer has reached a time-out state, the CPU 10 instructs the CC section 2 to disconnect the telephone line connected to the V.21 demodulator 304. In response to this instruction, the CC section 2 controls the office line unit 5 to disconnect one, connected to the facsimile apparatus 28, of telephone lines of the office line unit 5.

In step S208, the CPU 10 controls the switch circuits connected to the effective lines to the facsimile modem 14 side. For example, if the line connected to the facsimile apparatus 25 is an effective line, the facsimile apparatus 25 is connected to the facsimile modem 14 via the switch circuit 205 and the CODEC 18. Similarly, other effective lines are connected to the facsimile modem 14. In step S209, the facsimile modem 14 connected to the effective lines transmits a DCS signal to the corresponding facsimile apparatuses. With processing in step S110, a modem training signal and a TCF signal are concurrently transmitted to the facsimile apparatuses as broadcasting destinations connected to the effective lines. In step S211, the CPU 10 controls the switch circuits connected to the effective lines to be switched to the sides of the V.21 demodulators. For example, if the line connected to the facsimile apparatus 25 is an effective line, the facsimile apparatus 25 and the V.21 demodulator 301 are connected via the switch circuit 205 and the CODEC 18. Similarly, other effective lines are connected to the V.21 demodulators.

The CPU 10 monitors CFR signals sent from the facsimile apparatuses via the V.21 demodulators, and executes processing in steps S112 to S115.

In the processing in steps S112 to S115, for example, if a CFR signal from the facsimile apparatus 27 cannot be received via the office line unit 5 and the V.21 demodulator 303, and the retrial count exceeds 3, the CPU 10 instructs the CC section 2 to disconnect the telephone line connected to the V.21 demodulator 303. In response to this instruction, the CC section 2 controls the office line unit 5 to disconnect one, connected to the facsimile apparatus 27, of the telephone lines of the office line unit 5.

With processing in step S116, the switch circuits connected to the effective lines are switched to the facsimile modem 14 side, and with processing in step S117, a modem training signal, image data, and an RTC signal are concurrently transmitted to all the facsimile apparatuses as broadcasting destinations connected to the effective lines. After these signals are transmitted, an EOP signal is transmitted from the facsimile modem 14 to the facsimile apparatuses in step S218.

Thereafter, in step S219, the CPU 10 controls the switch circuits connected to the effective lines to be switched to the sides of the V.21 demodulators like in step S211.

The CPU 10 monitors MCF signals sent from the facsimile apparatuses via the V.21 demodulators, and executes processing in steps S120 to S122.

If it is determined in time-out count judgment in step S122 that the time-out count is less than 3, the flow advances to step S227, and the CPU 10 controls the switch circuits connected to the effective lines to the facsimile modem 14 side like in the processing in step S208. Thereafter, the flow returns to step S218, and the facsimile modem 14 re-transmits an EOP signal to the facsimile apparatuses. In contrast to this, if the time-out count and the number of times of EOP signal transmission are 3 or more, the flow advances to step S223.

In this manner, when the facsimile apparatuses connected to the effective lines include one or a plurality of facsimile apparatuses from which MCF signals are not received due to an image data reception error or an EOP reception error, the facsimile modem re-transmits an EOP signal. At this time, the facsimile apparatus, which have already transmitted the MCF signals, respond to the EOP signal like in the first EOP signal reception on the basis of the G3 protocol, and send back MCF signals again.

In step S223, the CPU 10 controls the switch circuits connected to the effective lines to be switched to the facsimile modem 14 side.

Thereafter, in step S224, the facsimile modem 14 transmits a DCN signal to the facsimile apparatuses. In step S225, the CPU 10 instructs the CC section 2 to disconnect the lines connected to the facsimile modem 14. Finally, the control executes step S125, and ends processing.

Therefore, according to this embodiment, the CPU 10 concurrently transmits image data while sharing the single facsimile modem by controlling the switch circuits 205 to 208 to switch connections between the CODECs 18 to 21 and the facsimile modem 14 or the V.21 demodulators 301 to 304.

Thus, the modems for transmitting/receiving control signals need not be used, and apparatus production cost can be further reduced as compared to the first embodiment.

[Third Embodiment (FIGS. 5 to 6E)]

Figure 5:
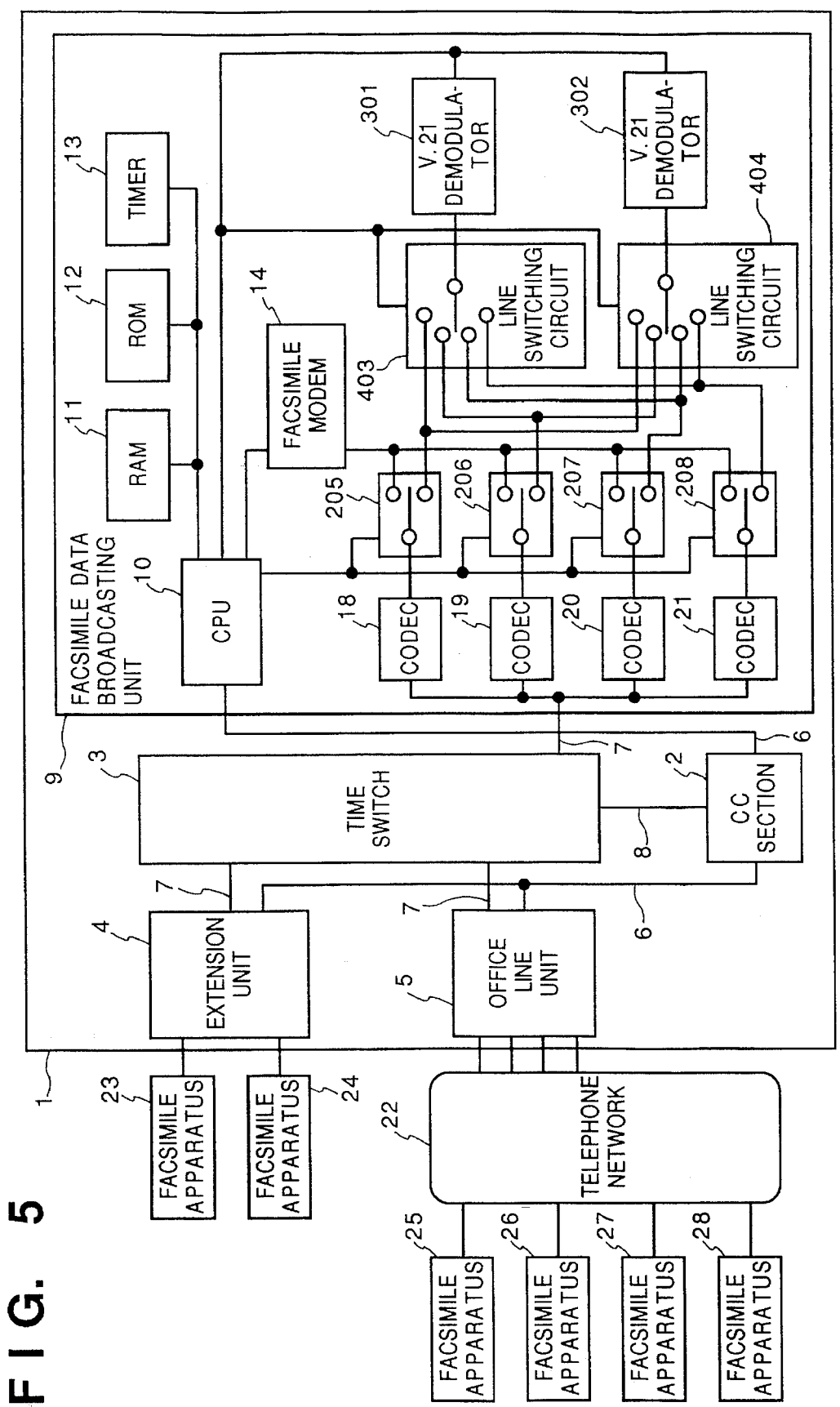
FIG. 5 is a block diagram showing an arrangement of a telephone exchange apparatus capable of executing a facsimile data broadcasting transmission according to a third embodiment of the present invention.
Figure 6A:
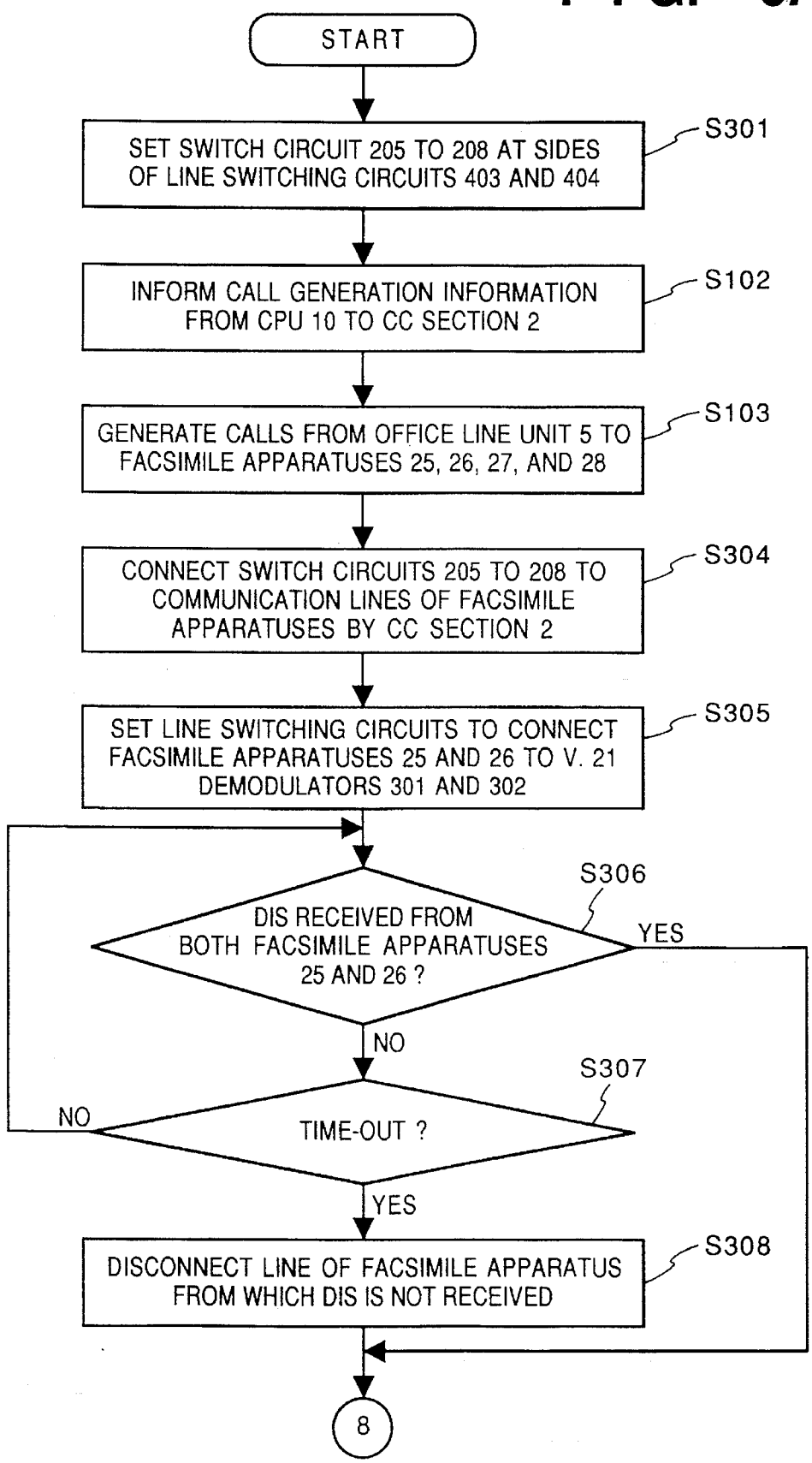
FIGS. 6A, 6B, 6C, 6D, and 6E are flow charts showing facsimile data broadcasting communication operations according to the third embodiment.
Figure 6B:
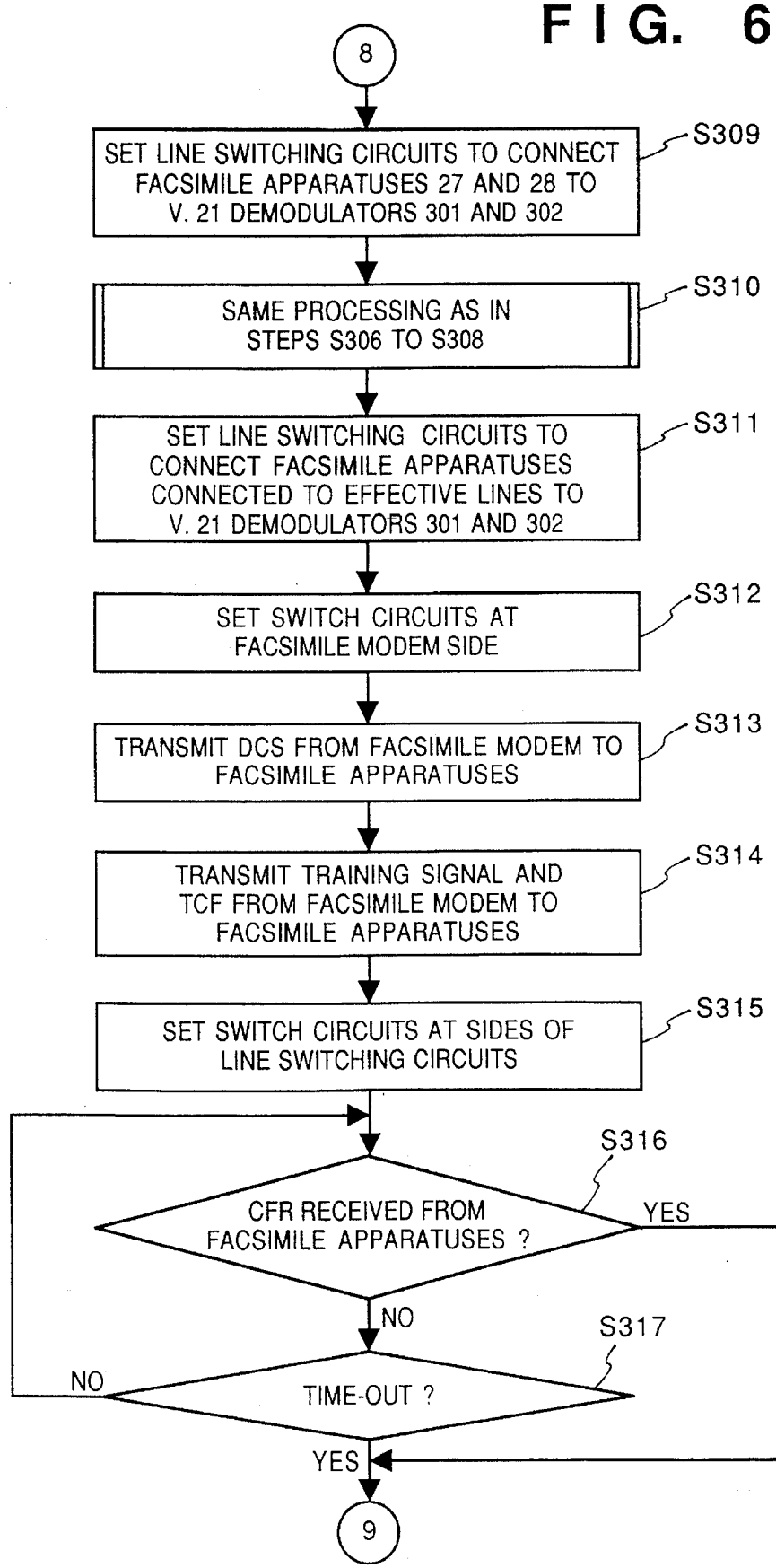
Figure 6C:
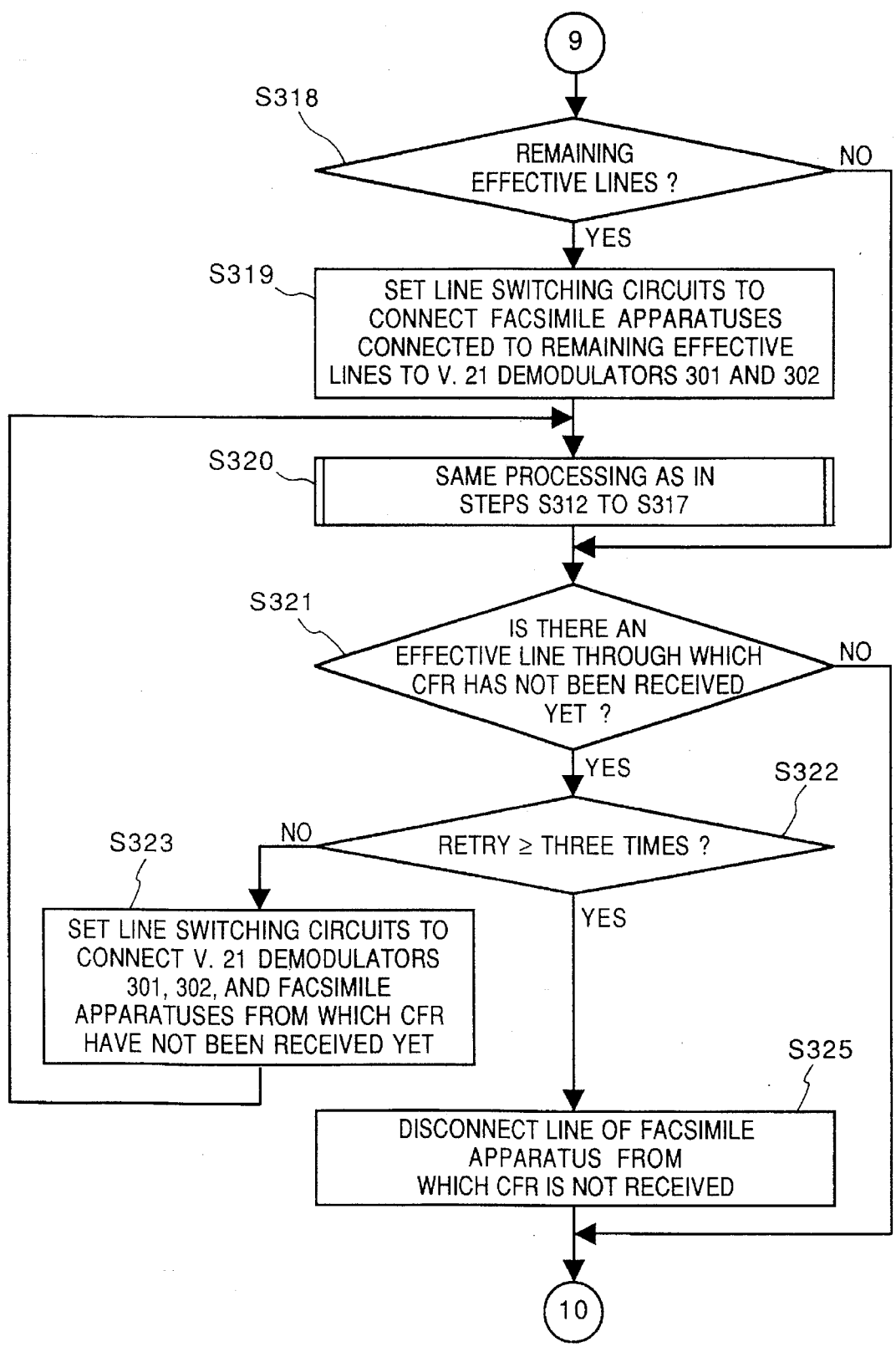
Figure 6D:
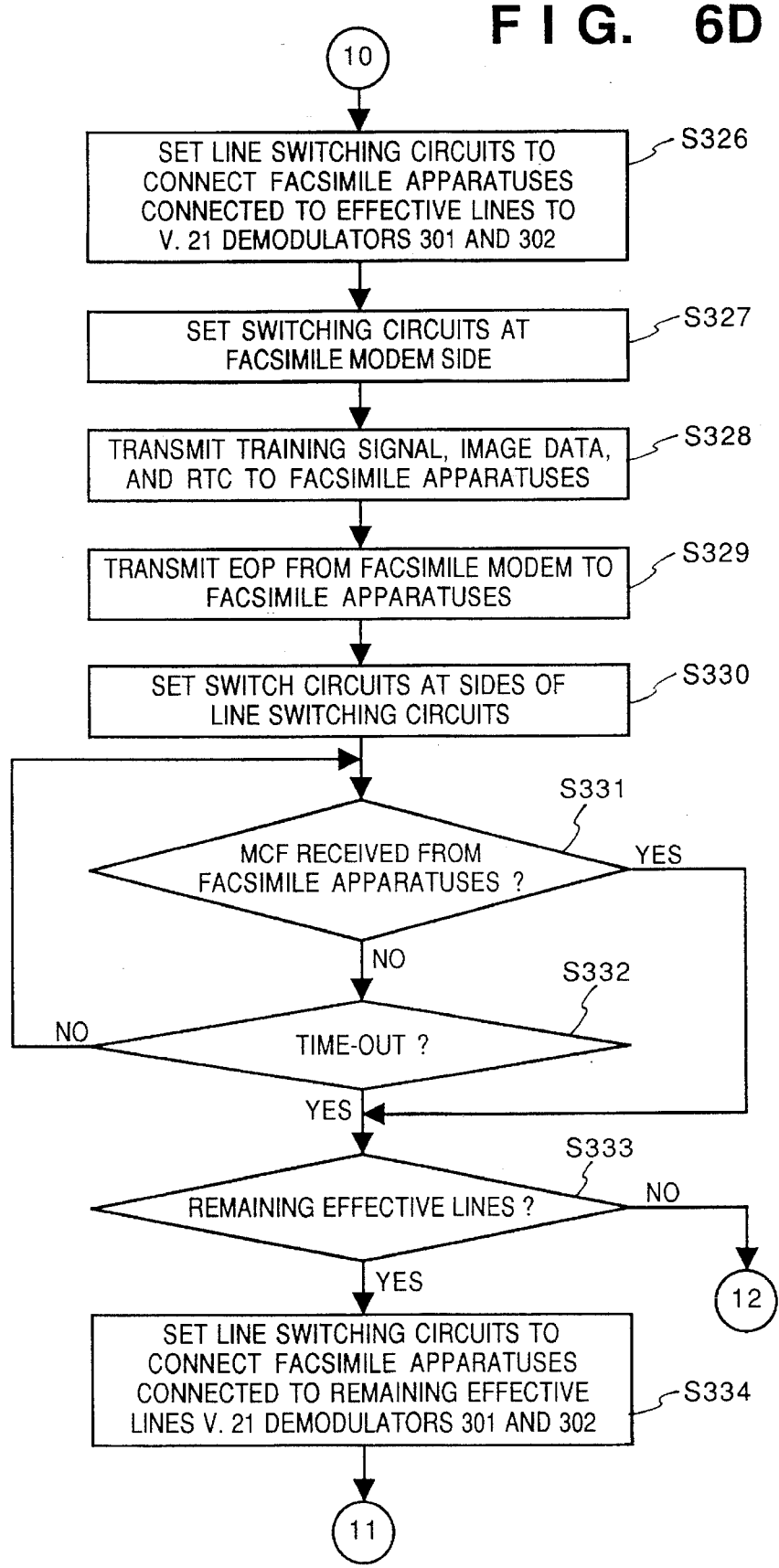
Figure 6E:
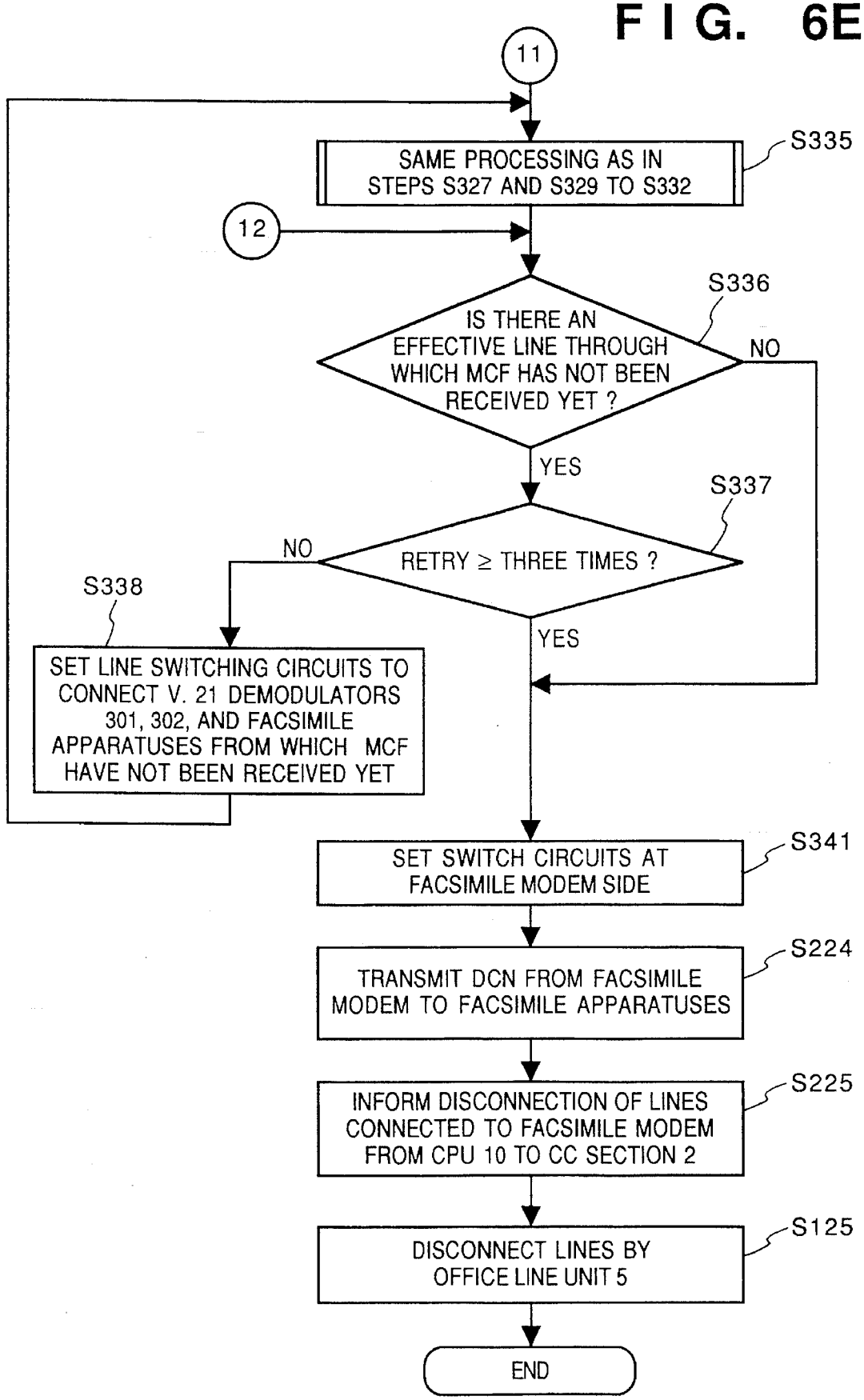

FIG. 5 is a block diagram showing an arrangement of a telephone exchange apparatus integrating a facsimile data broadcasting facility according to this embodiment. In FIG.

5, the same reference numerals denote the same parts as in the first and second embodiments, and a detailed description thereof will be omitted. Only components as the characteristic features of this embodiment will be described below. In FIG. 5, reference numerals 403 and 404 denote line switching circuits for switching connections between the V.21 demodulators 301 and 302 and the switch circuits 205 to 208.

One important feature of this embodiment is that control signals from facsimile apparatuses as broadcasting destinations can be received by the V.21 demodulators fewer than the facsimile apparatuses as broadcasting destinations by assembling the line switching circuits 403 and 404 in the telephone exchange apparatus in addition to the feature of the second embodiment.

In this embodiment, since an image transmission operation from a facsimile apparatus directly connected to the telephone exchange apparatus, e.g., the facsimile apparatus 23, to the broadcasting unit 9 is the same as that in the first embodiment, a detailed description thereof will be omitted.

Operations executed when stored image data is concurrently broadcasted from the broadcasting unit 9 to the facsimile apparatuses 25 to 28 will be described below with reference to the flow charts shown in FIGS. 6A to 6E. Note that image data to be transmitted has an amount corresponding to one page as well. In the following description, only processing steps as the characteristic features of this embodiment will be explained. The same processing steps as those described in the first and second embodiments will be referred to using the same step reference numbers, and a detailed description thereof will be omitted.

In step S301, the CPU 10 controls the switch circuits 205 to 208 to be switched to the sides of the line switching circuits, so that the CODECs 18 to 21 are respectively connected to the line switching circuits 403 and 404, and the V.21 demodulators 301 and 302 can receive signals from the office line unit 5.

With processing in steps S102 and S103 and processing in the subsequent step S304, communication lines between the facsimile apparatuses and the V.21 demodulators 301 and 302 are connected via the line switching circuits 403 and 404 to allow communications.

In step S305, the CPU 10 controls the line switching circuit 403 to be switched to the switch circuit 205 side, so that the facsimile apparatus 25 is connected to the V.21 demodulator 301 via the CODEC 18 and the switch circuit 205, and also controls the line switching circuit 404 to be switched to the switch circuit 206 side, so that the facsimile apparatus 26 is connected to the V.21 demodulator 302 via the CODEC 19 and the switch circuit 206.

With processing in steps S306 to S308, the control waits for DIS signals from the facsimile apparatuses 25 and 26, monitors the wait time, and executes line disconnection processing when a time-out state occurs. As the time to be monitored, a preset time shorter than the time-out time in the G3 protocol procedure, e.g., a time ½ the time-out time is set. For example, when a DIS signal from the facsimile apparatus 25 is not received via the office line unit 5 and the V.21 demodulator 301, and the timer reaches a time-out state, the CPU 10 instructs the CC section 2 to disconnect the telephone line connected to the facsimile apparatus 25. In response to this instruction, the CC section 2 controls the office line unit 5 to disconnect one, connected to the facsimile apparatus 25, of the telephone lines of the office line unit 5.

In step S309, the CPU 10 controls the line switching circuit 403 to be switched to the switch circuit 207 side, so that the facsimile apparatus 27 is connected to the V.21 demodulator 301 via the CODEC 20 and the switch circuit 207, and also controls the line switching circuit 404 to be switched to the switch circuit 208 side, so that the facsimile apparatus 28 is connected to the V.21 demodulator 302 via the CODEC 21 and the switch circuit 208.

Thereafter, in step S310, the same operation as that in steps S306 to S308 is executed for the facsimile apparatuses 27 and 28. In this case, the time-out time of this operation is set to be one from the time when calls are generated to the facsimile apparatuses 27 and 28 to the time when DIS signals according to the G3 protocol procedure are received.

In step S311, the CPU 10 controls the line switching circuits, so that the effective lines can be connected to the V.21 demodulators via the switch circuits. For example, assume that the line between the facsimile apparatus 28 and the office line unit 5 is disconnected, and the facsimile apparatuses connected to the effective lines are updated to the facsimile apparatuses 25 to 27. In this case, the CPU 10 switches the line switching circuit 403 to connect the V.21 demodulator 301 and the switch circuit 205, so that the facsimile apparatus 25 can be connected to the V.21 demodulator 301. Furthermore, the CPU 10 switches the line switching circuit 404 to connect the V.21 demodulator 302 and the switch circuit 206. Subsequently, in step S312, the CPU 10 controls the switch circuits connected to effective lines to be switched to the facsimile modem 14 side.

In step S313, the facsimile modem 14 transmits a DCS signal to the facsimile apparatuses as broadcasting destinations. In step S314, a modem training signal and a TCF signal are concurrently transmitted to all the facsimile apparatuses as broadcasting destinations connected to the effective lines. In step S315, the CPU 10 controls the switch circuits connected to the effective lines to be switched to the sides of the line switching circuits. For example, if the facsimile apparatus 25 is connected to the effective line, the CPU 10 controls the switch circuit 205 to be switched to the corresponding line switching circuit side, so that the facsimile apparatus 25 is connected to the line switching circuit 403 or 404. In this manner, the facsimile apparatus 25 is connected to a V.21 demodulator via the switch circuit and the line switching circuit. As for other effective lines, the facsimile apparatuses as the broadcasting destinations connected to the effective lines are connected to the line switching circuits. As a result, for example, the facsimile apparatus 25 is connected to the V.21 demodulator 301, and the facsimile apparatus 26 is connected to the V.21 demodulator 302.

With processing in steps S316 and S317, the CPU 10 waits for CFR signals received from the facsimile apparatuses 25 and 26 via the V.21 demodulators, and monitors the wait time. If it is determined in step S317 that the timer has reached a time-out state, the flow advances to step S318.

In step S318, it is checked if an effective line from which a CFR signal has not been received yet remains. If such a line is found, the flow advances to step S319, and the CPU 10 controls a line switching circuit, so that the facsimile apparatus which has not transmitted a CFR signal can be connected to a V.21 demodulator via a switch circuit as in step S311. For example, if the facsimile apparatus 27 is connected to an effective line, and a CFR signal has not been received from the facsimile apparatus 27 yet, the CPU 10 switches the switch circuit 207 and the line switching circuit 403 to connect the facsimile apparatus 27 and the V.21 demodulator 301. In contrast to this, if it is determined that CFR signals have been received from all the effective lines, the flow jumps to step S321.

In step S320, the same processing as in steps S312 to S317 is executed. It is examined in step S321 whether or not there is an effective line through which a CFR signal has not been received yet. If YES, the flow advances to step S322. On the other hand, if NO, the flow jumps to step S326.

It is checked in step S322 if the retrial count is 3 or more. If it is determined in step S322 that the retrial count is less than 3, the flow advances to step S323 to set the line switching circuits 403 and 404 so that the V.21 demodulators 301 and 302 can connect with the effective lines connected to the facsimile apparatuses from which CFR signals have not been received yet. After this, the flow returns to step S320. In contrast to this, if it is determined in step S322 that the retrial count is 3 or more, the flow advances to step S325, and an effective line connected to a facsimile apparatus from which a CFR signal is not received is disconnected. For example, when a CFR signal from the facsimile apparatus 27 is not received via the office line unit 5 and the V.21 demodulator 301, the CPU 10 and the CC section 2 disconnect a facsimile communication and the corresponding line as in step S308.

When the V.21 demodulators 301 and 302 are sequentially connected to the effective lines to execute modem training processing and to wait for reception of CFR signals, a certain effective line, through which a response to a modem training signal is transmitted, may exist although it is not connected to a V.21 demodulator. When a facsimile apparatus connected to such a line transmits a CFR signal, the CFR signal cannot be received, and when a V.21 demodulator is connected to this line later, reception of a CFR signal is waited for. In this case, even when the facsimile apparatus, which has attained successful modem training, receives a modem training signal again after the successful modem training, it considers the second modem training signal as a retried signal based on the G3 protocol, and similarly responds to this signal like in the previous modem training.

In step S326, the CPU 10 controls the line switching circuits, so that the effective lines can be connected to the V.21 demodulators via the switch circuits. For example, assuming that the line between the facsimile apparatus 28 and the office line unit 5 is disconnected, and the facsimile apparatuses connected to the effective lines are updated to the facsimile apparatuses 25 to 27, the CPU 10 switches the line switching circuit 403 to connect the V.21 demodulator 301 and the switch circuit 205, so that the facsimile apparatus 25 can be connected to the V.21 demodulator 301. Also, the CPU 10 switches the line switching circuit 404 to connect the V.21 demodulator 302 and the switch circuit 206.

In step S327, the CPU 10 controls the switch circuits connected to the effective lines to be switched to the facsimile modem 14 side. For example, if the facsimile apparatuses 25 to 27 are connected to the effective lines, the CPU 10 controls the switch circuits 205 to 207, so that the facsimile apparatuses 25 to 27 are connected to the facsimile modem 14 via the switch circuits 205 to 207. In step S328, the facsimile modem 14 transmits a modem training signal, image data, and an RTC signal to the facsimile apparatuses connected to the effective lines under the control of the CPU 10. Furthermore, in step S329, the facsimile modem 14 transmits an EOP signal to the facsimile apparatuses as broadcasting destinations connected to the effective lines.

In step S330, the CPU 10 controls the switch circuits connected to the effective lines to be switched to the sides of the line switching circuits like in the processing in step S315. For example, if the facsimile apparatus 25 is connected to an effective line, the CPU 10 controls the switch circuit 205 connected to the facsimile apparatus 25 to be switched to the line switching circuit side, so that the facsimile apparatus 25 is connected to the line switching circuit 403 or 404. In this manner, the facsimile apparatus 25 is connected to a V.21 demodulator via the switch circuit and the line switching circuit. The same applies to other effective lines. As a result, for example, the facsimile apparatus 25 is connected to the V.21 demodulator 301, and the facsimile apparatus 26 is connected to the V.21 demodulator 302.

In steps S331 and S332, the CPU 10 waits for MCF signals from the facsimile apparatuses 25 and 26 via the V.21 demodulators, and monitors the wait time.

In step S333, it is checked if an effective line from which an MCF signal has not been received yet remains. If such a line is found, the flow advances to step S334, and the CPU 10 controls a line switching circuit, so that the line from which no MCF signal is received yet is connected to a V.21 demodulator via a switch circuit. For example, if no CFR signal is received yet from the effective line connected to the facsimile apparatus 27, the CPU 10 switches the switch circuit 207 and the line switching circuit 403 to connect the facsimile apparatus 27 and the V.21 demodulator 301.

In step S335, the same processing as in steps S327, S329 to S332 is executed. It is examined in step S336 whether or not there is an effective line through which a MCF signal has not been received yet. If NO, the flow jumps to step S341. If YES, the flow advances to step S337. Furthermore, it is checked in step S337 if the retrial count is 3 or more. If it is determined in step S337 that the retrial count is less than 3, the flow advances to step S338 to set the line switching circuits 403 and 404 so that the V.21 demodulators 301 and 302 can connect with the effective lines connected to the apparatuses from which the MCF signals have not been received yet. After this, the flow returns to step S335. However, if it is determined that the retrial count is 3 or more, the flow advances to step S341.

When the V.21 demodulators 301 and 302 are sequentially connected to effective lines to transmit EOP signals and to receive MCF signals, the facsimile modem 14 may transmit an EOP signal to a certain effective line, which is not connected to a V.21 demodulator. Even when a facsimile apparatus connected to such a line transmits an MCF signal, the MCF signal cannot be received. Thus, when the line is connected to a V.21 demodulator later, an EOP signal is transmitted, and the control waits for reception of an MCF signal again. In this case, even when the facsimile apparatus, which transmitted the MCF signal, receives an EOP signal again after it transmitted the MCF signal based on the G3 protocol, it regards the second EOP signal as retrial processing, and similarly responds to the EOP signal as in the previous EOP signal reception.

In step S341, the CPU 10 controls the switch circuits connected to the effective lines to be switched to the facsimile modem 14 side as in step S327. For example, if the lines connected to the facsimile apparatuses 25 to 27 are effective lines, the facsimile apparatuses 25 to 27 are connected to the facsimile modem 14 via the switch circuits 205 to 207. Thereafter, the CPU 10 executes processing in steps S224, S225, and S125, and ends a series of operations.

Therefore, according to this embodiment, control signals from four facsimile apparatuses as broadcasting destinations can be received by the two V.21 demodulators by switching the facsimile apparatuses as broadcasting destinations to be connected to the two V.21 demodulators using the two V.21 demodulators and the two line switching circuits.

Thus, since the control signals from the facsimile apparatuses as broadcasting destinations can be received using the V.21 demodulators fewer than the facsimile apparatuses as broadcasting destinations, the apparatus production cost can be further reduced as compared to the second embodiment.

[Fourth Embodiment (FIG. 7)]

In this embodiment, a case wherein image is re-transmitted to a facsimile apparatus as a broadcasting destination to which a facsimile data broadcasting communication could not be normally completed in a series of sequences described in the first to third embodiments, in particular, a case wherein image data is re-transmitted to a facsimile apparatus for which a facsimile communication is interrupted by disconnecting a communication line due to unsuccessful modem training, and a case wherein image data is re-transmitted to a facsimile apparatus as a broadcasting destination to which image data could not be normally transmitted although it was transmitted, will be described below.

In this embodiment, a case will be exemplified below with reference to the flow chart shown in FIG. 7 wherein the apparatus described in the first embodiment re-transmits image data. In the following description, assume that the processing shown in FIGS. 2A to 2C has been completed, and thereafter, re-transmission processing is executed.

After the broadcasting transmission processing in steps S101 to S125 shown in step S401, it is checked in step S402 if there is a facsimile apparatus as a broadcasting destination for which a facsimile communication is interrupted by disconnecting a line connected to the facsimile apparatus from which a CFR signal could not be received due to unsuccessful modem training. If NO in step S402, the flow advances to step S403; otherwise, the flow jumps to step S404.

It is checked in step S403 if there is a facsimile apparatus which did not send back an MCF signal in response to a transmitted EOP signal, and to which image data could not be normally transmitted. If NO in step S403, the processing is ended without executing re-transmission processing. However, if YES in step S403, the flow advances to step S404.

It is checked in step S404 if a further fallback operation of an image data communication rate can be performed. If NO in step S404, the processing is ended. However, if YES in step S404, the flow advances to step S405 to fall back the image data communication rate by one step. For example, when a transmission is unsuccessfully terminated at a communication rate of 9,600 bps, the communication rate is fallen back to 7,200 bps.

In step S406, the facsimile data broadcasting communication processing is executed for the corresponding facsimile apparatus as a broadcasting destination for which a facsimile communication is interrupted, or the facsimile apparatus to which image data could not be normally transmitted in accordance with the sequence in steps S101 to S125 at the fallen-back image data communication rate. Thereafter, the flow returns to step S402 to check if the facsimile data broadcasting communication processing executed in step S406 is successful.

In this manner, broadcasting processing for all facsimile apparatuses as broadcasting destinations is completed, or broadcasting re-transmission processing of image data is continued until the image data communication rate can no longer be fallen back.

Therefore, according to this embodiment, even when image data transmission processing is unsuccessfully terminated in the first facsimile data broadcasting communication, the facsimile data broadcasting communication can be restarted at a fallen-back image data communication rate. Therefore, the successful re-transmission rate can be improved. Also, since concurrent broadcasting processing is executed in re-transmission, good transmission efficiency can be expected.

This can contribute to improvement of communication efficiency, a decrease in communication time, and reduction of communication cost as a whole.

In this embodiment, re-transmission processing for the first embodiment has been described. The same processing can be executed after the broadcasting processing described in the second and third embodiments, as a matter of course.

In a facsimile communication in each of the first to fourth embodiments, completion of modem training or completion of image data transmission is confirmed by confirming reception of a CFR or MCF signal according to the G3 protocol. However, the present invention is not limited to this. For example, the same facsimile data concurrent broadcasting operation can be executed by identifying an FTT signal, a DTC signal, an RTP signal, an RTN signal, and the like as other control signals.

Figure 8:
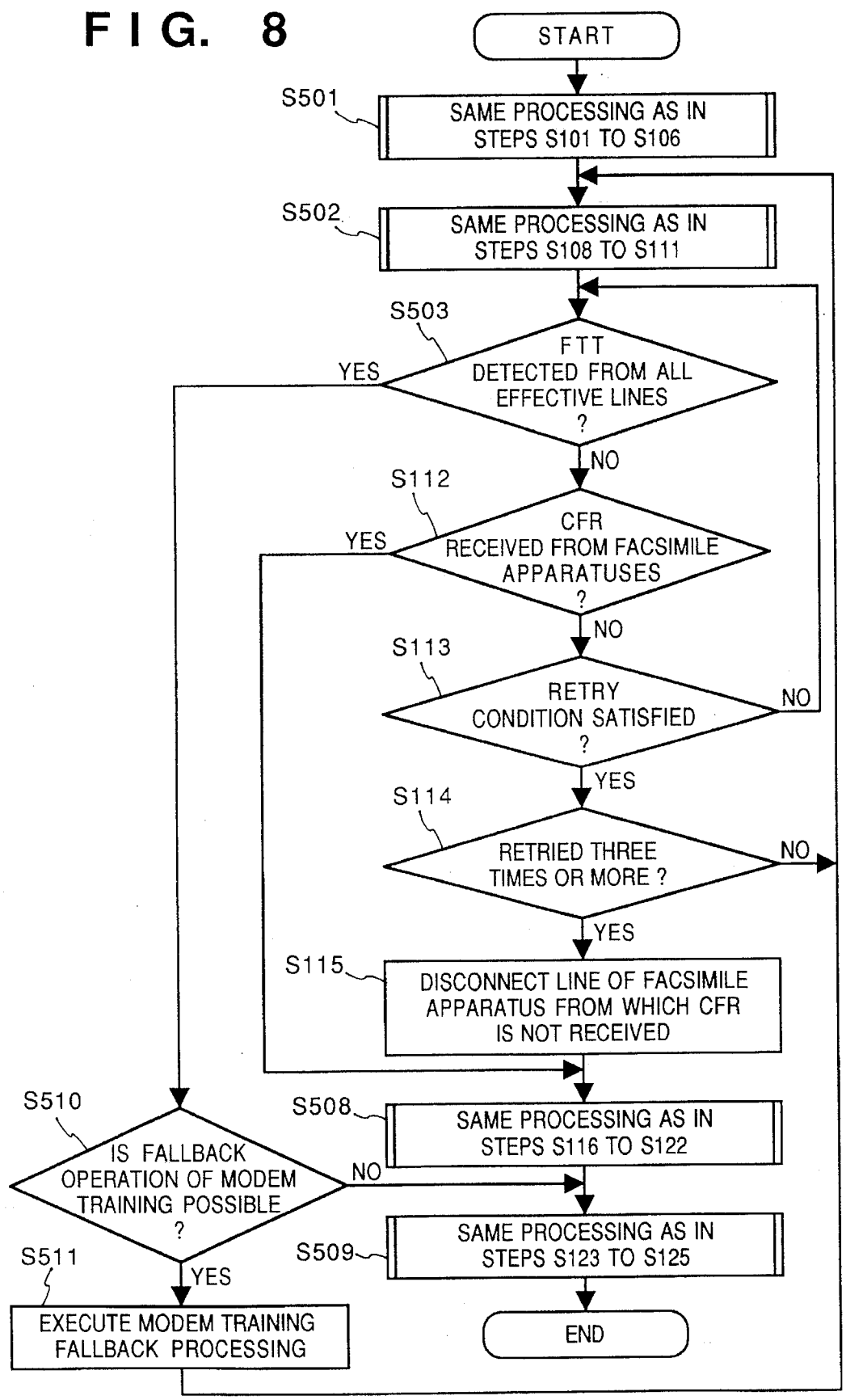
FIG. 8 is a flow chart showing a re-transmission operation of a facsimile data broadcasting communication by modem training fallback processing.

FIG. 8 is a flow chart showing processing for checking reception of FTT signals from all effective lines and executing a fallback operation of modem training so as to determine whether or not a line connected to a facsimile apparatus is to be disconnected in place of determining by confirming reception of CFR signals whether or not a line connected to a facsimile apparatus is to be disconnected.

With this processing, in steps S501 and S502, the same processing as in steps S101 to S111 is executed, and thereafter, it is checked in step S503 if FTT signals are detected from all effective lines. In this case, if a signal other than the FTT signal or no signal is detected from at least one of the effective lines, the same processing as in steps S112 to S115 is executed. Until a retry condition is satisfied in step S113, the flow returns to step S503 to monitor whether or not FTT signals are detected from all the effective lines.

In contrast to this, if FTT signals are detected from all the effective lines, the flow advances to step S510 to check if a fallback operation of the modem training communication rate can be performed. If NO in step S510, the flow advances to step S509 to execute the same processing as in steps S123 to S125, and a series of operations are ended. In contrast to this, if YES in step S510, the flow advances to step S511 to fall back the communication rate by one step. For example, when modem training at a communication rate of 9,600 bps is unsuccessfully terminated, the communication rate is fallen back to 7,200 bps. Thereafter, the processing in step S502 is executed at the fallen-back communication rate. A facsimile communication at the fallen-back communication rate is called a communication according to the Quasi-normal procedure.

In this manner, when all the effective lines are under the same condition (i.e., FTT signals are received from all the effective lines), the fallback operation of the modem training communication rate can be performed, and the facsimile communication according to the Quasi-normal procedure or processing for an abnormal state can be concurrently executed. Thus, a fallback operation can be attained without disconnecting a facsimile communication, and the communication time and communication cost can be reduced as a whole. Note that the processing shown in FIG. 8 is additional processing based on the first embodiment. The same processing can be added to the second and third embodiments, as a matter of course.

[Fifth Embodiment (FIGS. 9 to 10C)]

Figure 9:
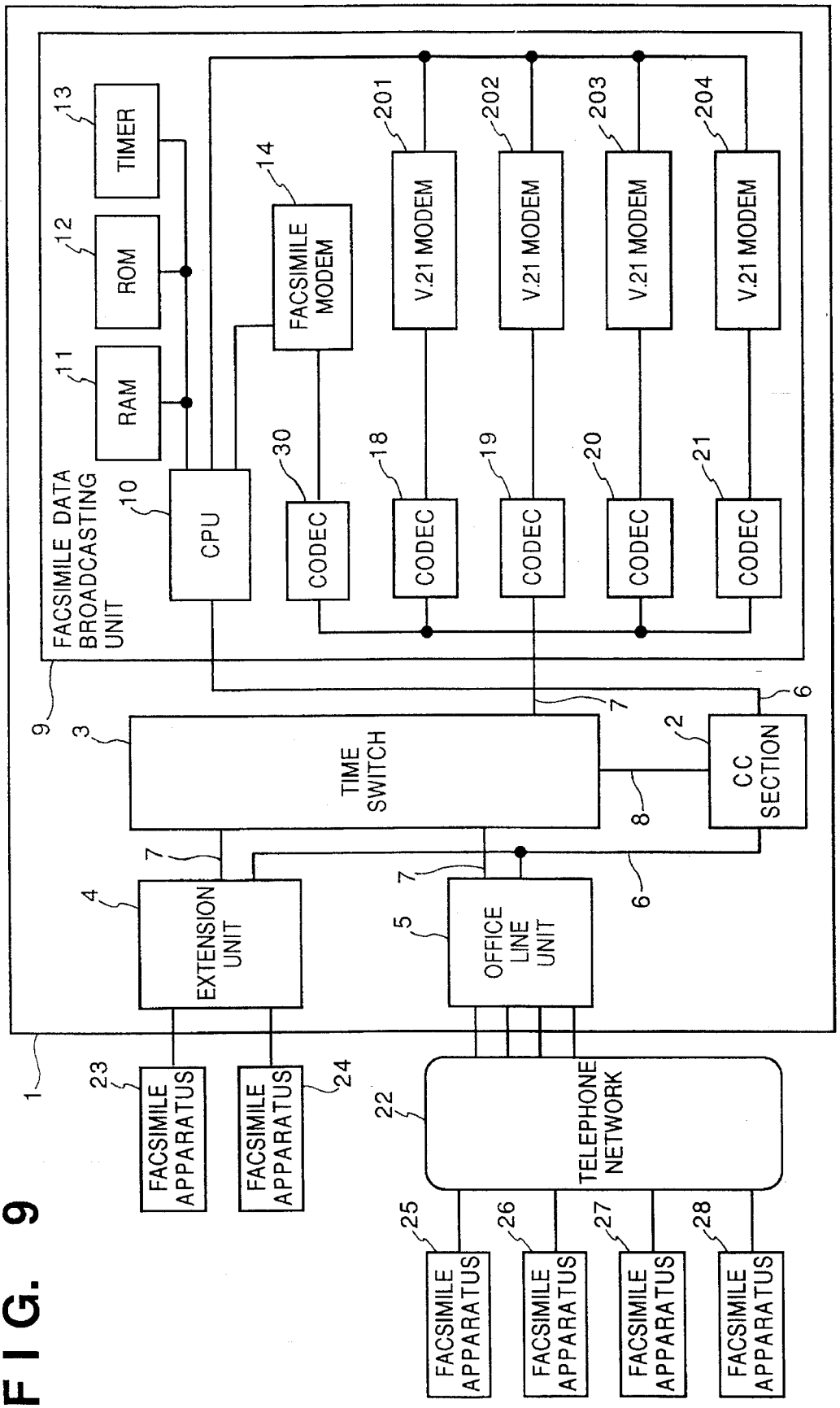
FIG. 9 is a block diagram showing an arrangement of a telephone exchange apparatus capable of executing a facsimile data broadcasting transmission according to a fifth embodiment of the present invention.

FIG. 9 is a block diagram showing an arrangement of a telephone exchange apparatus integrating a facsimile data broadcasting facility according to this embodiment. Since the arrangement of the apparatus of this embodiment is substantially the same as that of the apparatus described in the first embodiment (see FIG. 1), except that the switch circuits 205 to 208 are omitted, and a CODEC 30 for dedicatedly connecting the facsimile modem 14 is added, the same reference numerals denote the same parts as in FIG. 1, and a detailed description thereof will be omitted.

One important feature of this embodiment is to connect facsimile apparatuses as broadcasting destinations to the facsimile modem upon transmission of image data to the facsimile apparatuses as broadcasting destinations and to connect the facsimile apparatuses as broadcasting destinations to the V.21 modems by utilizing a line exchange facility of the telephone exchange apparatus without using any special switch circuits.

The same facsimile data broadcasting transmission processing as in the first embodiment will be examined below. In the following description, only the characteristic features of this embodiment will be explained, and a description common to the first embodiment will be omitted.

In image transmission processing from the facsimile apparatus 23 to the broadcasting unit 9 according to this embodiment, the facsimile apparatus 23 is connected to the facsimile modem 14 via the CODEC 30. The CC section 2 informs this connection to the CPU 10 via the control line 6, and also informs to the extension unit 4 that a call generated by the facsimile apparatus 23 has reached the called party.

Figure 10A:
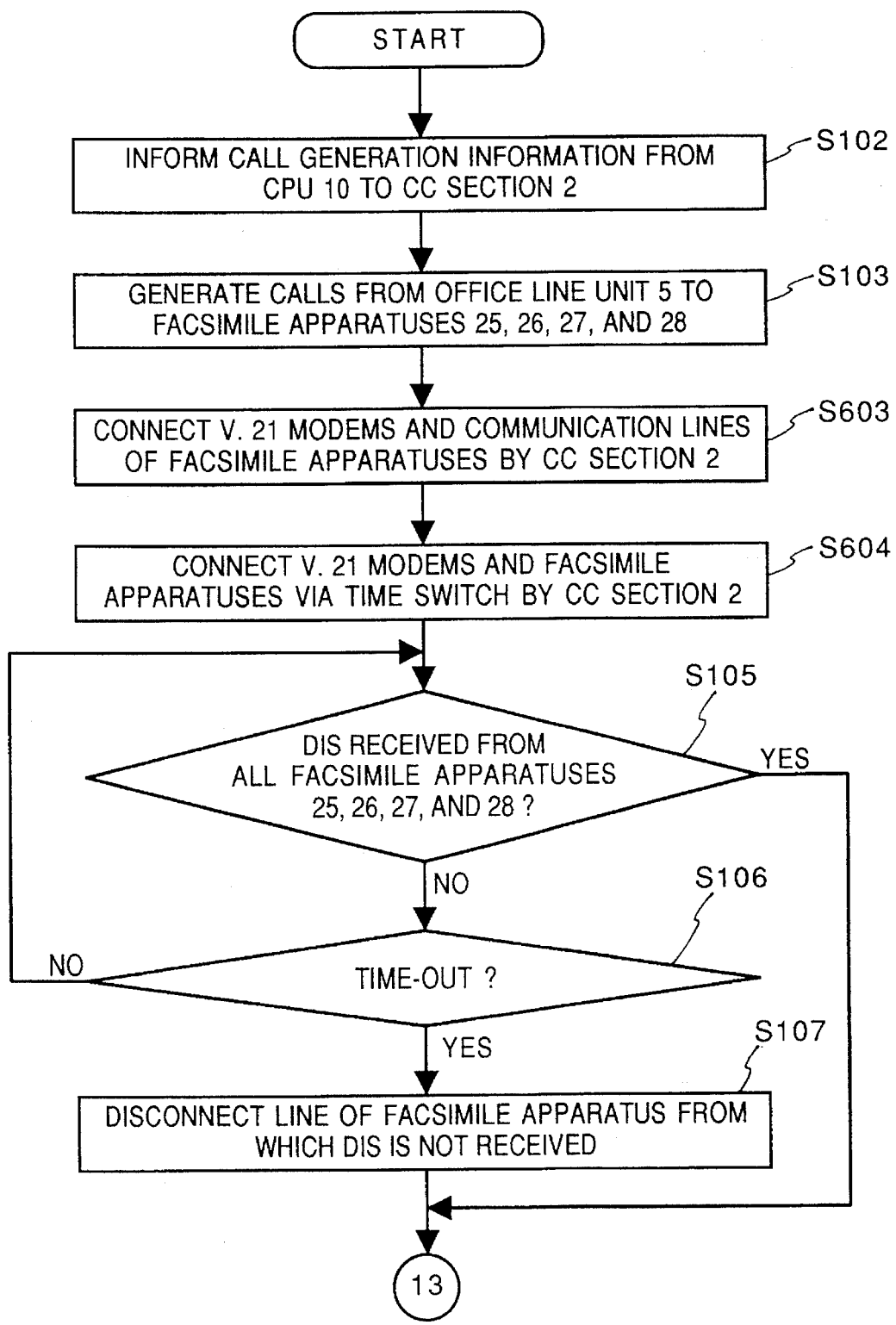
Figure 10B:
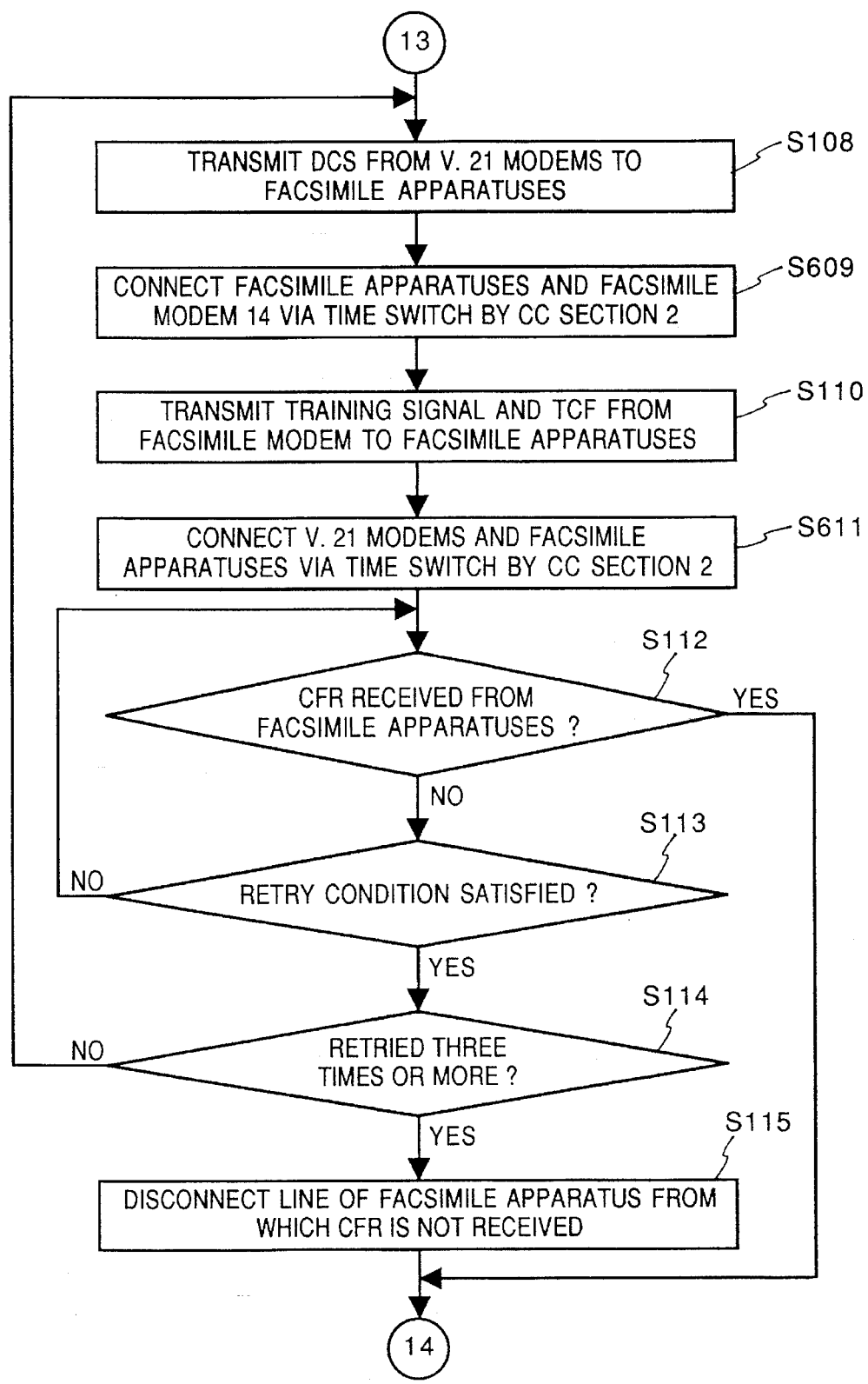

Operations executed when stored image data is concurrently broadcasted from the broadcasting unit 9 to the facsimile apparatuses 25 to 28 will be described below with reference to the flow charts shown in FIGS. 10A to 10C. Note that image data to be broadcasted has an amount corresponding to one page. In the following description, only processing steps as the characteristic features of this embodiment will be explained. The same processing steps as those described in the above embodiments will be referred to using the same step reference numbers, and a detailed description thereof will be omitted.

After processing in steps S102 and S103, in step S603, the CC section 2 controls the office line unit 5 to process responses from the telephone network 22 after calls are generated in units of telephone lines to be called, and informs response information from the telephone network 22 and completion of connection of communication lines to the CPU 10. In step S604, the CC section 2 controls the time switch 3 via the control line 8 to connect time slots (not shown) of the PCM highway 7 corresponding to the telephone lines of the office line unit 5 to time slots of the PCM highway corresponding to the CODECs 18 to 21 connected to the V.21 modems 201 to 204 using a PCM data exchange facility of the time switch 3.

For example, the CC section 2 controls the time switch 3, so that PCM data, which is input from the time slot of the PCM highway 7 corresponding to the telephone line, connected to the facsimile apparatus 25, of the office line unit 5 to the time switch 3, is output from the time switch 3 to the time slot of the PCM highway 7 corresponding to the CODEC 18. Conversely, the CC section 2 controls the time switch 3, so that PCM data, which is input from the time slot of the PCM highway 7 corresponding to the CODEC 18 to the time switch 3, is output from the time switch 3 to the time slot of the PCM highway 7 corresponding to the telephone line, connected to the facsimile apparatus 25, of the office line unit 5. When the time switch 3 is controlled in this manner, communications of modem signals between the facsimile apparatus 25 and the V.21 modem 201 are enabled. Similarly, the time slots are connected between the facsimile apparatuses 26 to 28 and the V.21 modems 202 to 204 to enable communications of modem signals.

In steps S105 to S107, the control waits for DIS signals received from the facsimile apparatuses 25 to 28, monitors the wait time, and disconnects a line connected to a facsimile apparatus from which a DIS signal is not received. In step S108, the V.21 modems transmit DCS signals to the facsimile apparatuses via the effective lines.

In step S609, the CPU 10 informs line connection information for controlling the time switch 3 to the CC section 2 via the control line 6. Upon reception of this information, the CC section 2 controls the time switch 3 via the control line 8 to connect the time slots of the PCM highway 7 corresponding to the telephone lines, connected to the effective lines, of the office line unit 5 to the time slot of the PCM highway corresponding to the CODEC 30 connected to the facsimile modem 14 by utilizing the PCM data exchange facility of the time switch 3.

For example, the CC section 2 controls the time switch 3, so that PCM data input to the time switch 3 from the time slot of the PCM highway 7 corresponding to the CODEC 30 is output from the time switch 3 to the time slots of the PCM highway 7 corresponding to the telephone lines, connected to the effective lines, of the office line unit 5. With this control, if the telephone line connected to the facsimile apparatus 25 is an effective line, PCM data from the CODED 30 is output to the time slot corresponding to this telephone line. The same processing is performed for other effective lines. In this manner, modem signals from the facsimile modem 14 can be transmitted to the facsimile apparatuses as broadcasting destinations connected to the effective lines.

With processing in step S110, a modem training signal and a TCF signal are concurrently transmitted to all the facsimile apparatuses as broadcast destinations connected to the effective lines.

In step S611, the CPU 10 informs line connection information for controlling the time switch 3 to the CC section 2 via the control line 6. Upon reception of this information, the CC section 2 controls the time switch 3 as in the processing in step S604 to connect the facsimile apparatus as broadcasting destinations connected to the effective lines to the V.21 modems. For example, if the line connected to the facsimile apparatus 25 is an effective line, the CC section 2 controls the time switch 3 to connect the facsimile apparatus 25 to the V.21 modem 201 via the office line unit 5, the time switch 3, and the CODEC 18 so as to exchange PCM data on the time slot. The same processing is performed for other effective lines.

Thereafter, the CPU 10 monitors CFR signals sent from the facsimile apparatuses to execute processing in steps S112 to S115.

In step S616, the CPU 10 informs line connection information for controlling the time switch 3 to the CC section 2 via the control line 6. Upon reception of this information, the CC section 2 controls the time switch 3 as in the processing in step S109 to connect the facsimile apparatuses connected to the effective lines to the facsimile modem 14. After a modem training signal, image data, and an RTC signal are transmitted in step S117, the CPU 10 informs line connection information for controlling the time switch 3 to the CC section 2 via the control line 6 in step S618. Upon reception of this information, the CC section 2 controls the time switch 3 as in the processing in step S611 to connect the facsimile apparatuses connected to the effective lines to the V.21 modems.

Processing in steps S119 to S125 is the same as that in the first embodiment.

Therefore, according to this embodiment, connections between the facsimile apparatuses and the facsimile modem or the V.21 modems can be switched by utilizing the line exchange facility without using any special switch circuits. Since the switch circuits can be omitted, the apparatus production cost can be greatly reduced as compared to the first embodiment. Also, since the number of parts to be mounted can be decreased due to omission of the switch circuits, the reliability of the apparatus can be improved, and the assembling time can be shortened.

Figure 12A:
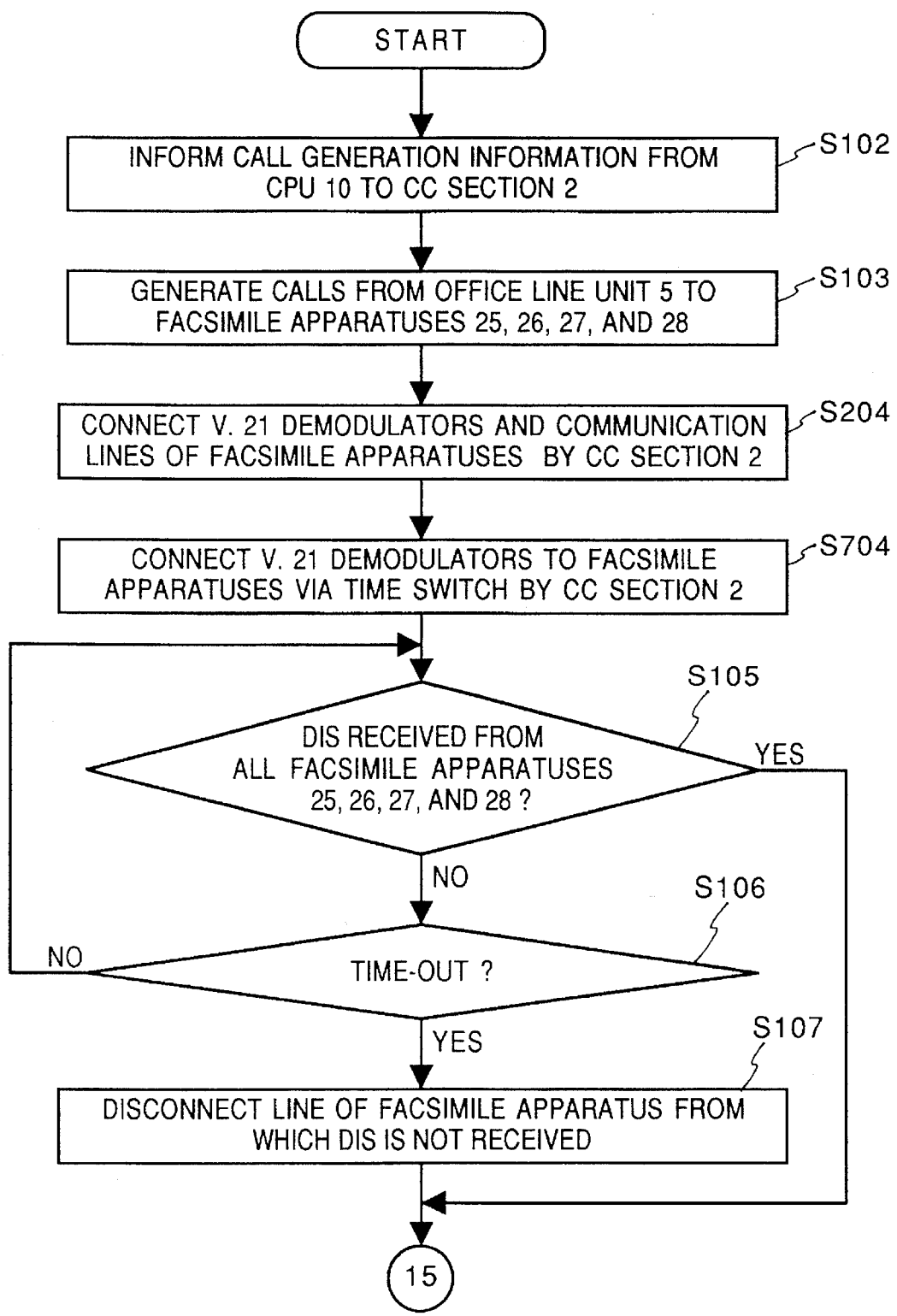
FIGS. 12A, 12B, 12C, and 12D are flow charts showing facsimile data broadcasting communication operations according to the sixth embodiment.
Figure 12B:
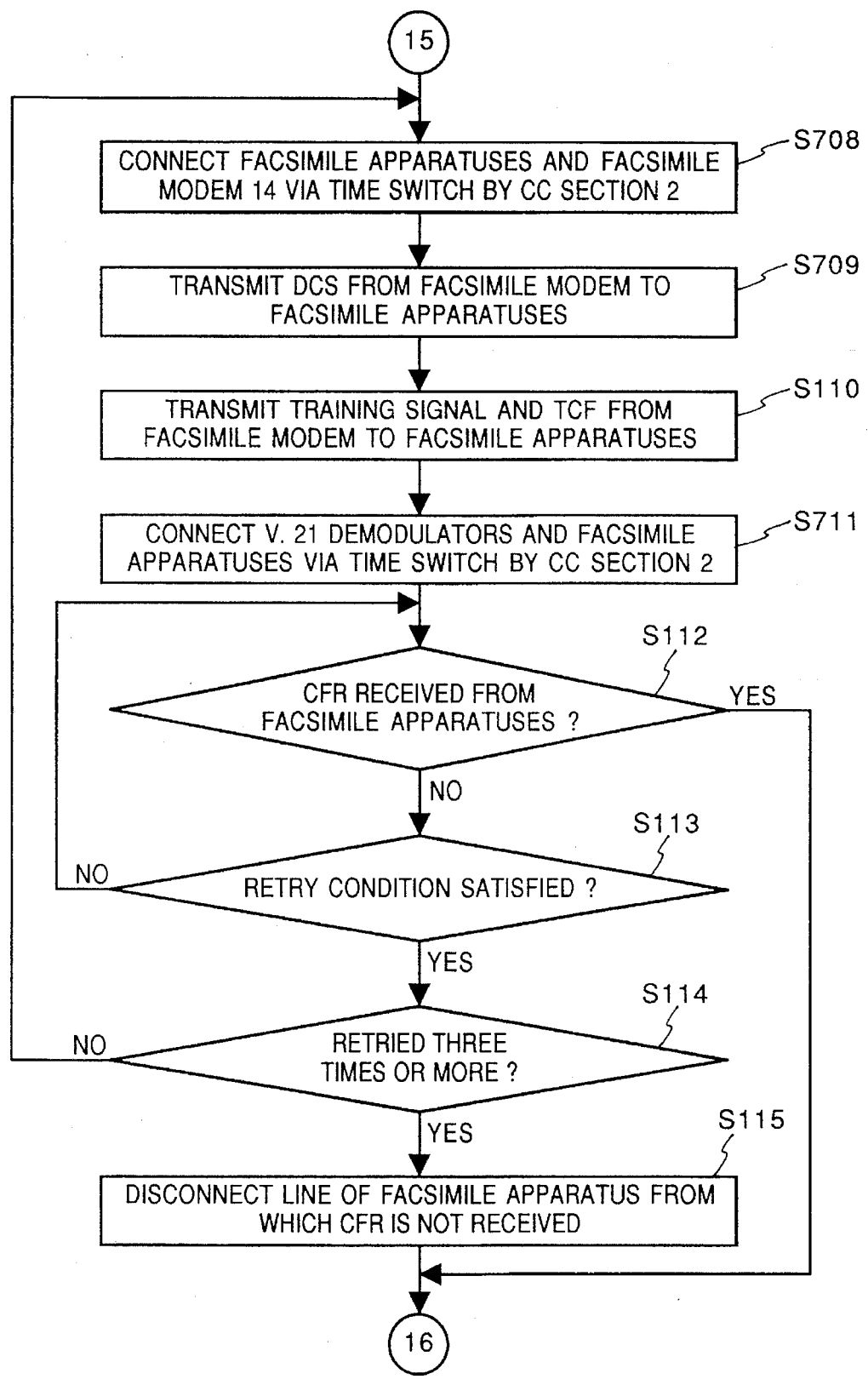
Figure 12C:
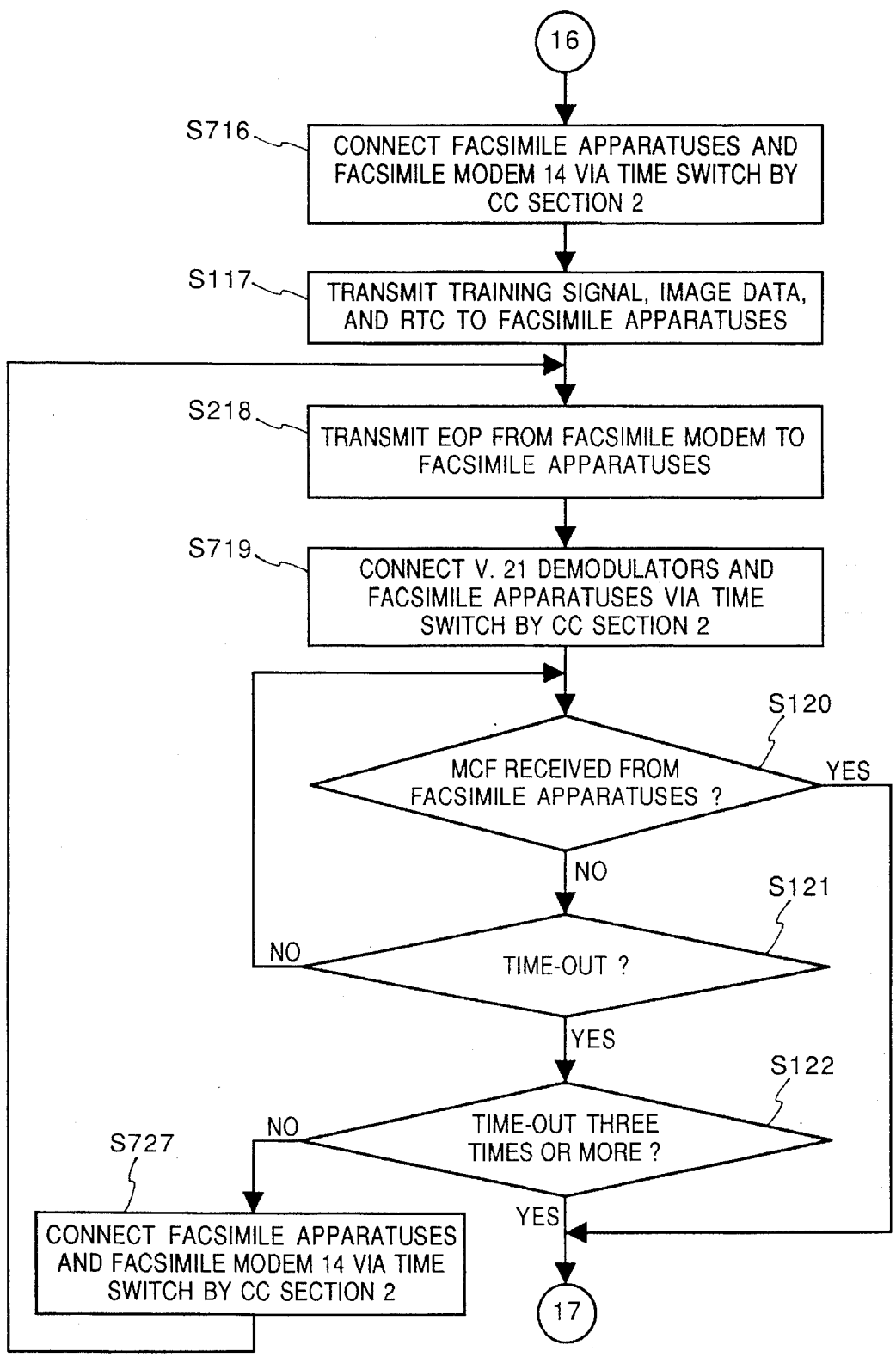
Figure 12D:
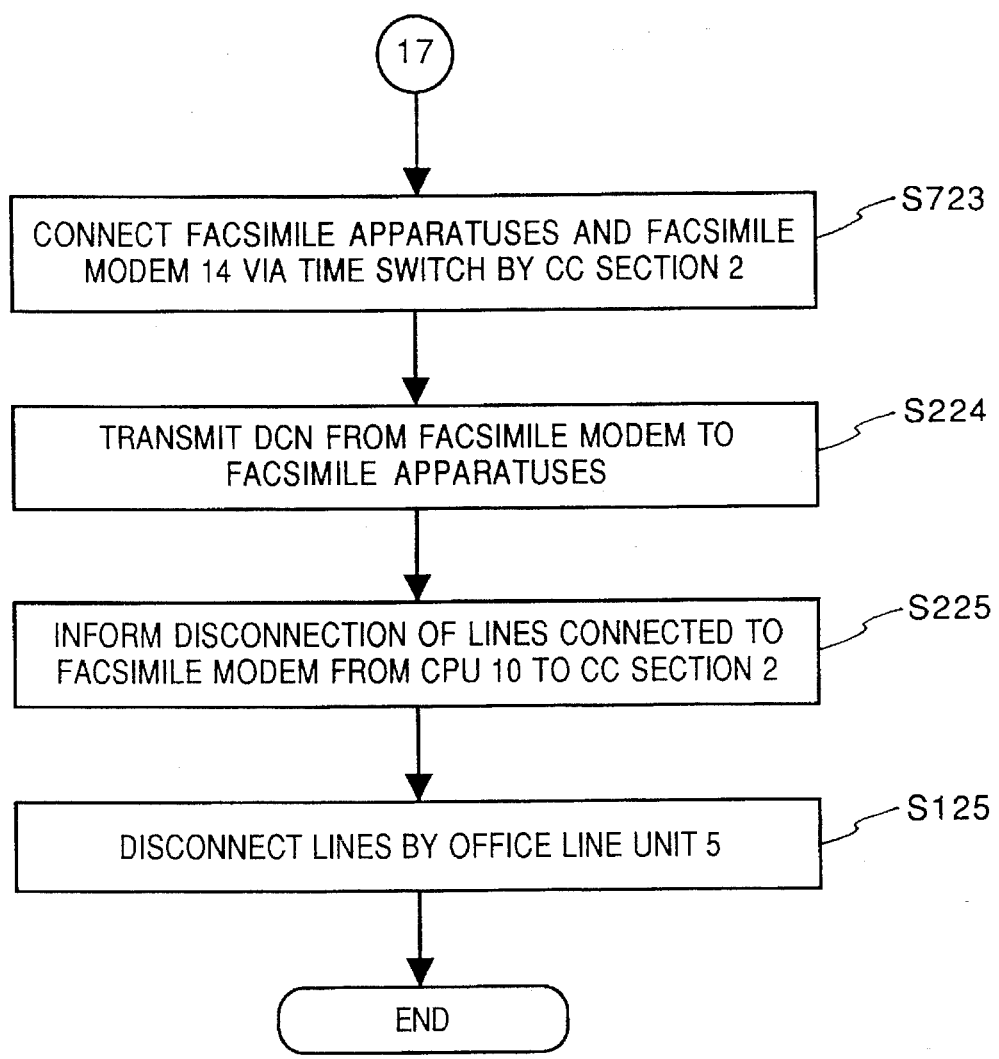

[Sixth Embodiment (FIGS. 11 to 12D)]

FIG. 11 is a block diagram showing an arrangement of a telephone exchange apparatus integrating a facsimile data broadcasting facility according to this embodiment. Since the arrangement of the apparatus of this embodiment is substantially the same as that of the apparatus described in the second embodiment (see FIG. 3), except that the switch circuits 205 to 208 are omitted, and a CODEC 30 for dedicatedly connecting the facsimile modem 14 is added, the same reference numerals denote the same parts as in the second embodiment, and a detailed description thereof will be omitted.

One important feature of this embodiment to switch connections between facsimile apparatuses and the facsimile modem or the V.21 demodulators by utilizing the line exchange facility of the telephone exchange apparatus without using any special switch circuits. Thus, when image data and control signals are to be transmitted, the facsimile apparatuses and the facsimile modem are connected to each other, while when control signals are received, the facsimile apparatuses and the V.21 demodulators are connected to each other.

The same facsimile data broadcasting transmission processing as in the second and fifth embodiments will be examined below. In the following description, only the characteristic features of this embodiment will be described, and a description common to the second and fifth embodiments will be omitted.

Operations executed when stored image data is concurrently broadcasted from the broadcasting unit 9 to the facsimile apparatuses 25 to 28 will be described below with reference to the flow charts shown in FIGS. 12A to 12D. Note that image data to be broadcasted has an amount corresponding to one page as well. In the following description, only processing steps as the characteristic features of this embodiment will be explained. The same processing steps as those described in the above embodiments will be referred to using the same step reference numbers, and a detailed description thereof will be omitted.

After processing in steps S102 to S103 and S204, in step S704, the CC section 2 controls the time switch 3 via the control line 8 to connect time slots of the PCM highway corresponding to telephone lines, connected to the facsimile apparatuses 25 to 28, of the office line unit 5 to time slots of the PCM highway corresponding to the CODECs 18 to 21 connected to the V.21 demodulators 301 to 304 by utilizing a PCM data exchange facility of the time switch 3.

For example, the CC section 2 controls the time switch 3, so that PCM data, which is input from the time slot of the PCM highway 7 corresponding to the telephone line, connected to the facsimile apparatus 25, of the office line unit to the time switch 3, is output from the time switch 3 to the time slot of the PCM highway 7 corresponding to the CODEC 18. When the time switch 3 is controlled in this manner, modem signals can be transmitted from the facsimile apparatus 25 to the V.21 demodulator 301. Similarly, the time slots are connected between the facsimile apparatuses 26 to 28 and the V.21 demodulators 302 to 304 to allow transmission of modem signals.

In steps S105 to S107, the control waits for DIS signals received from the facsimile apparatuses 25 to 28, monitors the wait time, and disconnects a line connected to a facsimile apparatus from which a DIS signal is not received.

In step S708, the CPU 10 informs line connection information for controlling the time switch 3 to the CC section 2 via the control line 6. Upon reception of this information, the CC section 2 controls the time switch 3 via the control line 8 to connect the time slots of the PCM highway 7 corresponding to the telephone lines, connected to the effective lines, of the office line unit 5 to the time slot of the PCM highway corresponding to the CODEC 30 connected to the facsimile modem 14 by utilizing the PCM data exchange facility of the time switch 3.

In step S709, the facsimile modem 14 transmits a DCS signal to the facsimile apparatuses via the effective lines as in step S209. In step S110, a modem training signal and a TCF signal are concurrently transmitted to all the facsimile apparatuses as broadcasting destinations connected to the effective lines.

In step S711, the CPU 10 informs line connection information for controlling the time switch 3 to the CC section 2 via the control line 6. Upon reception of this information, the CC section 2 controls the time switch 3 as in step S604 to connect the facsimile apparatuses as broadcasting destinations connected to the effective lines to the V.21 demodulators. For example, if the line connected to the facsimile apparatus 25 is an effective line, the CC section 2 controls the time switch 3 to connect the facsimile apparatus 25 and the V.21 demodulator 301 via the office line unit 5, the time switch 3, and the CODEC 18 so as to exchange PCM data on the time slot. The same processing is executed for other effective lines.

Thereafter, the CPU 10 monitors CFR signals sent from the facsimile apparatuses to execute processing in steps S112 to S115.

In step S716, the CPU 10 informs line connection information for controlling the time switch 3 to the CC section 2 via the control line 6. Upon reception of this information, the CC section 2 controls the time switch 3 as in step S708 to connect the facsimile apparatuses connected to the effective lines to the facsimile modem 14.

After a modem training signal, image data, an RTC signal, and an EOP signal are transmitted in steps S117 and S218, the CPU 10 informs line connection information for controlling the time switch 3 to the CC section 2 via the control line 6 in step S719. Upon reception of this information, the CC section 2 controls the time switch 3 as in step S711 to connect the facsimile apparatuses connected to the effective lines to the V.21 demodulators.

The CPU 10 monitors MCF signals sent from the facsimile apparatuses via the V.21 demodulators, and executes processing in steps S120 to S122.

If it is determined in step S122 that the time-out count is less than 3, the flow advances to step S727, and the CPU 10 informs line connection information for controlling the time switch 3 to the CC section 2 via the control line 6. Upon reception of this information, the CC section 2 controls the time switch 3 as in step S708 to connect the facsimile apparatuses connected to the effective lines to the facsimile modem 14. Thereafter, the flow returns to step S218, and the facsimile modem 14 re-transmits an EOP signal to the facsimile apparatuses. In contrast to this, if it is determined that the time-out count and the number of times of EOP signal transmission are 3 or more, the flow advances to step S723.

In step S723, the CPU 10 informs line connection information for controlling the time switch 3 to the CC section 2 via the control line 6. Upon reception of this information, the CC section 2 controls the time switch 3 as in step S708 to connect the facsimile apparatuses connected to the effective lines to the facsimile modem 14. Thereafter, steps S224, S225, and S125 are executed, and a series of operations are ended.

Therefore, according to this embodiment, connections between the facsimile apparatuses and the facsimile modem and connections between the facsimile apparatuses and the V.21 demodulators can be switched by utilizing the line exchange facility without using any special switch circuits. As compared to the fifth embodiment, since the modems (V.21 modems) for transmitting/receiving control signals need not be used, apparatus production cost can be further reduced.

In this embodiment, since time-divisional line exchange processing is executed using the time switch, a transmission operation of broadcasting processing from the telephone exchange apparatus to the facsimile apparatuses 25 to 28 is assigned to the facsimile modem 14, and a reception operation thereof is assigned to the V.21 demodulators 301 to 304. Therefore, if one of PCM data highways in the time switch is exclusively assigned to transmission data from the facsimile modem 14, and another PCM data highway is exclusively assigned to reception data from the facsimile apparatuses 25 to 28 in advance (at the beginning of the broadcasting operations, e.g., in steps S704 and S708), the broadcasting operation can be executed even when the same processing to be executed later, i.e., processing in steps S716, S723, and S727, and processing in steps S711 and S719 may be omitted. Thus, unnecessary processing can be omitted, and facsimile data broadcasting processing can be executed more quickly. In such a case as well, the time switch 3 may be controlled upon disconnection of a line so as to change connections between the time slot corresponding to the disconnected line and the time slot corresponding to the facsimile modem 14 or the V.21 demodulators.

[Seventh Embodiment (FIGS. 13 to 14E)]

Figure 13:
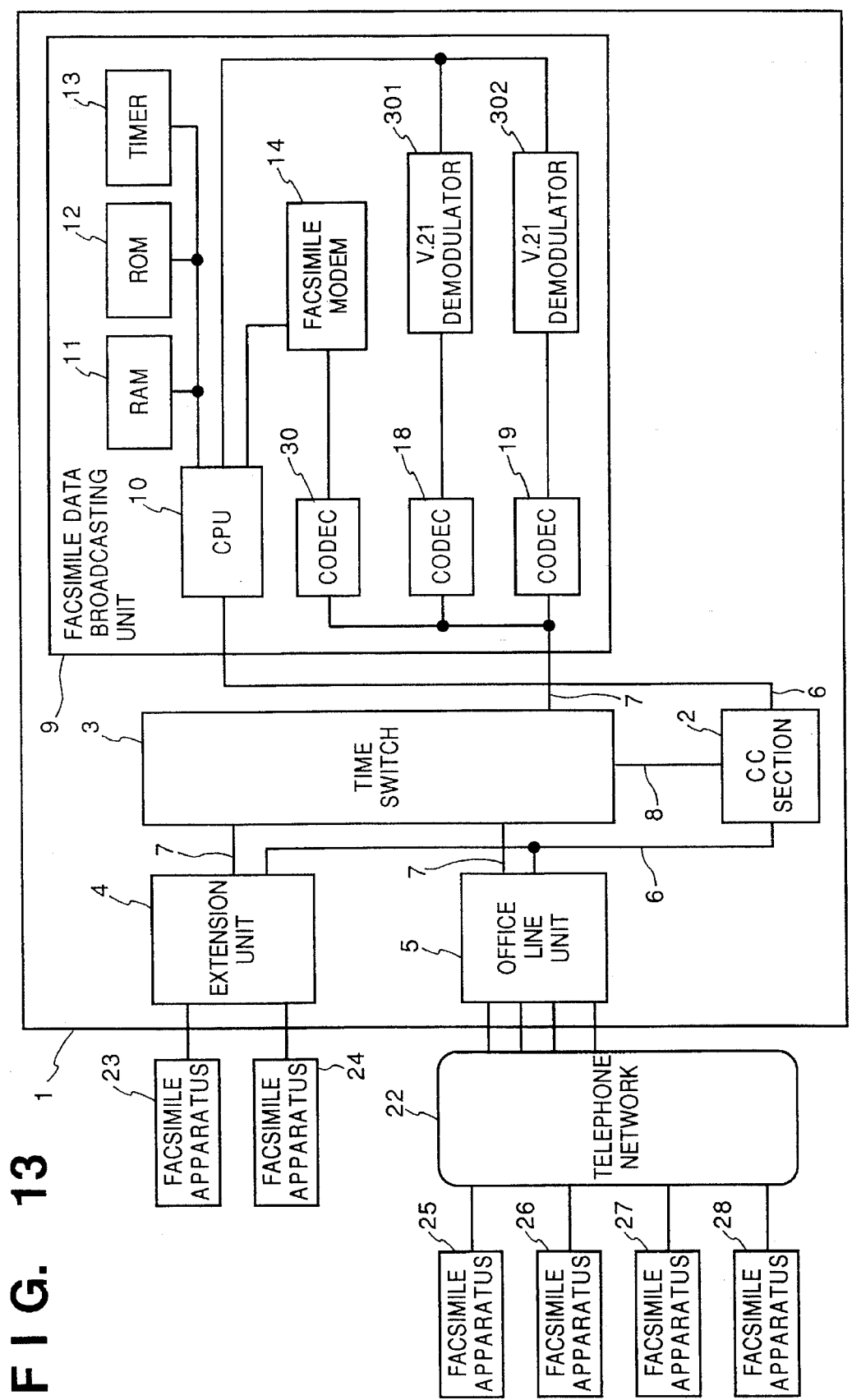
FIG. 13 is a block diagram showing an arrangement of a telephone exchange apparatus capable of executing a facsimile data broadcasting transmission according to a seventh embodiment of the present invention.
Figure 14A:
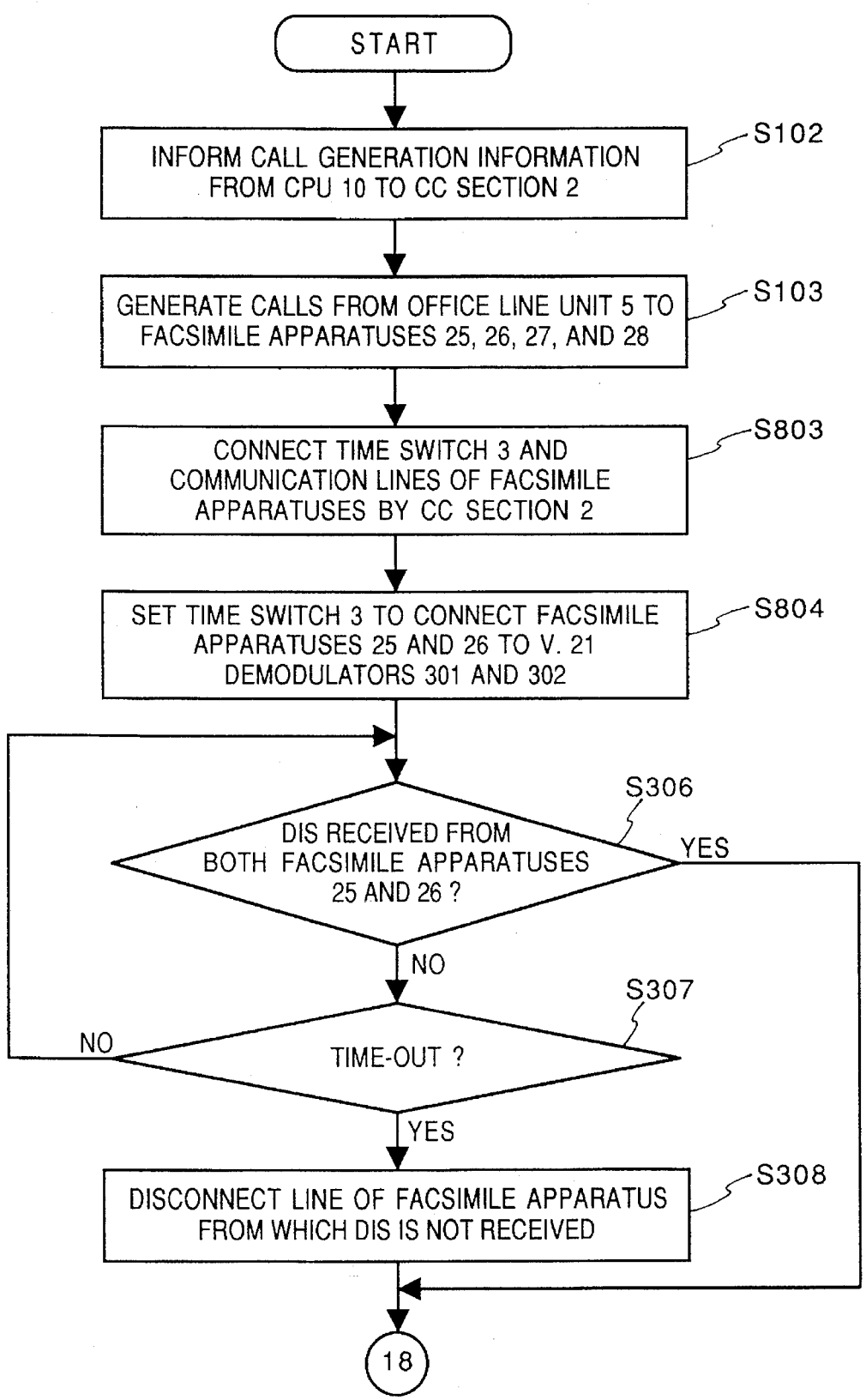
FIGS. 14A, 14B, 14C, 14D, and 14E are flow charts showing facsimile data broadcasting communication operations according to the seventh embodiment.
Figure 14B:
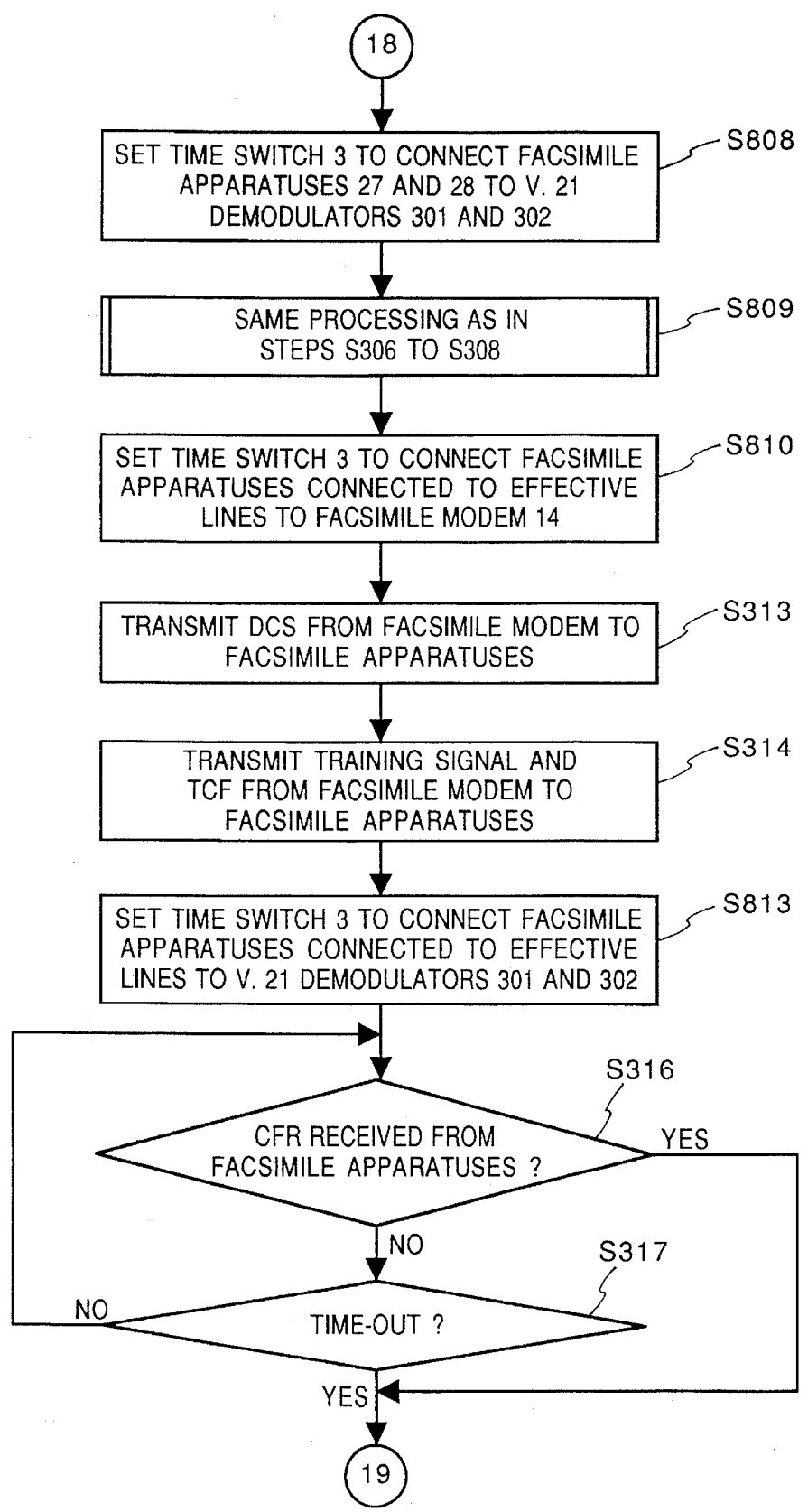
Figure 14C:
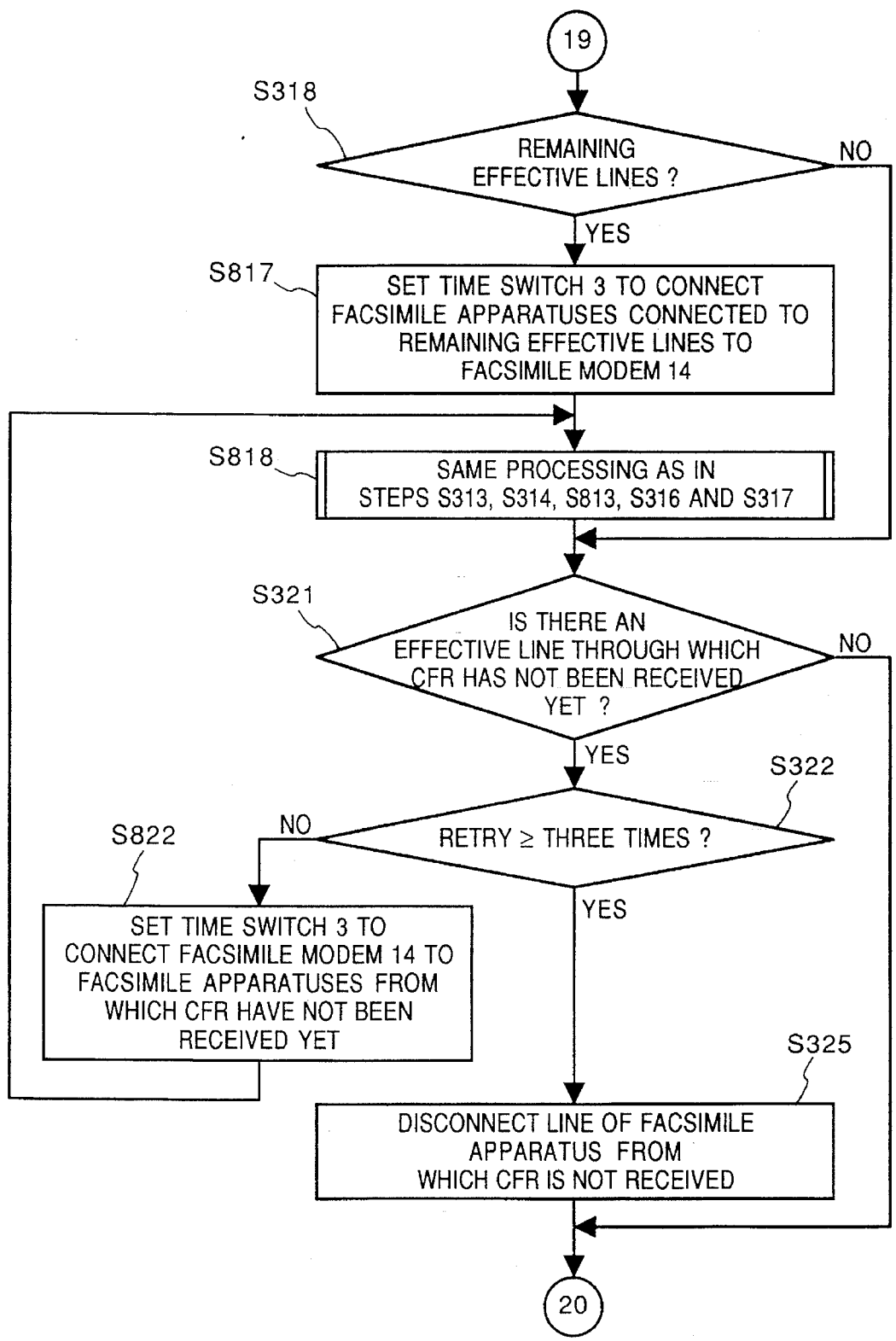
Figure 14D:
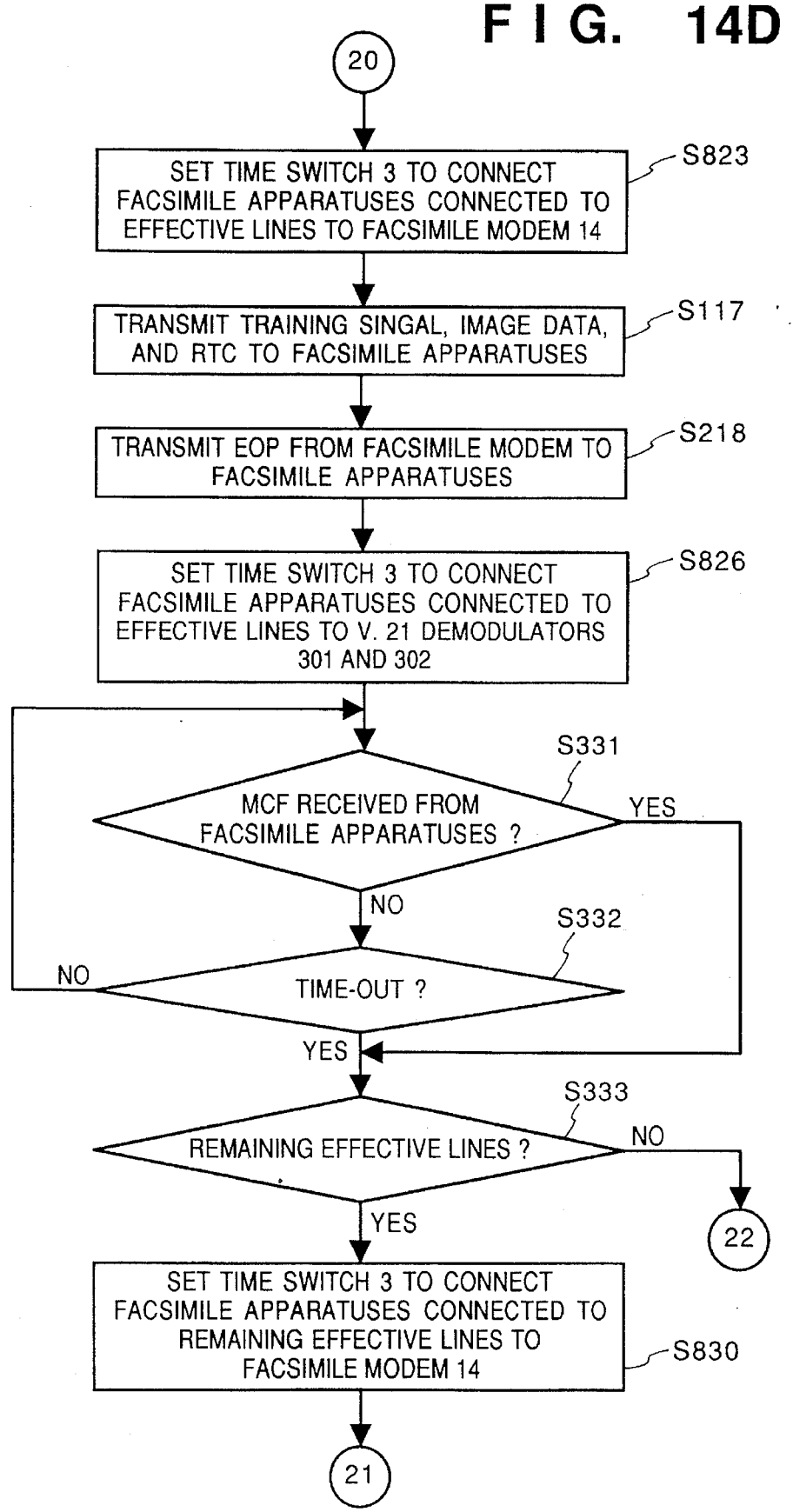
Figure 14E:
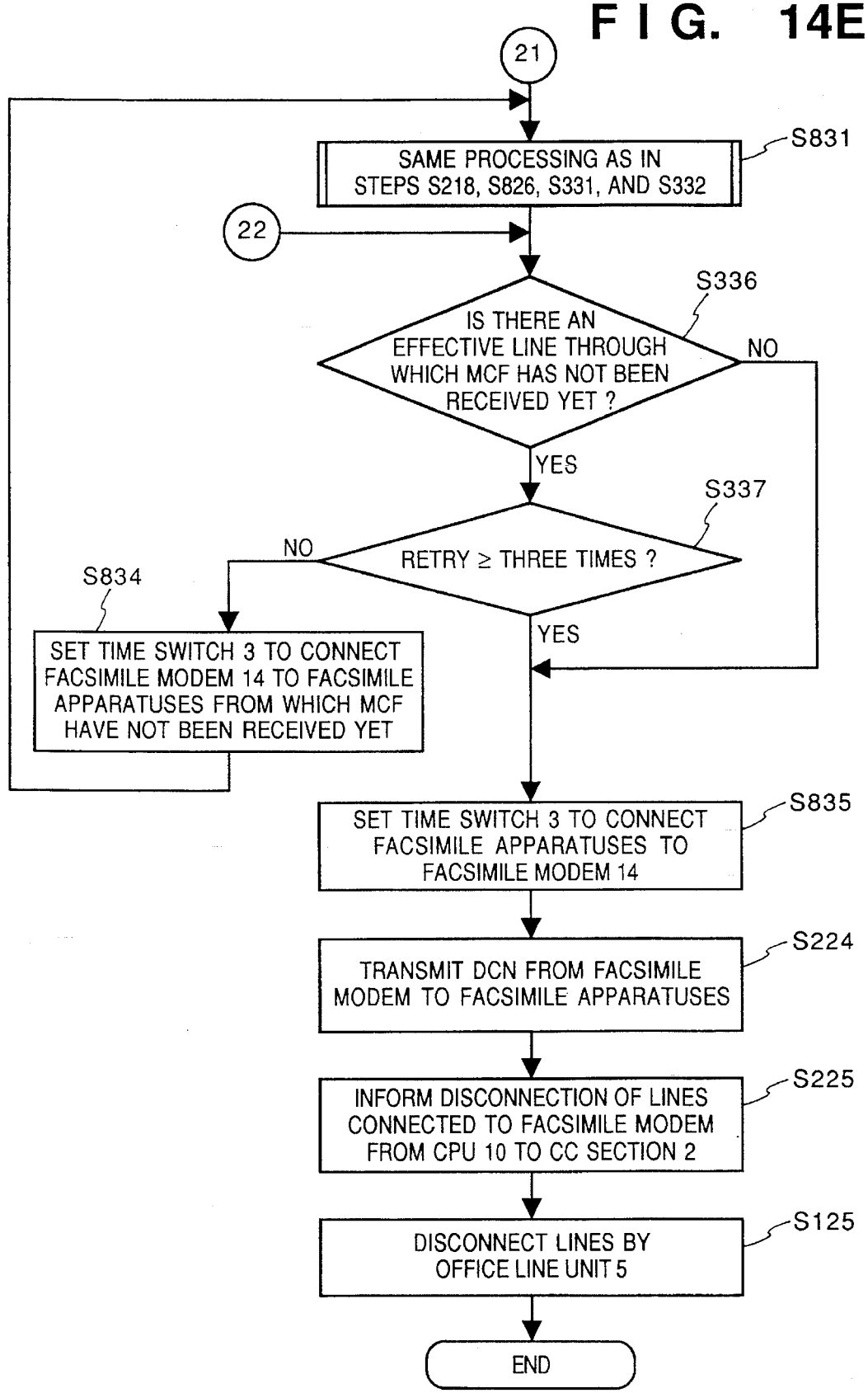

FIG. 13 is a block diagram showing an arrangement of a telephone exchange apparatus integrating a facsimile data broadcasting facility according to this embodiment. Since the arrangement of the apparatus of this embodiment is substantially the same as that of the apparatus described in the sixth embodiment (see FIG. 11), except that the CODECs 20 and 21 and the V.21 demodulators 303 and 304 are omitted, the same reference numerals denote the same parts as in FIG. 11, and a detailed description thereof will be omitted.

One important feature of this embodiment is that connections between facsimile apparatuses as broadcasting destinations and the facsimile modem or V.21 demodulators are switched by utilizing a line exchange facility of the telephone exchange apparatus without using any special switch circuits or line switching circuits, and control signals from the facsimile apparatuses as broadcasting destinations can be received using V.21 demodulators fewer than the facsimile apparatuses as broadcasting destinations.

The same facsimile data broadcasting transmission processing as in the third and sixth embodiments will be examined below. In the following description, only the characteristic features of this embodiment will be described, and a description common to the above-mentioned embodiments will be omitted.

Operations executed when stored image data is concurrently broadcasted from the broadcasting unit 9 to the facsimile apparatuses 25 to 28 will be described below with reference to the flow charts shown in FIGS. 14A to 14E. Note that image data to be broadcasted has an amount corresponding to one page as well. In the following description, only processing steps as the characteristic features of this embodiment will be explained. The same processing steps as those described in the above embodiments will be referred to using the same step reference numbers, and a detailed description thereof will be omitted.

After processing in steps S102 and S103, in step S803, the CC section 2 controls the office line unit 5, via the control line 6, to process responses from the telephone network 22 after calls are generated in units of telephone lines to be called. Furthermore, the CC section 2 informs response information from the telephone network 22 and completion of connection of communication lines to the CPU 10 via the control line 6. In step S804, the CC section 2 controls the time switch 3 via the control line 8 to connect time slots of the PCM highway 7 corresponding to the telephone lines, connected to the facsimile apparatuses 25 and 26, of the office line unit 5 to time slots of the PCM highway corresponding to the CODECs 18 and 19 connected to the V.21 demodulators 301 and 302 by utilizing the PCM data exchange facility of the time switch 3.

With this processing, for example, the facsimile apparatus 25 is allowed to transmit modem signals to the V.21 demodulator 301. Similarly, the time slots are connected between the facsimile apparatus 26 and the V.21 demodulator 302 to allow communications of modem signals.

In steps S306 to S308, the control waits for DIS signals received from the facsimile apparatuses 25 to 28, monitors the wait time, and disconnects a line connected to a facsimile apparatus from which a DIS signal is not received.

In step S808, the CPU 10 informs line connection information for controlling the time switch 3 to the CC section 2 via the control line 6. Upon reception of this information, the CC section 2 controls the time switch 3 via the control line 8 as in step S804 to connect the time slots of the PCM highway 7 corresponding to the telephone lines, connected to the facsimile apparatuses 27 and 28, of the office line unit 5 to the time slots of the PCM highway corresponding to the CODECs 18 and 19 connected to the V.21 demodulators 301 and 302 by utilizing the PCM data exchange facility of the time switch 3. Thereafter, in step S809, the same operations as in steps S306 to S308 are executed for the facsimile apparatuses 27 and 28.

In step S810, the CPU 10 informs line connection information for controlling the time switch 3 to the CC section 2 via the control line 6. Upon reception of this information, the CC section 2 controls the time switch 3 via the control line 8 to connect the time slots of the PCM highway 7 corresponding to the telephone lines, connected to the effective lines, of the office line unit 5 to the time slot of the PCM highway corresponding to the CODEC 30 connected to the facsimile modem 14 by utilizing the PCM data exchange facility of the time switch 3. Thus, modem signals from the facsimile modem 14 can be transmitted to the facsimile apparatuses as broadcasting destinations connected to the effective lines.

After a DCS signal, a modem training signal, and a TCF signal are transmitted from the facsimile modem 14 connected to the effective lines to all the facsimile apparatuses as broadcasting destinations in steps S313 and S314, the CPU 10 informs line connection information for controlling the time switch 3 to the CC section 2 via the control line 6.

Upon reception of this information, the CC section 2 controls the time switch 3 as in step S804 to connect the facsimile apparatuses as broadcasting destinations connected to the effective lines to the V.21 demodulators 301 and 302. For example, if the facsimile apparatus 25 is connected to an effective line, the CC section 2 controls the time switch 3 via the control line 8 to connect the facsimile apparatus 25 to the V.21 demodulator 301 or 302 via the office line unit 5, the time switch 3, and the CODEC 18 or 19 so as to exchange PCM data on the time slot. The same processing is executed for other effective lines.

With processing in steps S316 and S317, the CPU 10 waits for CFR signals received from the facsimile apparatuses 25 and 26 via the V.21 demodulators, and monitors the wait time. If it is determined in step S317 that the timer has reached a time-out state, the flow advances to step S318.

In step S318, it is checked if an effective line from which a CFR signal has not been received yet remains. If such a line is found, the flow advances to step S817, and the CPU 10 informs line connection information for controlling the time switch 3 to the CC section 2 via the control line 6 as in the processing in step S810. Upon reception of this information, the CC section 2 controls the time switch 3 via the control line 8 to connect the facsimile apparatus connected to the effective line from which a CFR signal has not been received yet to the V.21 demodulator 301 or 302 via the CODEC 18 or 19 so as to exchange PCM data on the time slot. For example, if the facsimile apparatus 27 is connected to an effective line, and a CFR signal from the facsimile apparatus 27 has not been received yet, the CC section 2 controls the time switch 3 via the control line 8 to connect the facsimile apparatus 27 to the V.21 demodulator 301 via the office line unit 5, the time switch 3, and the CODEC 18 so as to exchange PCM data on the time slot. The same processing is executed for the facsimile apparatuses connected to the remaining effective lines. In contrast to this, if CFR signals are received from all the effective lines, the flow jumps to step S321.

In step S818, the same processing as in steps S313, S314, S813, S316 and S317 is executed. It is examined in step S321 whether or not there is an effective line through which a CFR signal has not been received yet. If YES, the flow advances to step S322. On the other hand, if NO, the flow jumps to step S326.

It is further checked in step S322 if the retrial count is 3 or more. If it is determined in step S322 that the retrial count is less than 3, the flow advances to step S822 to set the time switch 3 so that the facsimile modem 14 can connect with the effective lines connected to the facsimile apparatuses from which the CFR signals have not received yet. After this, the flow returns to step S818. However, if it is determined in step S320 that the retrial count is 3 or more, the flow advances to step S325, and the effective line connected to the facsimile apparatus from which a CFR signal is not received is disconnected. For example, when a CFR signal from the facsimile apparatus 27 is not received via the office line unit 5 and the V.21 demodulator 301 or 302, the CPU 10 and the CC section 2 interrupt the corresponding facsimile communication and disconnect the corresponding line as in step S308.

In step S823, the CPU 10 informs line connection information for controlling the time switch 3 to the CC section 2 via the control line 6 as in step S810. Upon reception of this information, the CC section 2 controls the time switch 3 via the control line 8 to connect the effective lines to the facsimile modem 14 via the office line unit 5, the time switch 3, and the CODEC 30. For example, assuming that the line between the facsimile apparatus 28 and the office line unit 5 is disconnected, and the facsimile apparatuses connected to the effective lines are updated to the facsimile apparatuses 25 to 27, the CPU 10 executes processing so that PCM data from the CODEC 30 are output to the time slots corresponding to the effective lines of these facsimile apparatuses. In this manner, the facsimile modem 14 can transmit modem signals to the facsimile apparatuses as broadcasting destinations connected to the effective lines.

In steps S117 and S218, the facsimile modem 14 concurrently transmits a modem training signal, image data, an RTC signal, and an EOP signal to all the facsimile apparatuses as broadcasting destinations connected to the effective lines under the control of the CPU 10. In step S826, the CPU 10 informs line connection information for controlling the time switch 3 to the CC section 2 via the control line 6o Upon reception of this information, the CC section 2 controls the time switch 3 as in step S813 to connect the facsimile apparatuses as broadcasting destinations connected to the effective lines to the V.21 demodulators 301 and 302. For example, if the facsimile apparatus 25 is connected to an effective line, the CC section 2 controls the time switch 3 via the control line 8 to connect the facsimile apparatus 25 to the V.21 demodulator 301 or 302 via the office line unit 5, the time switch 3, and the CODEC 18 or 19 so as to exchange PCM data on the time slot. The same processing is executed for other effective lines. As a result, for example, when the facsimile apparatuses 25 and 26 are connected to effective lines, the facsimile apparatus 25 is connected to the V.21 demodulator 301, and the facsimile apparatus 26 is connected to the V.21 demodulator 302.

In steps S331 to S333, the CPU 10 waits for MCF signals received from the facsimile apparatuses 25 and 26 via the V.21 demodulators, monitors the wait time, and checks if an effective line from which an MCF signal has not been received yet remains.

If YES in step S333, the flow advances to step S830, and the CPU 10 informs information associated with line connections for controlling the time switch 3 to the CC section 2 via the control line 6 as in the processing in step S826. Upon reception of this information, the CC section 2 controls the time switch 3 via the control line 8 to connect the facsimile apparatus connected to the effective line from which an MCF signal has not been received yet to the V.21 demodulator 301 or 302 via the CODEC 18 or 19 so as to exchange PCM data on the time slot. For example, if the facsimile apparatus 27 is connected to an effective line, and an MCF signal has not been received yet from the effective line connected to the facsimile apparatus 27, the CC section 2 controls the time switch 3 via the control line 8 to connect the facsimile apparatus 27 and the V.21 demodulator 301 via the office line unit 5, the time switch 3, and the CODEC 18 so as to exchange PCM data on the time slot. The same processing is executed for the facsimile apparatuses connected to the remaining effective lines. In contrast to this, if MCF signals are received from all the effective lines, the flow advances to step S336.

In step S831, the same processing as in steps S218, S826, S331 and S332 is executed. It is examined in step S336 whether or not there is an effective line through which a MCF signal has not been received yet. If NO in step S336, the flow jumps to step S835. On the other hand, if YES in step S336, the flow advances to step S337.

In step S337, it is checked if the retrial count is 3 or more. If it is determined in step S337 that the retrial count is less than 3, the flow advances to step S834; otherwise, the flow jumps to step S835.

In step S834, the time switch 3 is set in a manner such that the facsimile modem 14 can connect with the effective lines connected to the facsimile apparatuses from which the MCF signals have not been received yet. After this, the flow returns to step S831.

In step S835, the CPU 10 informs line connection information for controlling the time switch 3 to the CC section 2 via the control line 6 as in the processing in step S823. Upon reception of this information, the CC section 2 controls the time switch 3 via the control line 8 to connect the effective lines to the facsimile modem 14 via the office line unit 5, the time switch 3, and the CODEC 30. For example, if the line between the facsimile apparatus 28 and the office line unit 5 is disconnected, and the facsimile apparatuses connected to the effective lines are updated to the facsimile apparatuses 25 to 27, the CPU 10 executes processing so that PCM data from the CODEC 30 are output to the time slots corresponding to the effective lines of these facsimile apparatuses. In this manner, the facsimile modem 14 can transmit modem signals to the facsimile apparatuses as broadcasting destinations connected to the effective lines.

Finally, steps S224, S225, and S125 are executed, and a series of operations are ended.

Therefore, according to this embodiment, by utilizing the line exchange facility, the four destination facsimile apparatuses to be connected to the two V.21 demodulators are switched in units of two apparatuses without using any special line switching circuits or switch circuits, and the two V.21 demodulators can receive control signals from the destination facsimile apparatuses. Thus, the number of parts to be mounted in the apparatus can be decreased, and since control signals from the facsimile apparatuses as broadcasting destinations can be received by the V.21 demodulators fewer than those in the sixth embodiment, apparatus production cost can be further reduced.

In this embodiment, since time-divisional line exchange processing is executed using the time switch, a transmission operation of broadcasting processing from the telephone exchange apparatus to the facsimile apparatuses 25 to 28 is assigned to the facsimile modem 14, and a reception operation thereof is assigned to the V.21 demodulators 301 and 302. Therefore, if one of PCM data highways in the time switch is exclusively assigned to transmission data from the facsimile modem 14, and another PCM data highway is exclusively assigned to reception data from the facsimile apparatuses 25 to 28 in advance (at the beginning of the broadcasting operations, e.g., in steps S804 and S810), the broadcasting operation can be executed even when the same processing to be executed later, i.e., operations in steps S817, S823, S830, and S835 may be omitted. Thus, unnecessary processing can be omitted, and facsimile data broadcasting processing can be executed more quickly. In such a case as well, the time switch 3 may be controlled upon disconnection of a line so as to change connections between the time slot corresponding to the disconnected line and the time slot corresponding to the facsimile modem 14 or the V.21 demodulators.

Furthermore, in the fifth to seventh embodiments, an exchange control unit of the telephone exchange apparatus has been described using the time switch (time-divisional line exchange facility). However, the present invention is not limited to this. For example, other means such as a spatial divisional exchange facility, a multi-point analog switch, and the like, which can provide a facility equivalent to the exchange facility of the time switch, may be used.

[Eighth Embodiment (FIGS. 15 to 16C)]

Figure 15:
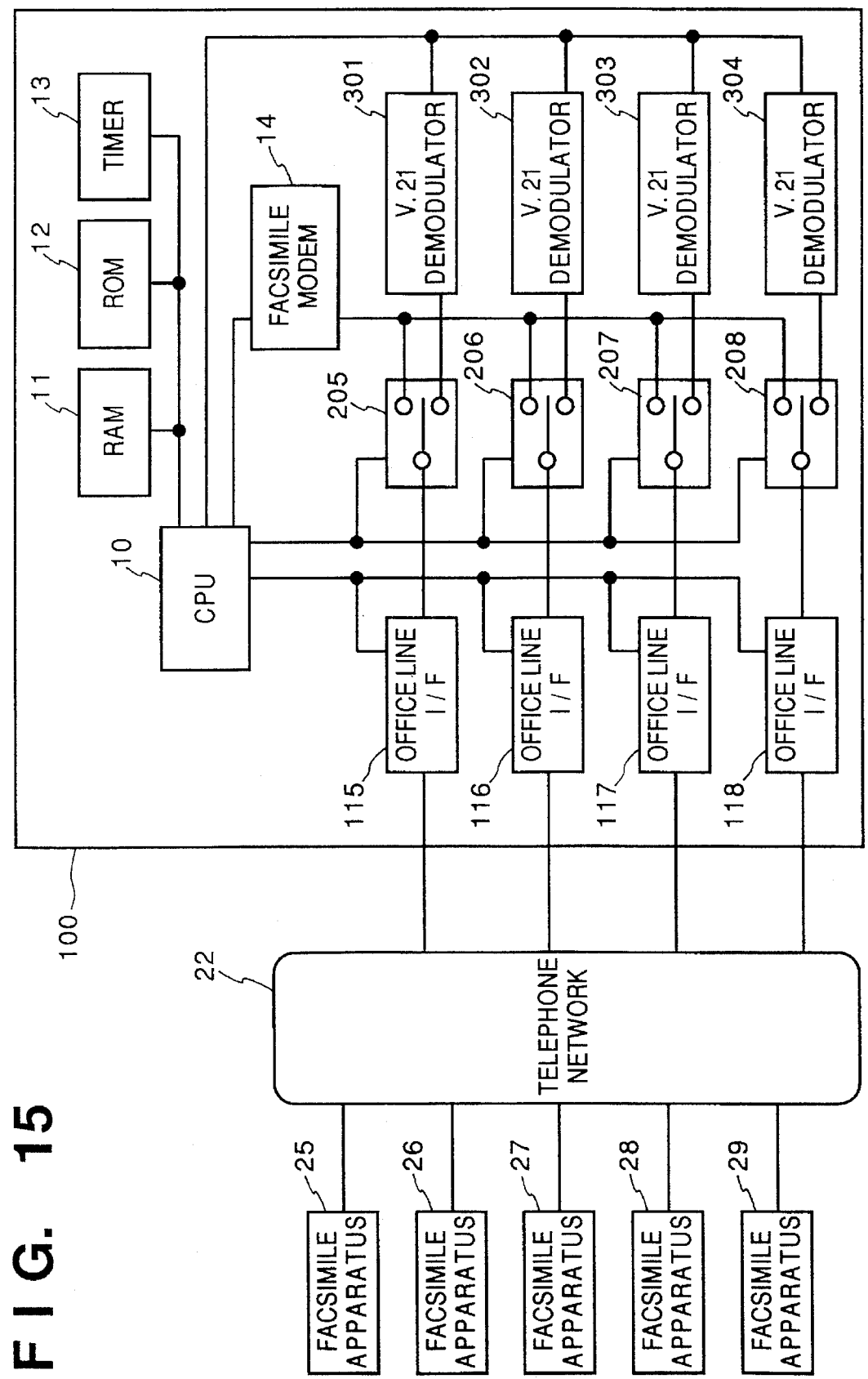
FIG. 15 is a block diagram showing an arrangement of a facsimile data broadcasting apparatus according to an eighth embodiment of the present invention.

FIG. 15 is a block diagram showing an arrangement of a facsimile data broadcasting apparatus (to be referred to as a broadcasting apparatus hereinafter) 100 according to this embodiment. The same reference numerals in the broadcasting apparatus shown in FIG. 15 denote the same parts as in the facsimile data broadcasting unit 9 shown in FIG. 3, and a detailed description thereof will be omitted. In the following description, only components as the characteristic features of this embodiment will be explained.

One important feature of this embodiment is that, in facsimile data concurrent broadcasting processing, image data and control signals are transmitted to facsimile apparatuses as broadcasting destinations by sharing a single facsimile modem and control signals from the facsimile apparatuses as broadcasting destinations are received by a plurality of V.21 demodulators corresponding in number to the facsimile apparatuses as broadcasting destinations.

In FIG. 15, reference numerals 115 to 118 denote office line interfaces (I/Fs) for connecting the facsimile modem 14 or V.21 demodulators 301 to 304 to the telephone network 22. Facsimile apparatuses 25 to 29 are connected to the telephone network 22.

A case will be explained below wherein one of the facsimile apparatus connected to the telephone network 22, e.g., the facsimile apparatus 29 broadcasts image data to the facsimile apparatuses 25 to 28 via the apparatus with the above arrangement.

First, a case will be described below wherein the broadcasting apparatus 100 receives image data to be broadcasted from the facsimile apparatus 29.

An image output from the facsimile apparatus 29 is transmitted to the office line I/F 115 via the telephone network 22. When the CPU 10 detects an incoming call via the office line I/F 115, it controls the switch circuit 205 to connect the office line I/F 115 to the facsimile modem 14. The CPU 10 then communicates with the facsimile apparatus 29 via the facsimile modem 14 on the basis of the G3 protocol, receives image data from the facsimile apparatus 29, and stores the received image data in the RAM 11.

Figure 16A:
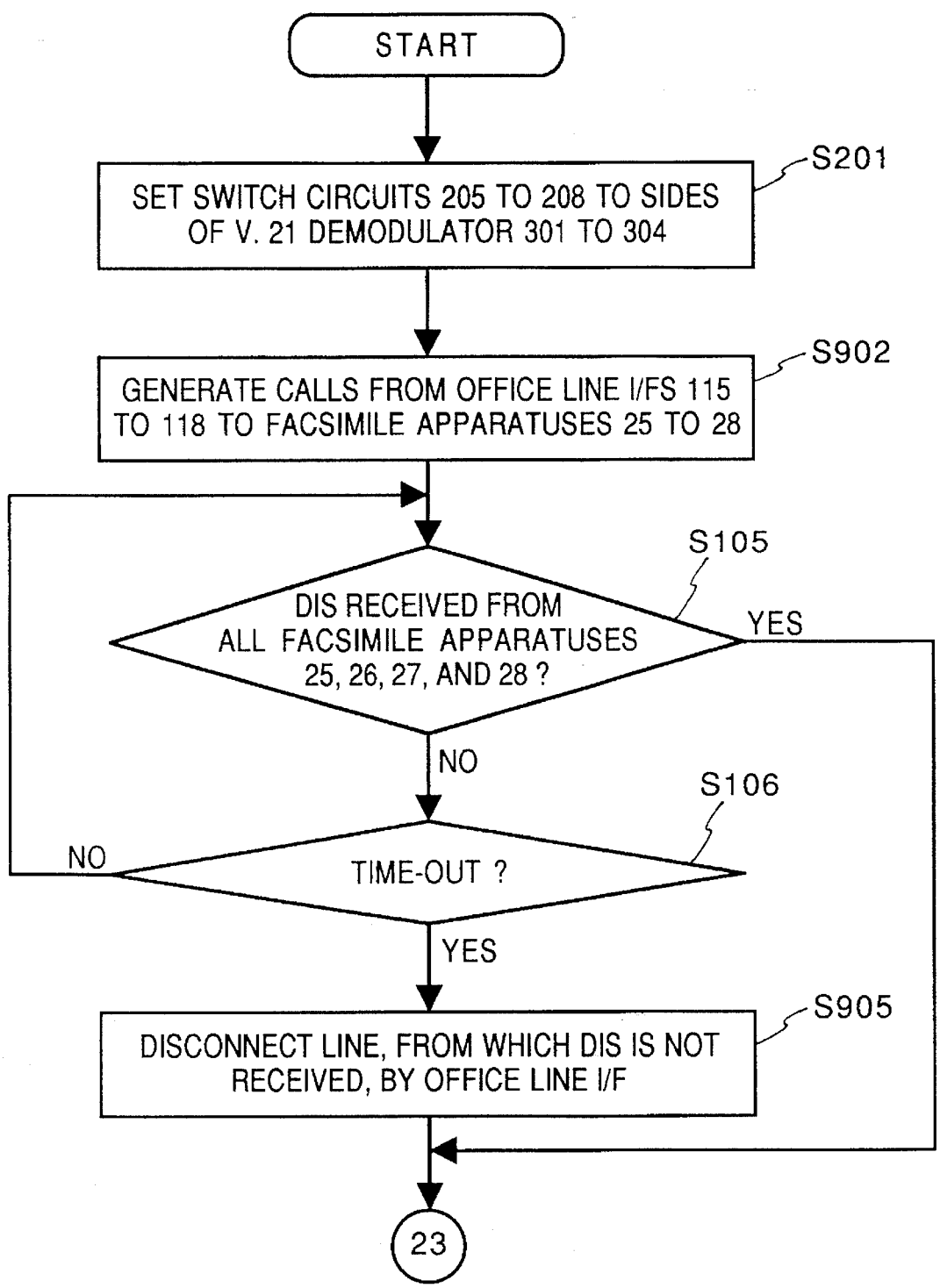
Figure 16C:
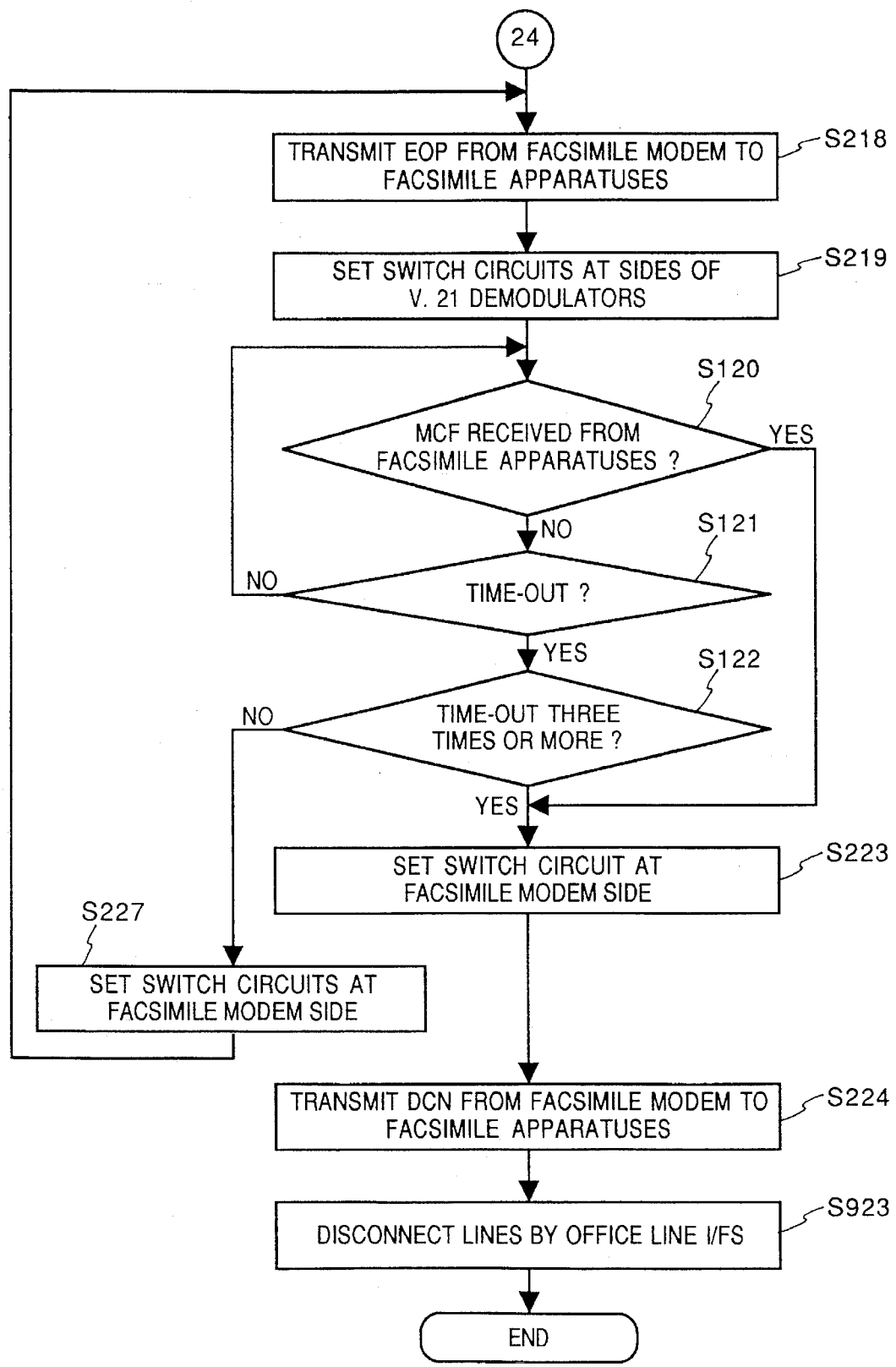

Operations executed when the stored image data is concurrently broadcasted from the broadcasting apparatus 100 to the facsimile apparatuses 25 to 28 will be described below with reference to the flow charts shown in FIGS. 16A to 16C. Note that image data to be transmitted has an amount corresponding to one page. In the following description, only processing steps as the characteristic features of this embodiment will be explained. The same processing steps as those described in the first to seventh embodiments described above will be referred to using the same step reference numbers, and a detailed description thereof will be omitted.

After the switch circuits 205 to 208 are set at the sides of the V.21 demodulators 301 to 304 in step S201, the CPU 10 controls the office line I/Fs 115 to 118 in step S902 to generate calls from these office line I/Fs to the facsimile apparatuses 25 to 28 via the telephone network 22.

In steps S105 and S106, the CPU 10 waits for DIS signals, and monitors the wait time. As a result, if the timer reaches a time-out state before DIS signals are received from all the facsimile apparatuses 25 to 28, in step S905, the CPU 10 controls the corresponding office line I/F to disconnect the line connected to the facsimile apparatus from which a DIS signal is not received.

For example, if a DIS signal from the facsimile apparatus 28 is not received via the office line I/F 118 and the V.21 demodulator 304, and a time-out state occurs, the CPU 10 controls the office line I/F 118 or a combination of the office line I/F 118 and the V.21 demodulator 304 to interrupt a facsimile communication and to disconnect the connected line.

In step S208, the switch circuits connected to the effective lines are set at the facsimile modem 14 side. In step S209, the facsimile modem 14 transmits a DCS signal to the facsimile apparatuses as broadcasting destinations. Furthermore, in step S110, a modem training signal and a TCF signal are concurrently transmitted to all the facsimile apparatuses as broadcasting destinations connected to the effective lines. Thereafter, in step S211, the switch circuits are restored to be set at the sides of the V.21 demodulators.

The CPU 10 monitors CFR signals sent from the facsimile apparatuses via the V.21 demodulators, and executes processing in steps S112 to S114.

If it is determined in step S114 that the retrial count of modem training is 3 or more, the flow advances to step S913 to disconnect a line connected to the facsimile apparatus from which a CFR signal is not received. For example, when a CFR signal from the facsimile apparatus 27 is not received via the office line I/F 117 and the V.21 demodulator 303, and the retrial count becomes 3 or more, the CPU 10 controls the office line I/F 117 or a combination of the office line I/F 117 and the facsimile modem 14 to interrupt a facsimile communication and to disconnect the connected line.

In step S116, the switch circuits connected to the effective lines are switched to the facsimile modem 14 side again, and in steps S117 and S218, the facsimile modem 14 concurrently transmits a modem training signal, image data, an RTC signal, and an EOP signal to all the facsimile apparatuses as broadcasting destinations connected to the effective lines. Thereafter, in step S219, the switch circuits are switched to the sides of the V.21 demodulators.

The CPU 10 monitors MCF signals sent from the facsimile apparatuses via the V.21 demodulators, and executes processing in steps S120 to S122. If it is determined in step S122 that the time-out count is less than 3, the flow advances to step S227, and the CPU 10 controls the switch circuit connected to the effective lines to be switched to the facsimile modem 14 side. Thereafter, the flow returns to step S218 to re-transmit an EOP signal. In contrast to this, if the time-out count and the number of times of EOP signal transmission are 3 or more, the flow advances to step S223.

In step S223, the switch circuits connected to the effective lines are set at the facsimile modem 14 side. In step S224, the facsimile modem 14 transmits a DCN signal to the facsimile apparatuses. Finally, the CPU 10 controls the office line I/Fs to disconnect the lines in step S923.

Therefore, according to this embodiment, since image data can be concurrently broadcasted to a plurality of facsimile apparatuses by sharing a single facsimile modem without using a plurality of expensive facsimile modems, a low-cost facsimile data broadcasting apparatus can be provided.

[Ninth Embodiment (FIGS. 17 to 18C)]

Figure 17:
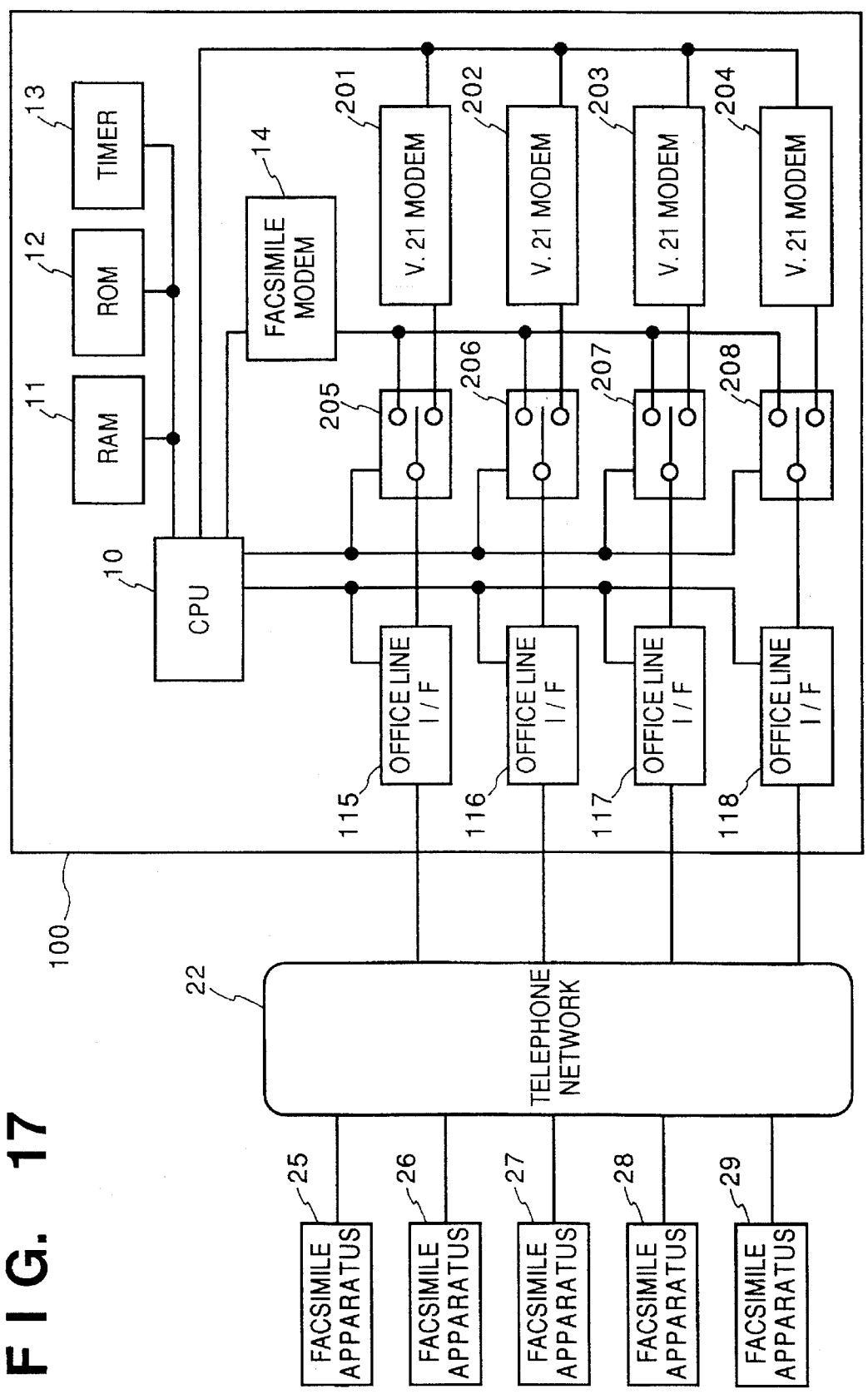
FIG. 17 is a block diagram showing an arrangement of a facsimile data broadcasting apparatus according to a ninth embodiment of the present invention.

FIG. 17 is a block diagram showing an arrangement of a facsimile data broadcasting apparatus (to be referred to as a broadcasting apparatus hereinafter) 100 according to this embodiment. The same reference numerals in the broadcasting apparatus shown in FIG. 17 denote the same parts as in the broadcasting apparatus 100 shown in FIG. 15 and the facsimile data broadcasting unit 9 shown in FIG. 1, and a detailed description thereof will be omitted.

One important feature of the broadcasting apparatus of this embodiment is that as compared to the apparatus of the eighth embodiment, the V.21 modems 201 to 204 are arranged in place of the V.21 demodulators 301 to 304 having only a control signal reception facility, so that the common facsimile modem 14 performs operations associated with modem training and image data transmission, and the V.21 modems 201 to 204 perform transmission/reception of other control signals.

An operation for broadcasting image data from one of facsimile apparatuses connected to the telephone network 22, e.g., the facsimile apparatus 29, to the facsimile apparatuses 25 to 28 via the apparatus with the above arrangement will be described. Since the operation for transmitting image data from the facsimile apparatus 29 to the broadcasting apparatus 100 is the same as that in the eighth embodiment, a detailed description thereof will be omitted.

Figure 18A:
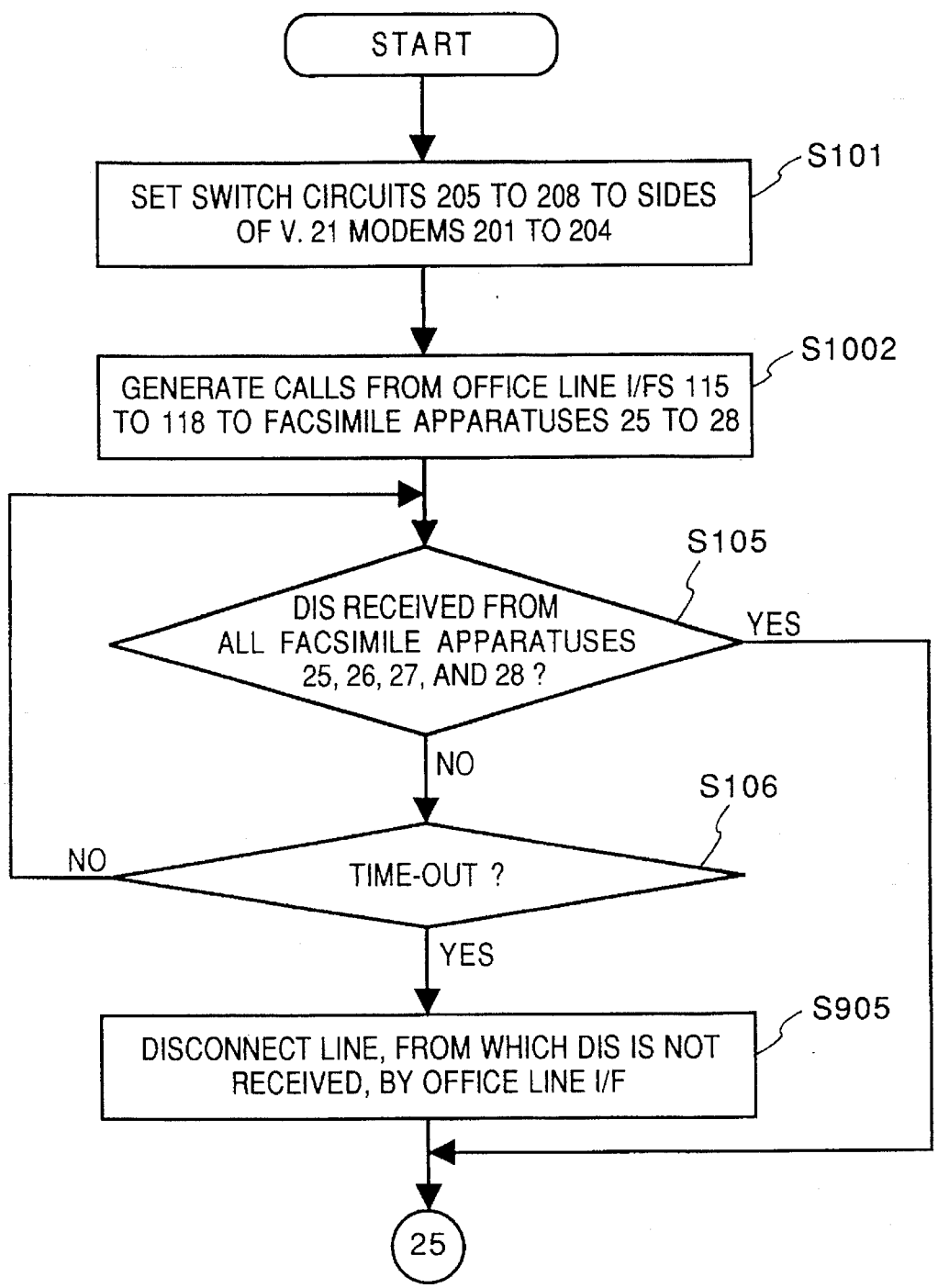
FIGS. 18A, 18B, and 18C are flow charts showing facsimile data broadcasting communication operations according to the ninth embodiment.
Figure 18B:
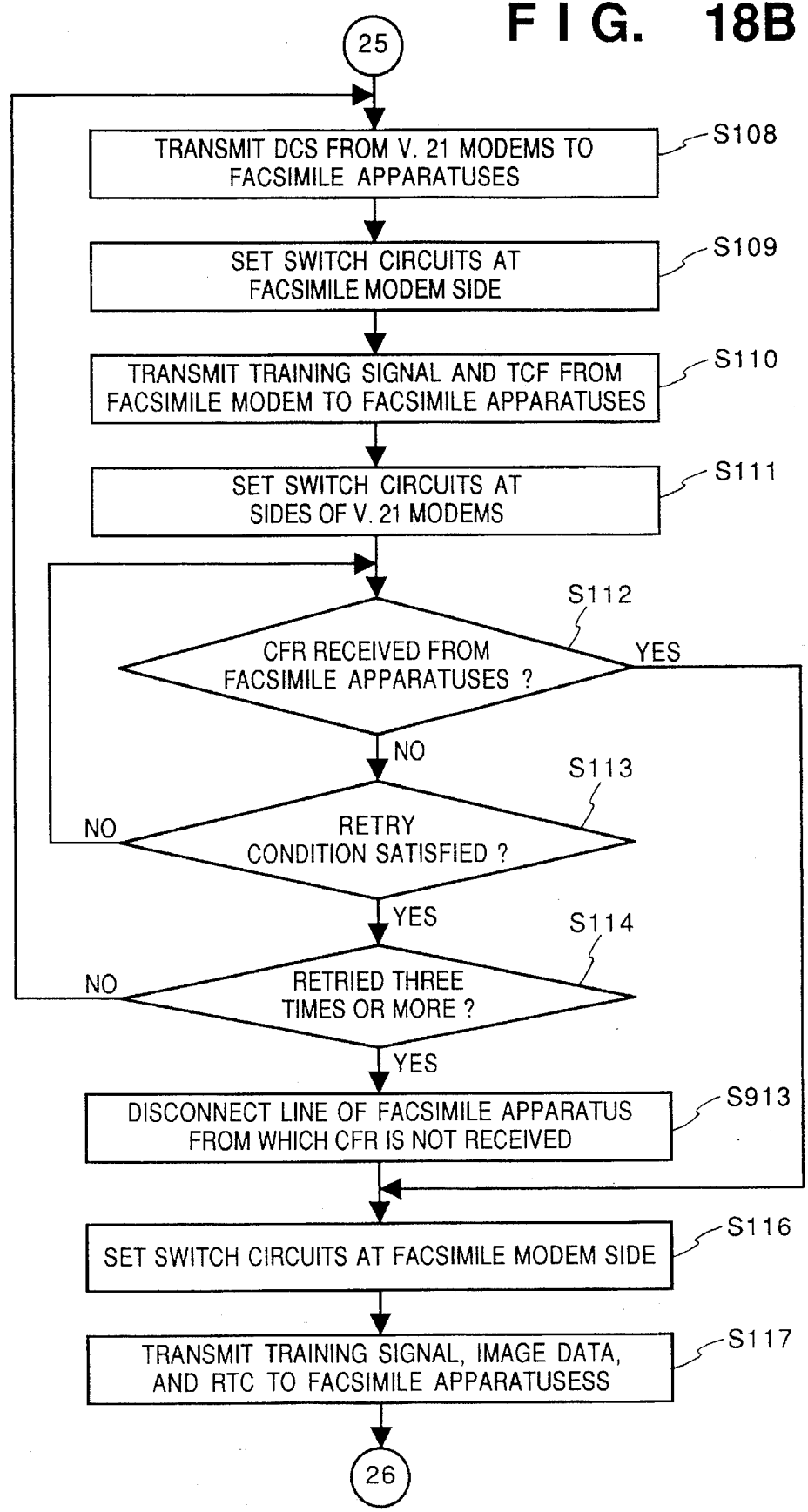
Figure 18C:
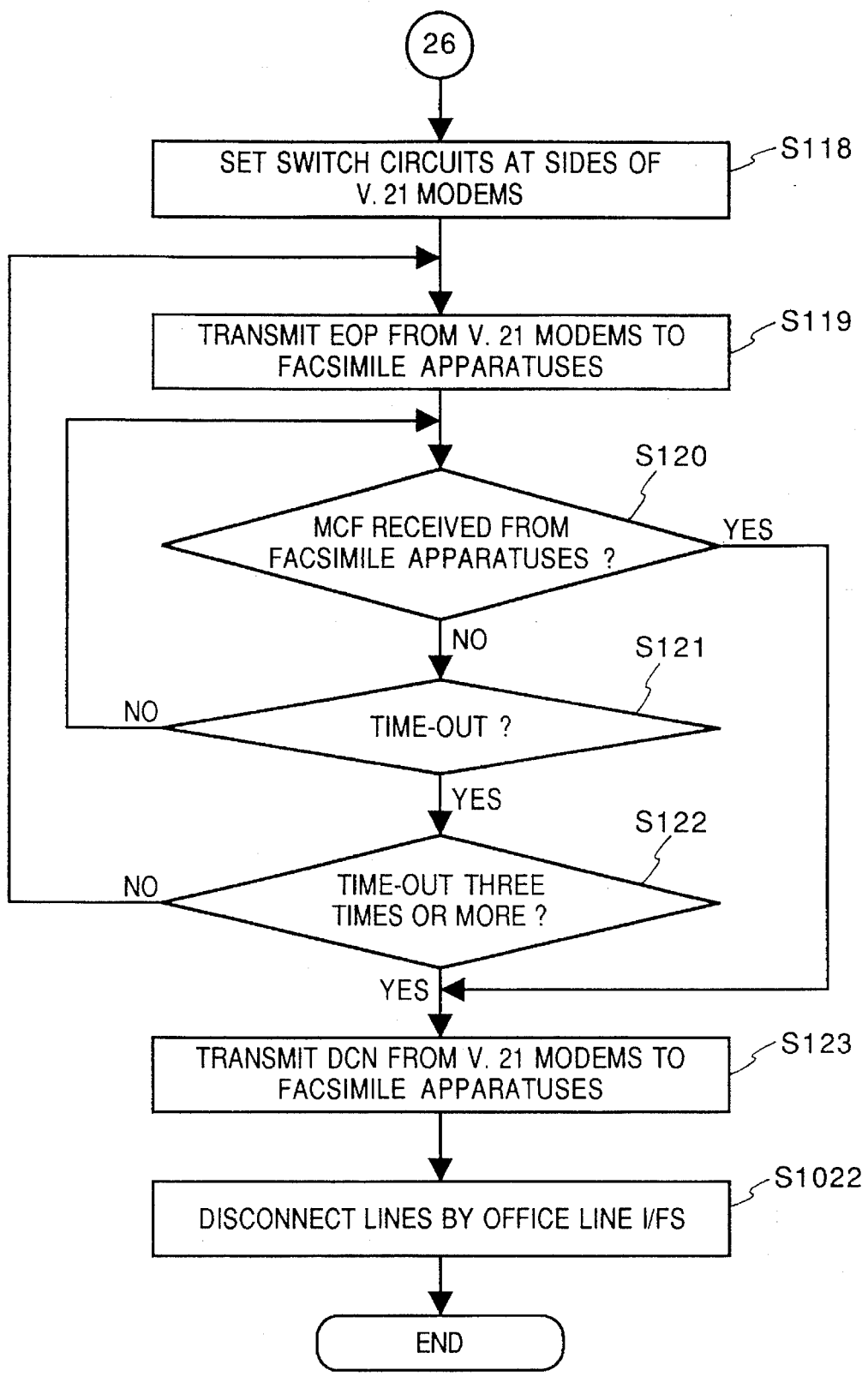

Operations executed when stored image data is concurrently broadcasted to the facsimile apparatuses 25 to 28 will be described below with reference to the flow charts shown in FIGS. 18A to 18C. Note that image data to be transmitted has an amount corresponding to one page as well. In the following description, only processing steps as the characteristic features of this embodiment will be explained. The same processing steps as those described in the first to eighth embodiments described above will be referred to using the same step reference numbers, and a detailed description thereof will be omitted.

In step S101, the CPU 10 controls the switch circuits 205 to 208 to be switched to the sides of the V.21 modems 201 to 204, so that the office line I/Fs 115 to 118 are connected to the V.21 modems 201 to 204, thereby allowing the V.21 modems 201 to 204 to receive signals from the office lines. In step S1002, the office line I/Fs 115 to 118 generate calls to the facsimile apparatuses 25 to 28 via the telephone network 22.

In steps S105, S106, and S905, the CPU 10 waits for DIS signals received from the facsimile apparatuses 25 to 28, monitors the wait time, and controls the corresponding office line I/F to disconnect a line from which a DIS signal is not received.

In steps S108 to S111, the V.21 modems connected to the effective lines transmit DCS signals to the corresponding facsimile apparatuses. The switch circuits are then switched to the facsimile modem 14 side, and the facsimile modem 14 transmits a modem training signal and a TCF signal to the facsimile apparatuses. Thereafter, the switch circuits are switched to the sides of the V.21 modems again.

The CPU 10 monitors CFR signals sent from the facsimile apparatuses via the V.21 modems, and executes processing in steps S112 to S114 and step S913.

In steps S116 to S118, the switch circuits are switched to the facsimile modem 14 side again, and a modem training signal, image data, and an RTC signal are concurrently transmitted to all the facsimile apparatuses as broadcasting destinations connected to the effective lines. Thereafter, the switch circuits are switched to the sides of the V.21 modems again.

In step S119, the V.21 modems transmit EOP signals to the facsimile apparatuses, and the CPU 10 monitors MCF signals sent from the facsimile apparatuses via the V.21 modems to execute processing in steps S120 to S122. In step S123, the V.21 modems connected to the effective lines transmit DCN signals to the facsimile apparatuses under the control of the CPU 10.

Finally, in step S1022, the CPU 10 controls the office line I/Fs to disconnect the connected lines.

Therefore, according to this embodiment, the CPU 10 controls the switch circuits 205 to 208 to switch connections with the facsimile modem 14 or the V.21 modems 201 to 204 so as to broadcast image data by sharing the facsimile modem 14.

[Tenth Embodiment (FIGS. 19 to 20E)]

Figure 19:
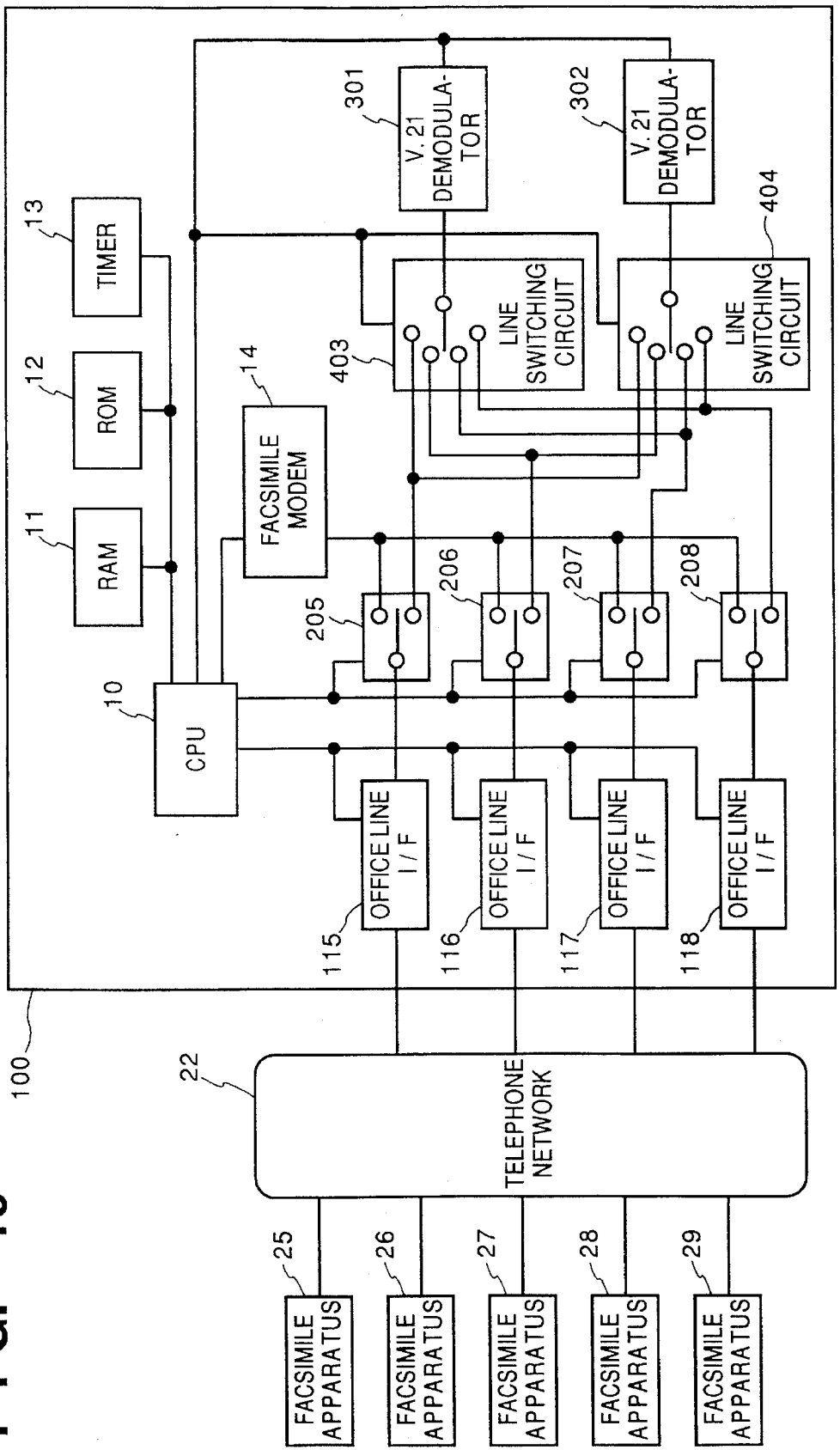
FIG. 19 is a block diagram showing an arrangement of a facsimile data broadcasting apparatus according to a tenth embodiment of the present invention.
Figure 20A:
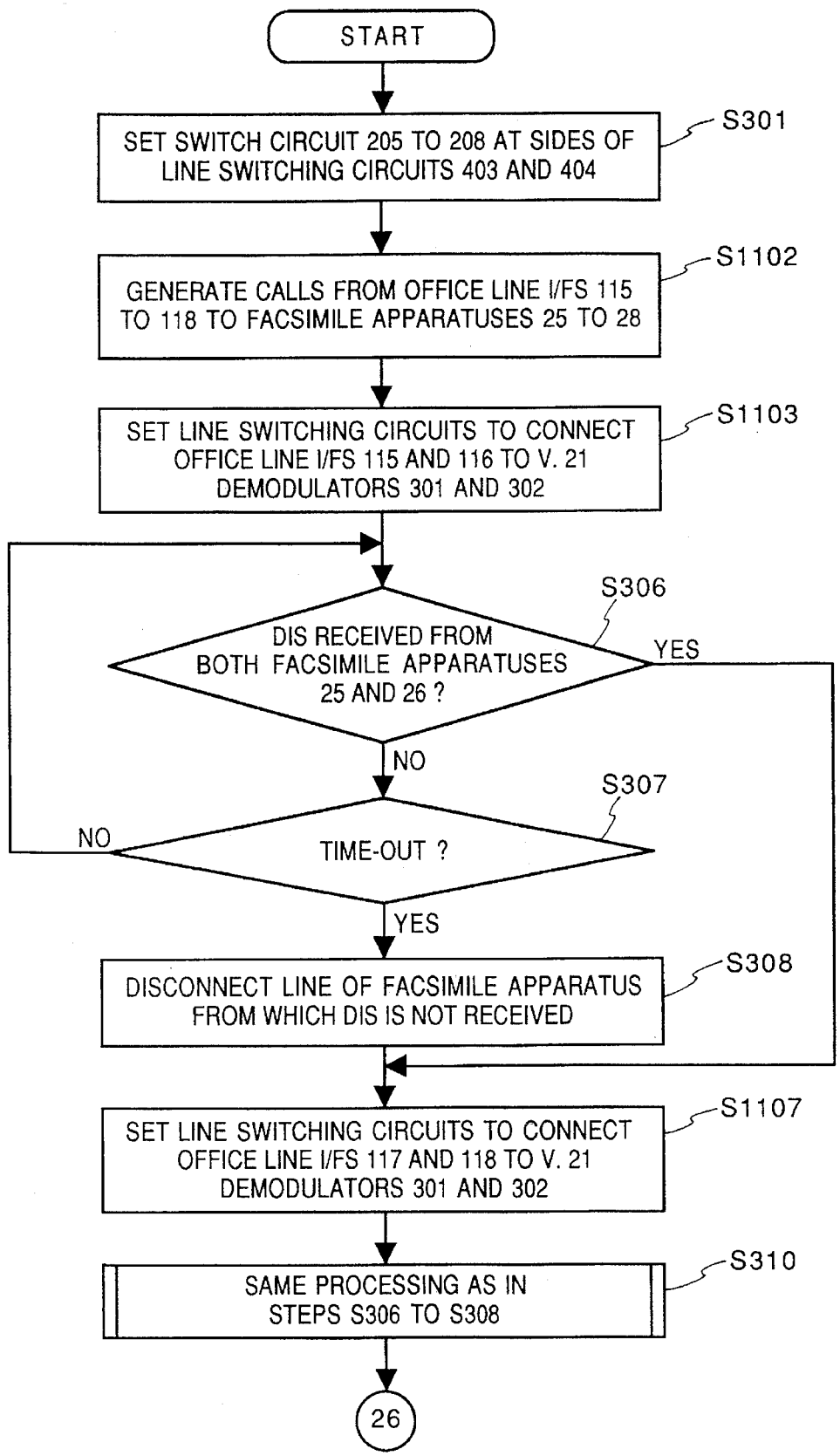
FIGS. 20A, 20B, 20C, 20D, and 20E are flow charts showing facsimile data broadcasting communication operations according to the tenth embodiment.
Figure 20B:
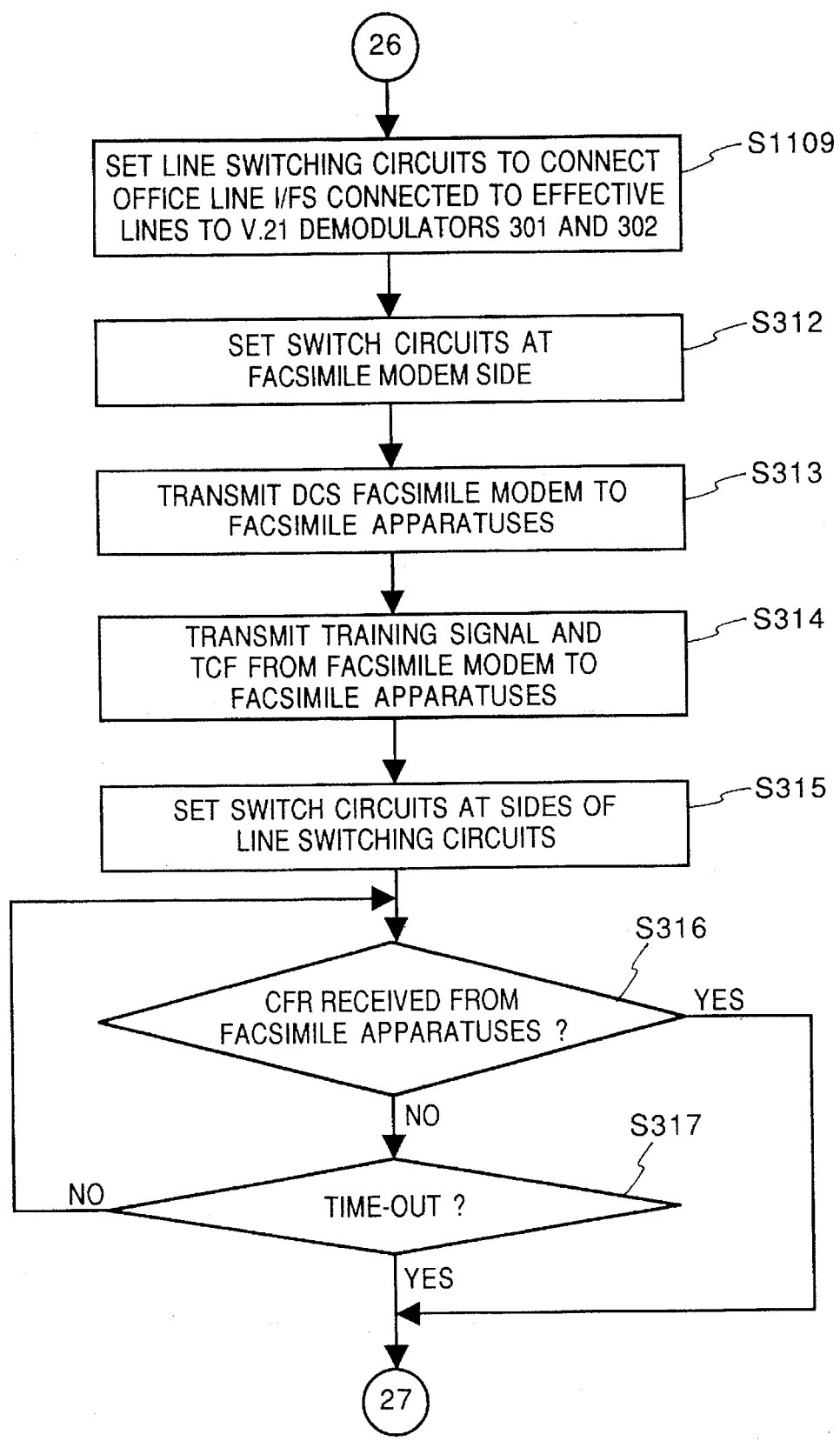
Figure 20C:
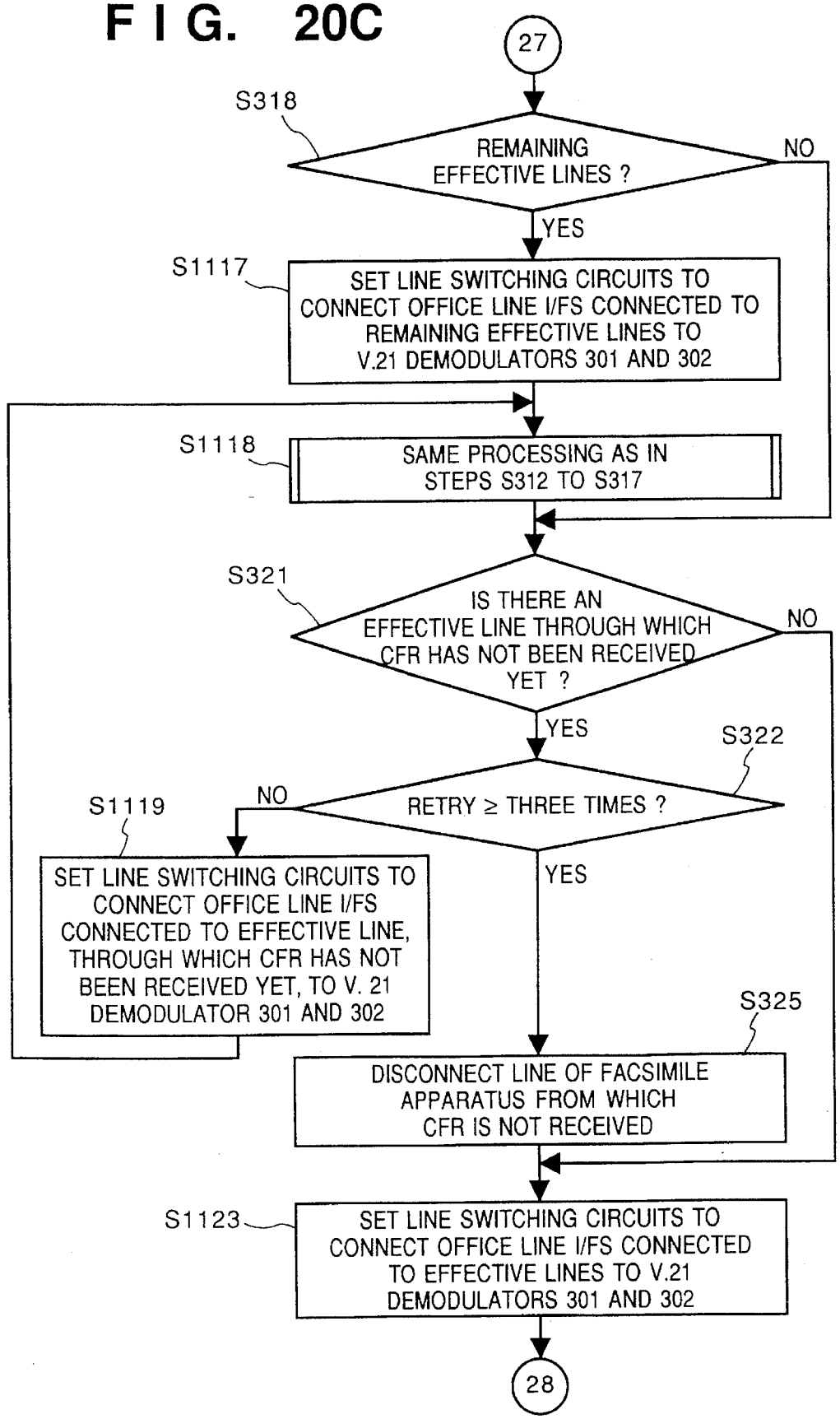
Figure 20D:
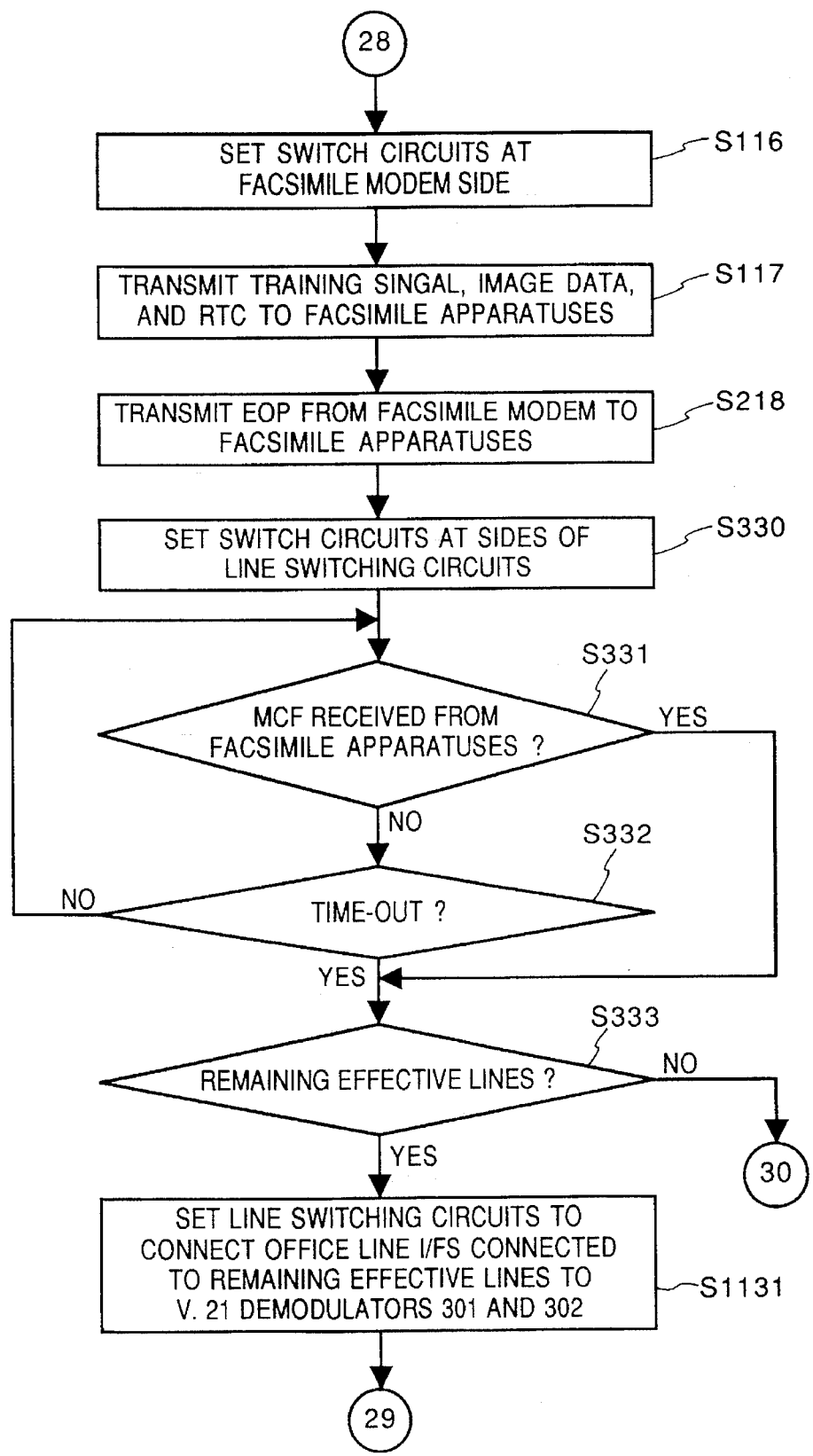
Figure 20E:
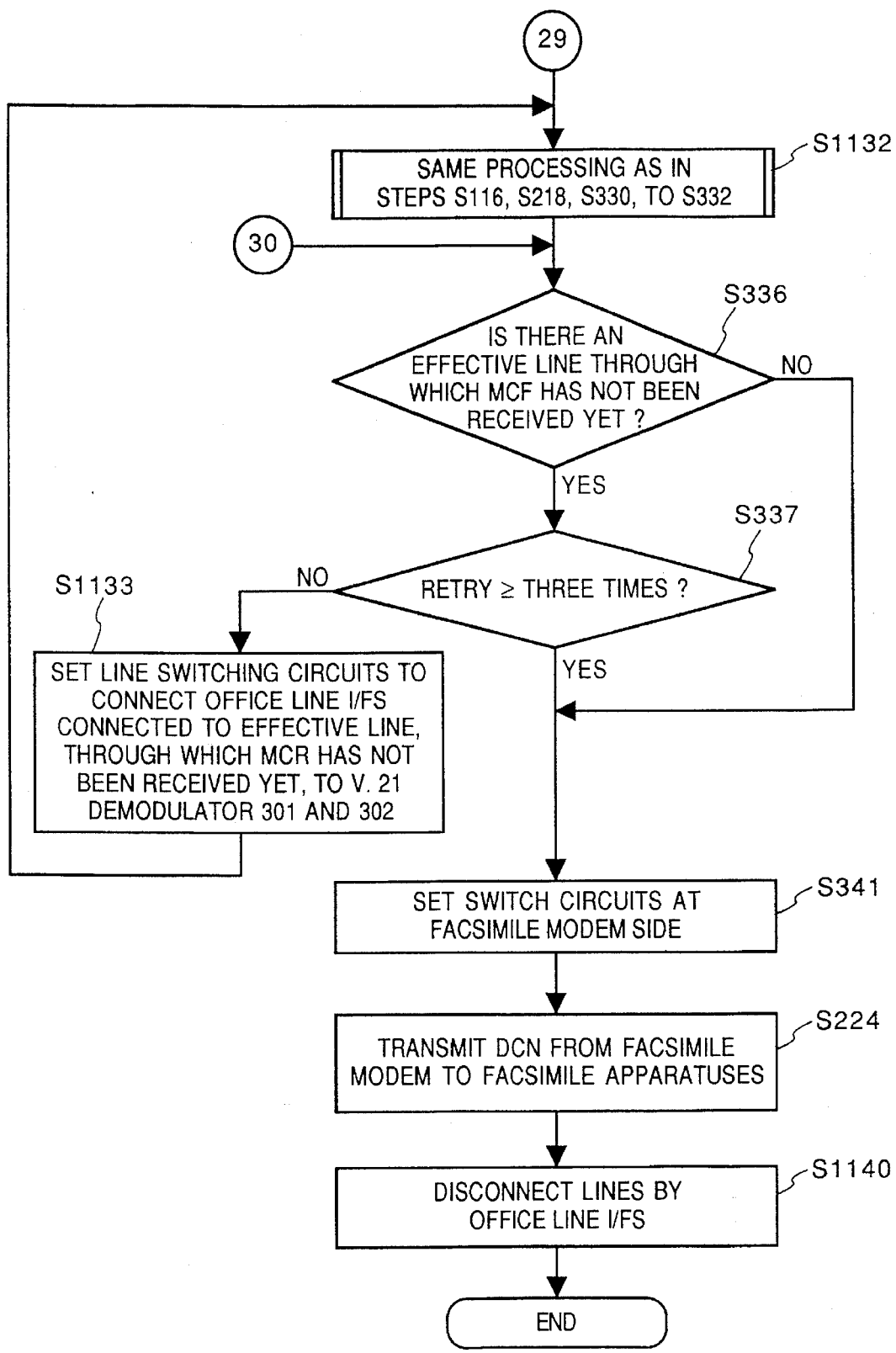

FIG. 19 is a block diagram showing an arrangement of a facsimile data broadcasting apparatus (to be referred to as a broadcasting apparatus hereinafter) 100 according to this embodiment. The same reference numerals in the broadcasting apparatus shown in FIG. 19 denote the same parts as in the broadcasting apparatus 100 shown in FIG. 15 and the facsimile data broadcasting unit 9 shown in FIG. 5, and a detailed description thereof will be omitted.

One important feature of the broadcasting apparatus 100 of this embodiment is that, the two V.21 demodulators 301 and 302 and the line switching circuits 403 and 404 are arranged in place of the four V.21 demodulators 301 to 304 in the apparatus of the eighth embodiment, so that operations associated with modem training and image data transmission are performed by the common facsimile modem 14, and control signals are received by the two V.21 demodulators 301 and 302 while the line switching circuits 403 and 404 switch connections between the four facsimile apparatuses as broadcasting destinations and the V.21 demodulators 301 and 302 during transmission or re-transmission of control signals to these facsimile apparatuses.

An operation for broadcasting image data from one of facsimile apparatuses connected to the telephone network 22, e.g., the facsimile apparatus 29, to the facsimile apparatuses 25 to 28 via the apparatus with the above arrangement will be described. Since the operation for transmitting image data from the facsimile apparatus 29 to the broadcasting apparatus 100 is the same as that in the eighth embodiment, a detailed description thereof will be omitted.

Operations executed when stored image data is concurrently broadcasted to the facsimile apparatuses 25 to 28 will be described below with reference to the flow charts shown in FIGS. 20A to 20E. Note that image data to be transmitted has an amount corresponding to one page as well. In the following description, only processing steps as the characteristic features of this embodiment will be explained. The same processing steps as those described in the first to ninth embodiments described above will be referred to using the same step reference numbers, and a detailed description thereof will be omitted.

In step S301, the switch circuits 205 to 208 are switched to the sides of the line switching circuits 403 and 404 to connect the office line I/Fs 115 to 118 to the V.21 demodulators 301 and 302, thus allowing the V.21 demodulators 301 and 302 to receive signals from the office lines.

In step S1102, the CPU 10 controls the office line I/Fs 115 to 118 to generate calls to the facsimile apparatuses 25 to 28 via the telephone network 22. In step S1103, the CPU 10 controls the line switching circuits 403 and 404 to be switched to the sides of the switch circuits 205 and 206, so that the office line I/F 115 is connected to the V.21 demodulator 301 via the switch circuit 205 and the office line I/F 116 is connected to the V.21 demodulator 302 via the switch circuit 206.

In steps S306 to S308, the CPU 10 waits for DIS signals received from the facsimile apparatuses, monitors the wait time, and disconnects a line connected to the facsimile apparatus from which a DIS signal is not received.

In step S1107, the CPU 10 controls the line switching circuits 403 and 404 to be switched to the sides of the switch circuits 207 and 208, so that the office line I/F 117 is connected to the V.21 demodulator 301 via the switch circuit 207 and the office line I/F 118 is connected to the V.21 demodulator 302 via the switch circuit 208. Thereafter, in step S310, the same processing as in steps S306 to S308 is executed for the facsimile apparatuses 27 and 28.

In step S1109, the CPU 10 controls the line switching circuits, so that the effective lines are connected to the V.21 demodulators via the switch circuits. For example, if the line between the facsimile apparatus 28 and the office line I/F 118 is disconnected, and the lines connected to the office line I/Fs 115 to 117 become effective lines, the CPU 10 switches the line switching circuit 403, so that the office line I/F 115 can be connected to the V.21 demodulator 301, thereby connecting the V.21 demodulator 301 to the switch circuit 205. Also, the CPU 10 switches the line switching circuit 404 to connect the V.21 demodulator 302 and the switch circuit 206.

In steps S312 to S318, as in the processing in the third embodiment, the switch circuits are switched to the facsimile modem side, and the facsimile modem transmits a DCS signal, a modem training signal, and a TCF signal to the facsimile apparatuses as the broadcasting destinations. Thereafter, the switch circuits are switched to the sides of the line switching circuits, and the CPU 10 waits for CFR signals received from the facsimile apparatuses via the V.21 demodulators, and monitors the wait time.

If an effective line from which a CFR signal has not been received yet remains, the CPU 10 controls a line switching circuit to connect the office line I/F of the remaining effective line to a V.21 demodulator in step S1117.

In step S1118, the same processing as in steps S312 to S317 is executed. After examining whether or not an effective line, through which a CFR signal has not been received yet, exists in step S321, the flow advances to step S322. In step S322, the retrial count is checked, and it is determined according to the retrial count if transmission of the DCS signal, the modem training signal, and the TCF signal is to be retried. If the retrial count is 3 or more, a line connected to the facsimile apparatus from which a CFR signal has not been received yet is disconnected in step S325.

On the other hand, if the retrial count is less than 3, the flow advances to step S1119 to set the line switching circuits 403 and 404 so that the V.21 demodulators 301 and 302 can connect with the office line I/Fs connected to the facsimile apparatuses, via the effective lines, from which the CFR signals have not been received yet. After this, the flow advances to step S1118.

In step S1123, the CPU 10 controls the line switching circuits to connect the effective lines to the V.21 demodulators via the switch circuits. For example, if the line between the facsimile apparatus 28 and the office line I/F 118 is disconnected, and the lines connected to the office line I/Fs 115 to 117 become effective lines, the CPU 10 switches the line switching circuit 403 to connect the office line I/F 115 to the V.21 demodulator 301, thereby connecting the V.21 demodulator 301 to the switch circuit 205. Similarly, the CPU 10 switches the line switching circuit 404 to connect the V.21 demodulator 302 to the switch circuit 206.

In step S116, the switch circuits are switched to the facsimile modem 14 side again. In steps S117 and S218, the facsimile modem 14 transmits a modem training signal, image data, and an RTC signal to the facsimile apparatuses as broadcasting destinations connected to the effective lines, and concurrently transmits an EOP signal thereto finally. In step S330, the switch circuits connected to the effective lines are switched to the sides of the line switching circuits again.

Thereafter, in steps S331 to S333, the CPU 10 waits for MCF signals received from the facsimile apparatuses 25 and 26 via the V.21 demodulators, monitors the wait time, and checks if an effective line from which an MCF signal has not been received yet remains.

If it is determined in step S333 that an effective line from which an MCF signal has not been received yet remains, the CPU 10 controls a line switching circuit to connect an office line I/F connected to the remaining effective line to a V.21 demodulator via a switch circuit in step S1131. For example, if the line connected to the office line I/F 117 is an effective line, and an MCF signal has not been receive yet from this line, the CPU 10 switches the switch circuit 207 and the line switching circuit 403 to connect the office line I/F 117 to the V.21 demodulator 301.

In step S1132, the same processing as in steps S116, S218 and S330 to S332 is executed. After examining whether or not an effective line, through which a MCF signal has not been received yet, exists in step S336, the flow advances to step S337.

In step S337, the retrial count is checked, and transmission of the training signal, image data, the RTC signal, and the EOP signal is retried according to the retrial count. If the retrial count is 3 or more, the flow advances to step S341 to switch the switch circuits connected to the effective lines to the facsimile modem 14 side again.

On the other hand, if the retrial count is less than 3, the flow advances to step S1133 to set the line switching circuits 403 and 404 so that the V.21 demodulators 301 and 302 can connect with the office lines I/Fs connected to the facsimile apparatuses, via the effective lines, from which the MCF signals have not been received yet. After this, the flow returns to step S1132. In step S224, the facsimile modem 14 transmits a DCN signal to the facsimile apparatuses connected to the effective lines.

Finally, in step S1140, the CPU 10 controls the office lines I/Fs to disconnect the lines, and ends a series of processing operations.

Therefore, according to this embodiment, control signals from the four facsimile apparatuses as the broadcasting destinations can be received while switching the facsimile apparatuses to be connected using the two demodulators and the two line switching circuits. Since the control signals from the facsimile apparatus as broadcasting destinations can be received by the V.21 demodulators fewer than those in the eighth embodiment, apparatus production cost can be further reduced.

As for connections between the effective lines and the V.21 demodulators in steps S1109 and S1117 of this embodiment, the office line I/Fs of the remaining effective lines are connected to the V.21 demodulators 301 and 302. However, the present invention is not limited to this. For example, if the number of remaining effective lines is smaller than the number ("2" in this embodiment) of V.21 demodulators, the line from which the CFR signal cannot be received may be assigned and connected to the remaining V.21 demodulator.

In this embodiment, the CPU 10 waits for reception of CFR or MCF signals, and disconnects a line connected to a facsimile apparatus from which a CFR or MCF signal cannot be received. However, the present invention is not limited to this. For example, an FTT signal, a DTC signal, a TRP signal, an RTN signal, and the like may be identified to execute the facsimile data concurrent broadcasting operation described in this embodiment. In addition to the processing of this embodiment, when all the effective lines are under the same condition, reception of FTT signals from these lines may be checked to execute processing shown in the flow chart shown in FIG. 21. In the flow chart shown in FIG. 21, the same step reference numbers denote the same processing steps as those in FIG. 8. The feature of the processing shown in the flow chart of FIG. 21 will be described below.

Figure 21:
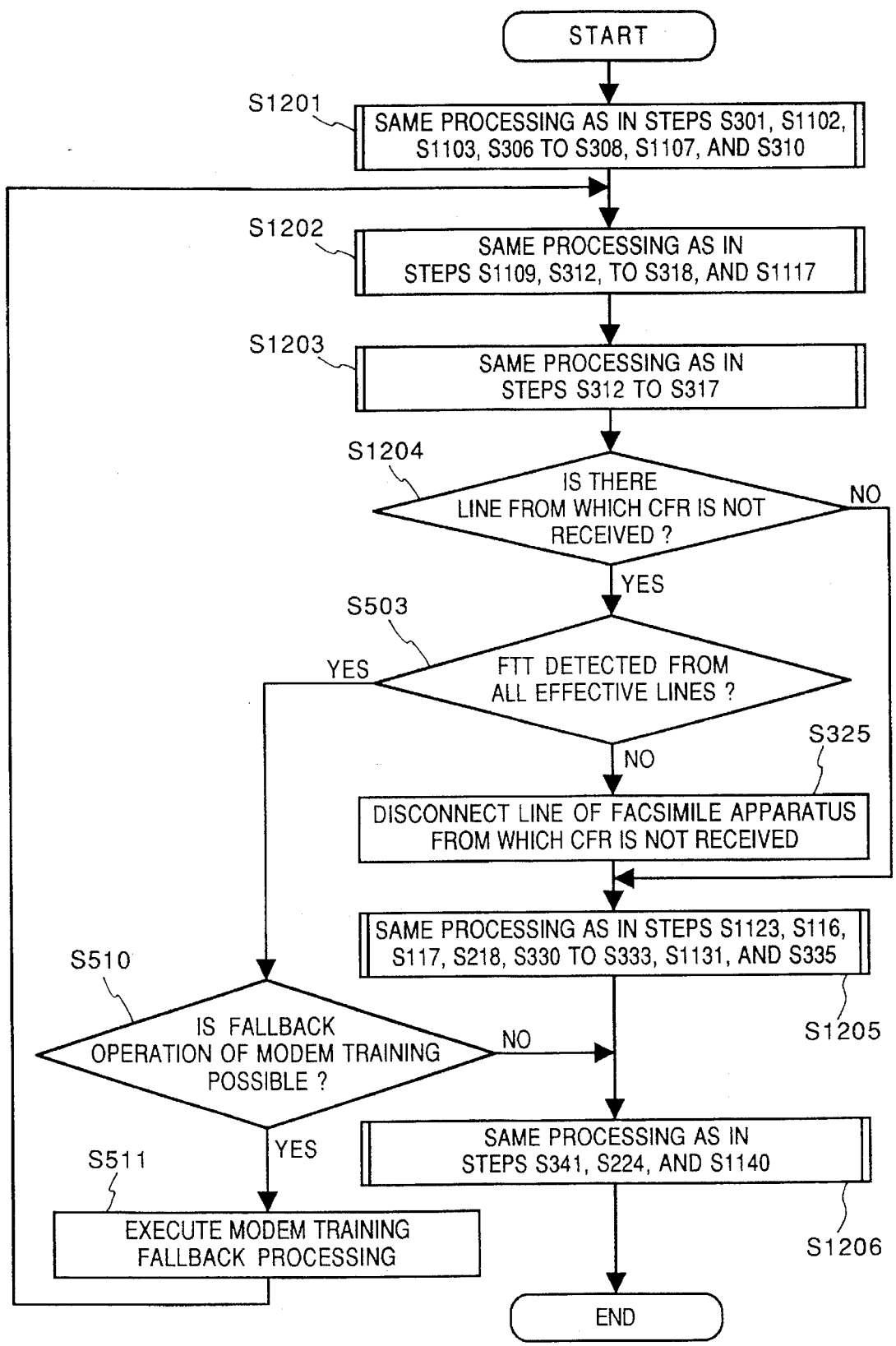
FIG. 21 is a flow chart showing another re-transmission operation of a facsimile data broadcasting communication by modem training fallback processing.
Figure 22:
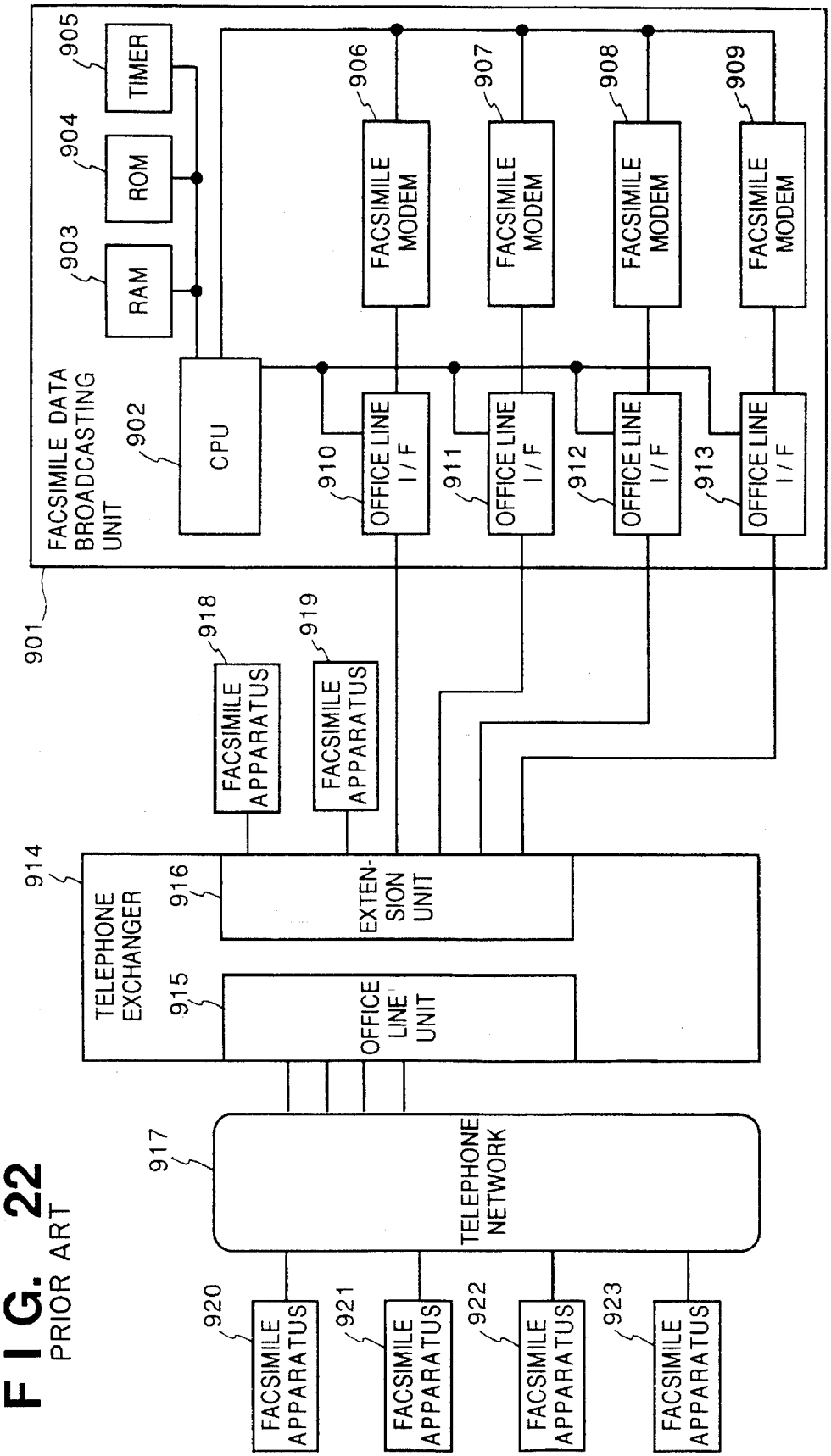
FIG. 22 is a block diagram showing an arrangement of a conventional system for broadcasting image data to a plurality of facsimile apparatuses.
Figure 23:
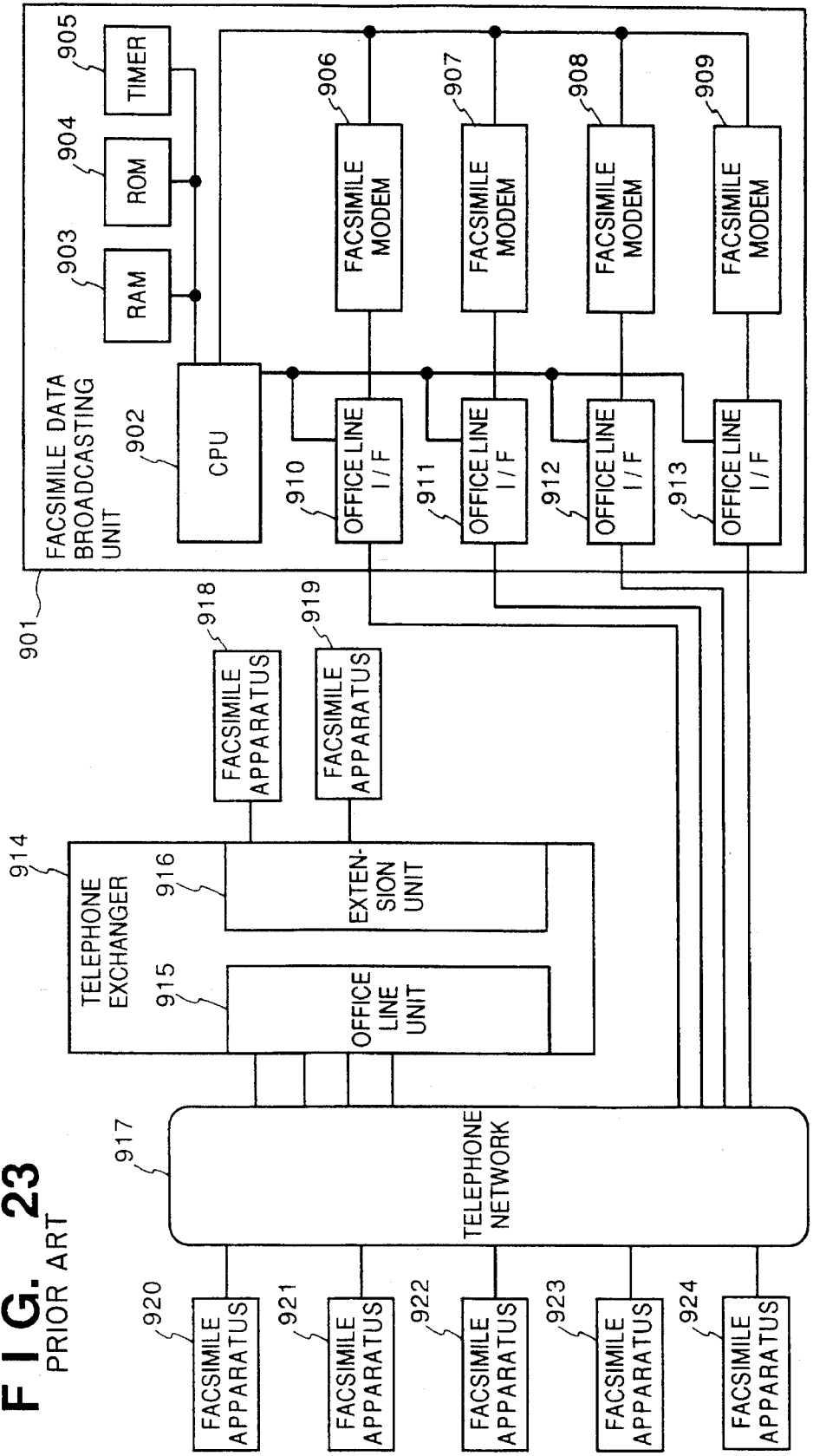
FIG. 23 is a block diagram showing an arrangement of another conventional system for broadcasting image data to a plurality of facsimile apparatuses.
Figure 24:
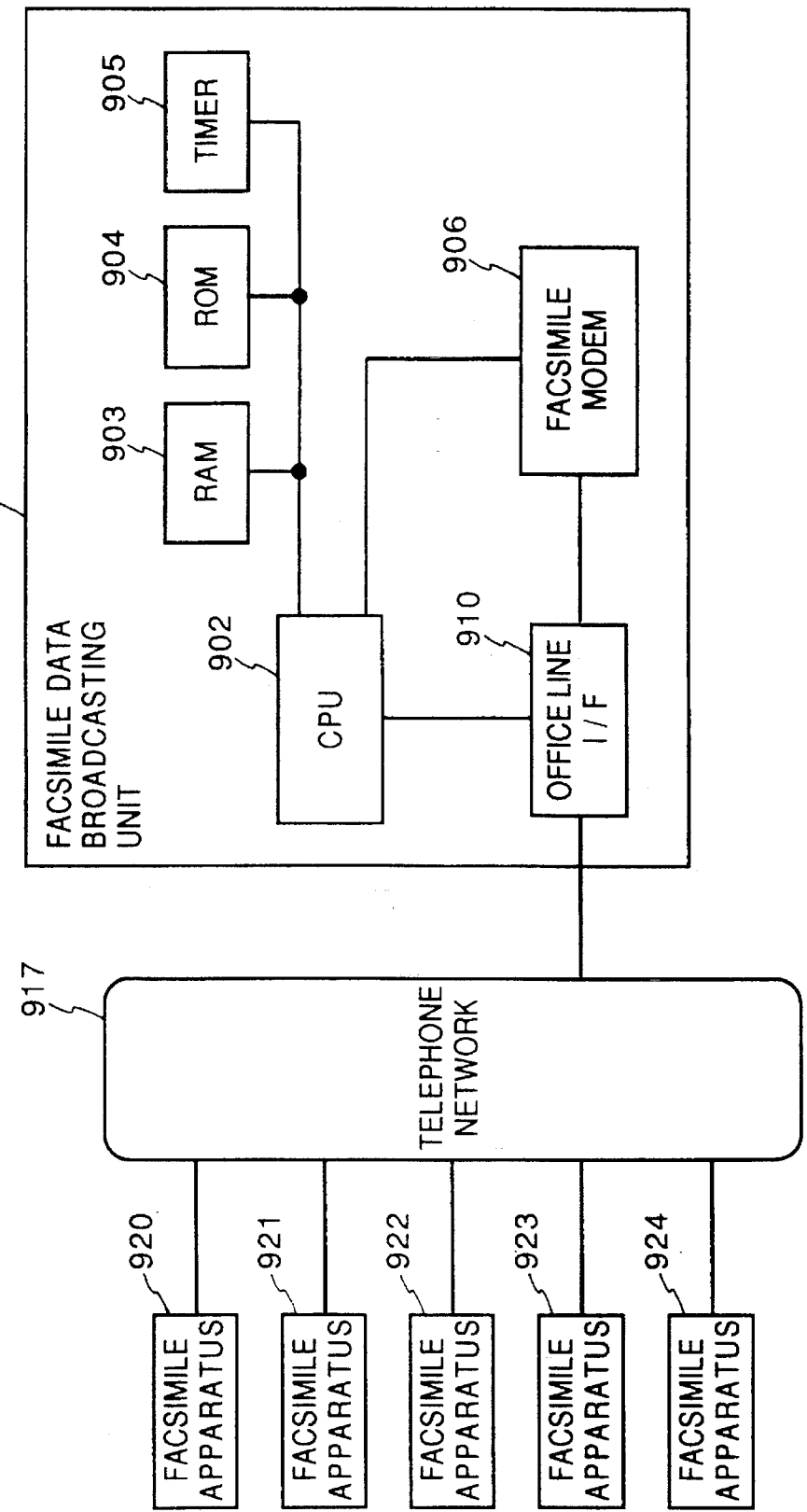
FIG. 24 is a block diagram showing an arrangement of a conventional facsimile data broadcasting apparatus.

In the processing shown in the flow chart of FIG. 21, in step S1201, the same processing as in steps S301, S1102 to S1103, S306 to S308, S1107, and S310 is executed. In step S1202, the same processing as in steps S1109, S312 to S318, and S1117 is executed.

In step S1203, the same processing as in step S312 to S317 is executed. Thereafter, in step S1204, it is checked if an effective line from which a CFR signal is not received remains. If CFR signals are received from all the effective lines, the flow advances to step S1205 to execute processing in steps S1123 and subsequent steps, as has already been described in the tenth embodiment. Conversely, if it is determined that an effective line from which a CFR signal is not received remains, the flow advances to step S503 to check if FTT signals are detected from all the effective lines in the processing so far. If it is determined that an FTT signal is not received from at least one of the effective lines, the line from which a CFR signal is not received is disconnected in step S325. In contrast to this, if FTT signals are detected from all the effective lines, the flow advances to step S510.

In steps S510 and S511, the fallback operation of modem training described in the flow chart of FIG. 8 is performed. If it is determined in step S510 that the fallback operation of modem training cannot be continued, the flow advances to step S1206 to execute processing in step S341 and subsequent steps described in the tenth embodiment.

In this manner, when all the effective lines are under the same condition, the communication rate of modem training may be fallen back. Therefore, since signals can be re-transmitted by the fallback operation without interrupting a facsimile communication, the overall communication time can be shortened, and communication cost can be reduced.

In the first to seventh embodiments, as shown in FIGS. 1, 3, 5, 7, 9, 11, and 13, all the facsimile apparatuses 25 to 28 as broadcasting destinations are connected to the telephone network. However, the present invention is not limited to this. For example, facsimile apparatuses such as the facsimile apparatuses 23 and 24 connected to the extension unit of the telephone exchange apparatus 1 may be designated as broadcasting destinations.

In the first to tenth embodiments, image data to be broadcasted has an amount corresponding to one page. However, the present invention is not limited to this. For example, image data for a plurality of pages can be broadcasted according to the G3 protocol.

In the first to tenth embodiments, a facsimile communication is executed according to the G3 protocol. However, the present invention is not limited to this. If the facsimile modem, control data communication modems, and facsimile communication procedure are changed, the present invention can be applied to a communication according to another facsimile communication procedure, e.g., the G4 protocol.

In the first to seventh embodiments, a case has been described wherein image data is received from a facsimile apparatus connected to the telephone exchange apparatus, and is broadcasted to other facsimile apparatuses via the telephone network. In the eighth to tenth embodiments, a case has been described wherein image data is transmitted from a single facsimile apparatus to the facsimile data broadcasting apparatus, and the facsimile data broadcasting apparatus broadcasts the image data to a plurality of other facsimile apparatuses. However, the present invention is not limited to these applications. For example, the broadcasting unit 9 or the facsimile data broadcasting apparatus 100 may comprise an image scanner, and image data to be broadcasted may be obtained from the scanner. Alternatively, the broadcasting unit 9 or the facsimile data broadcasting apparatus 100 may comprise a floppy disk drive, a CD-ROM drive, or a hard disk drive so that image data to be broadcasted is pre-stored in the unit 9 or the apparatus 100.

In the first to tenth embodiments, the number of facsimile apparatuses as broadcasting destinations is 4, the number of V.21 modems is 4, and the number of V.21 demodulators is 2 or 4. However, the present invention is not limited to these, and the numbers of these apparatuses and devices may be changed.

In the first to tenth embodiments, the facsimile apparatuses as broadcasting destinations and the telephone exchange apparatus or the facsimile data broadcasting apparatus are line-connected via the (public) telephone network. However, the present invention is not limited to this. For example, these apparatuses may be connected to a private network controlled by a PBX.

In facsimile communications of the fifth to seventh embodiments, completion of modem training or completion of image data transmission is confirmed by checking reception of CFR or MCF signals according to the G3 protocol. However, the present invention is not limited to this. For example, the facsimile concurrent broadcasting operation may be performed by identifying other control signals, e.g., an FTT signal, a DTC signal, an RTP signal, an RTN signal, and the like. For example, reception of FTT signals from all the effective lines may be checked to fall back the communication rate as in FIG. 8 so as to retry modem training.

After the facsimile data broadcasting communication processing by executing time-divisional line exchange processing using the time switch as in the fifth to seventh embodiments, and after the facsimile data broadcasting communication processing as in the eighth to tenth embodiments, when image data is re-transmitted to a facsimile apparatus as a broadcasting destination to which the facsimile data broadcasting communication cannot be normally executed, in particular, when data is re-transmitted to the facsimile apparatus as a broadcasting destination for which the facsimile communication is interrupted by disconnecting the communication line due to a modem training error, and when data is re-transmitted to a facsimile apparatus as a broadcasting destination to which image data cannot be normally transmitted although the image data is transmitted from the broadcasting apparatus, the communication rate may be fallen back to execute the re-transmission processing as described in the fourth embodiment.

The present invention can be applied to a system constituted by a plurality of devices, or to an apparatus comprising a single device.

Furthermore, it goes without saying that the invention is applicable also to a case where the object of the present invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A facsimile broadcasting method comprising:
   a first step of connecting a plurality of lines to a plurality of facsimile procedure signal communication units; and
   a second step of connecting the plurality of lines to a single facsimile image signal communication unit, so that a facsimile image signal is concurrently broadcast by the single facsimile image signal communication unit via the plurality of lines when the plurality of facsimile procedure signal communication units communicate with a plurality of destination stations using a facsimile procedure signal.

2. The method according to claim 1, further comprising the step of disconnecting one of the lines on which normal communication is not being performed.

3. The method according to claim 1, further comprising the step of re-transmitting the facsimile image signal at a lower communication rate than a normal communication rate over a line which has failed to perform normal communication at the normal communication rate.

4. The method according to claim 1, further comprising the step of determining a successful communication rate to avoid unsuccessful communication termination in accordance with a condition of the plurality of lines.

5. The method according to claim 1, wherein the single facsimile image signal communication unit modulates facsimile image data.

6. A telephone exchange apparatus integrating a facsimile broadcast communication facility, comprising:
   facsimile data communication means for transmitting/receiving image data as facsimile data;
   line connection means for connecting said apparatus to a plurality of extension and office lines;
   exchange means, connected to said facsimile data communication means via a single connection line, for exchanging data between said facsimile data transmission means and the extension and office lines through said line connection means by performing time-divisional exchange control; and
   control means for sending control signals to said facsimile data communication means and said exchange means via a connection line other than said single connection line, wherein said facsimile data communication means receives the image data from one of the extension lines and broadcasts the received image data to the office lines concurrently through said exchange means by time-divisional exchange control.

7. The apparatus according to claim 6, wherein said facsimile data communication means includes a single facsimile modem used for communicating both image data and facsimile procedure signals, and a plurality of other modems used for communicating facsimile procedure signals.

8. The apparatus according to claim 7, wherein said single connection line and said connection line other than said single connection line constitute a plurality of connection lines, the apparatus further comprising:
   a plurality of first switching means for switching connections between said single facsimile modem and the plurality of connection lines and connections between said plurality of other modems and the plurality of connection lines,
   wherein said control means is operative for, when image data is broadcast, controlling said plurality of first switching means to switch connections between the plurality of connection lines and said facsimile modem or said plurality of other modems so as to use said plurality of other modems for facsimile procedure signals in transmission/reception of facsimile procedure signals, and to use said facsimile modem in broadcasting the image data.

9. The apparatus according to claim 7, wherein when the image data is broadcast, said telephone exchange apparatus is controlled using a line exchange facility thereof to use said plurality of other modems in transmission/reception of facsimile procedure signals and to use said facsimile modem in broadcasting of the image data.

10. The apparatus according to claim 6, wherein said facsimile data communication means includes a single facsimile modem used for communicating both image data and facsimile procedure signals, and a plurality of demodulators used for receiving facsimile procedure signals.

11. The apparatus according to claim 10, wherein said single connection line and said connection line other then said single connection line constitute a plurality of connection lines, the apparatus further comprising:
   a plurality of first switching means for switching connections between said single facsimile modem and the plurality of connection lines and connections between said plurality of demodulators and the plurality of connection lines, wherein said control means is operative for, when image data broadcast, controlling said plurality of first switching means to switch connections between the plurality of connection lines and said facsimile modem or said plurality of demodulators so as to use said plurality of demodulators in reception of facsimile procedure signals, and to use said facsimile modem in transmission of facsimile procedure signals and in broadcasting the image data.

12. The apparatus according to claim 11, further comprising:

a plurality of second switching means for switching connection between said plurality of demodulators and said plurality of first switching means, wherein a number of said plurality of demodulators is less than a number of destination facsimile apparatuses operating as concurrent broadcasting destinations, and wherein, when facsimile procedure signals are received from the destination facsimile apparatuses, said control means controls said plurality of second switching means to cause said plurality of demodulators to sequentially receive the facsimile procedure signals.

13. The apparatus according to claim 10, wherein when the image data is broadcast, said telephone exchange apparatus is controlled using a line exchange facility thereof to use said plurality of demodulators in reception of facsimile procedure signals and to use said facsimile modem in transmission of the facsimile procedure signals and broadcasting of the image data.

14. The apparatus according to claim 13, wherein a number of said plurality of demodulators is less than a number of destination facsimile apparatuses operating as concurrent broadcasting destinations, and wherein when the image data is broadcast, said control means controls said plurality of demodulators using the line exchange facility of said telephone exchange apparatus to sequentially receive facsimile procedure signals from the destination facsimile apparatuses.

15. The apparatus according to claim 1, further comprising:

line disconnection means for monitoring an operation condition of said facsimile data communication means, and for, when normal communication cannot be performed over one of said office and extension lines, disconnecting the one of said office and extension lines over which normal communication cannot be performed.

16. The apparatus according to claim 15, further comprising:

re-transmission means for monitoring an operation condition of said facsimile data communication means, and for, when said facsimile data communication means cannot perform normal communication with a connected destination facsimile apparatus, re-transmitting the image data to the destination facsimile apparatus at a lowered communication rate.

17. The apparatus according to claim 16, wherein when re-transmission of the image data cannot be normally performed by said re-transmission means, the image data is re-transmitted at a still lowered communication rate.

18. The apparatus according to claim 6, further comprising:

fallback transmission means for monitoring an operation condition of said facsimile data communication means, and for, when said fallback transmission means determines before transmission of the image data that normal communication cannot be performed for all lines used in broadcasting under same transmission conditions, transmitting the image data at a communication rate which is lowered in advance.

19. A facsimile data broadcasting apparatus comprising:

reception means for receiving image data transmitted from a facsimile apparatus;

storage means for storing the image data;

facsimile data communication means for transmitting/receiving the image data as facsimile data;

line connection means for concurrently connecting a plurality of lines; and concurrent broadcasting means for concurrently broadcasting the image data to a plurality of facsimile apparatuses different from said facsimile apparatus using the plurality of lines by sharing said facsimile data communication means, wherein said facsimile data communication means includes a single facsimile modem for communicating both image data and facsimile procedure signals, and a plurality of other modems for communicating facsimile procedure signals.

20. The apparatus according to claim 19, further comprising:

a plurality of first switching means for switching connections between said single facsimile modem and the plurality of lines and connections between said plurality of other modems and the plurality of lines; and control means for, when the image data is broadcast, controlling said plurality of first switching means to switch connections between the plurality of lines and said facsimile modem or said plurality of other modems so as to use said plurality of other modems in transmission/reception of facsimile procedure signals, and to use said facsimile modem in broadcasting the image data.

21. The apparatus according to claim 19, further comprising:

line disconnection means for monitoring an operation condition of said facsimile data communication means, and for, when normal communication cannot be performed over one of said lines, disconnecting the line over which the normal communication cannot be performed.

22. The apparatus according to claim 21, further comprising:

re-transmission means for monitoring an operation condition of said facsimile data communication means, and for, when said facsimile data communication means cannot perform normal communication with a connected destination facsimile apparatus, re-transmitting the image data to the destination facsimile apparatus at a lowered communication rate.

23. The apparatus according to claim 22, wherein when re-transmission of the image data cannot be normally performed by said re-transmission means, the image data is re-transmitted at a still lowered communication rate.

24. The apparatus according to claim 19, further comprising:

fallback transmission means for monitoring an operation condition of said facsimile data communication means, and for, when said fallback transmission means determines before transmission of the image data that normal communication cannot be performed for all lines used in broadcasting under same operation conditions, transmitting the image data at a communication rate which is lowered in advance.

25. A facsimile data broadcasting apparatus comprising:

reception means for receiving image data transmitted from a facsimile apparatus;

storage means for storing the image data;

facsimile data communication means for transmitting/ receiving the image data as facsimile data;

line connection means for concurrently connecting a plurality of lines; and concurrent broadcasting means for concurrently broadcasting the image data to a plurality of facsimile apparatuses different from said facsimile apparatus using the plurality of lines by sharing said facsimile data communication means, wherein said facsimile data communication means includes a single facsimile modem for communicating both image data and facsimile procedure signals, and a plurality of demodulators for receiving facsimile procedure signals.

26. The apparatus according to claim 26, further comprising:

a plurality of first switching means for switching connections between said single facsimile modem and the plurality of lines and connections between said plurality of demodulators and the plurality of lines; and control means for, when the image data is broadcast, controlling said plurality of first switching means to switch connections between the plurality of lines and said facsimile modem or said plurality of demodulators so as to use said plurality of demodulators in reception of facsimile procedure signals, and to use said facsimile modem in transmission of facsimile procedure signals in broadcasting the image data.

27. A facsimile data broadcasting apparatus comprising:

reception means for receiving image data transmitted from a facsimile apparatus;

storage means for storing the image data;

facsimile data communication means for transmitting/ receiving the image data as facsimile data;

line connection means for concurrently connecting a plurality of lines;

concurrent broadcasting means for concurrently broadcasting the image data to a plurality of facsimile apparatuses different from said facsimile apparatus using the plurality of lines by sharing said facsimile data communication means, wherein said facsimile data communication means includes a single facsimile modem for communicating both image data and facsimile procedure signals, and a plurality of demodulators for receiving facsimile procedure signals;

a plurality of first switching means for switching connections between said single facsimile modem and the plurality of lines and connections between said plurality of demodulators and the plurality of lines;

control means for, when the image data is broadcast, controlling said plurality of first switching means to switch connections between the plurality of lines and said facsimile modem or said plurality of demodulators so as to use said plurality of demodulators in reception of facsimile procedure signals, and to use said facsimile modem in transmission of facsimile procedure signals in broadcasting the image data; and a plurality of second switching means for switching connection between said plurality of demodulators and said plurality of first switching means, wherein a number of said plurality of demodulators is less than a number of destination facsimile apparatuses operating as concurrent broadcasting destinations, and wherein, when facsimile procedure signals are received from the destination facsimile apparatuses, said control means controls said plurality of second switching means to cause said plurality of demodulators to sequentially receive the facsimile procedure signals.

28. A facsimile broadcasting method comprising:

a first step of connecting a plurality of lines to a plurality of facsimile procedure signal communication units; and a second step of connecting the plurality of lines to a single facsimile image signal communication unit, so that a facsimile image signal is concurrently broadcast by the single facsimile image signal communication unit via the plurality of lines when the plurality of facsimile procedure signal communication units communicate with a plurality of destination stations using a facsimile procedure signal, wherein when a number of the plurality of facsimile procedure signal communication units is less than a number of the plurality of lines, the plurality of facsimile procedure signal communication units are connected to communicate with the plurality of destination stations, using the facsimile procedure signal, by switching over a connected line to each facsimile procedure signal communication unit sequentially.

29. A data broadcasting method, comprising:

a first step of connecting a plurality of lines to a plurality of procedure signal communication units; and a second step of connecting the plurality of lines to a single information signal communication unit, so that an information signal is concurrently broadcast by the single information signal communication unit via the plurality of lines when the plurality of procedure signal communication units communicates with a plurality of destination stations using a procedure signal, wherein a number of the plurality of procedure signal communication units is less than a number of the plurality of lines, the plurality of procedure signal communication units are connected to communicate with the plurality of destination stations, using the procedure signal by switching over a connected line to each procedure signal communication unit sequentially.

30. The method according to claim 29, further comprising the step of disconnecting one of the lines on which normal communication is not being performed.

31. The method according to claim 29, further comprising the step of re-transmitting the information signal at a lower communication rate than a normal communication rate over a line which has failed to perform normal transmission at the normal communication rate.

32. The method according to claim 29, further comprising the step of determining a communication rate to avoid unsuccessful communication termination in accordance with a condition of the plurality of lines.

33. The method according to claim 29, wherein the single information signal communication unit modulates information data.

34. The method according to claim 29, wherein the procedure signal includes a facsimile procedure signal.

35. The method according to claim 29, wherein the information signal includes a facsimile image signal.

* * * * *

UNITED STATES PATENT AND TRADEMARK OFFICE
CERTIFICATE OF CORRECTION

PATENT NO. : 5,524,048

DATED : June 4, 1996

INVENTOR : ISAMU OZAWA

It is certified that error appears in the above-identified patent and that said Letters Patent is hereby corrected as shown below:

COLUMN 26

Line 16, "line 60" should read --line 6.--.

COLUMN 36

Line 63, "then" should read --than--.

COLUMN 37

Line 5, "data" should read --data is--;
  Line 40, "claim 1," should read --claim 6,--.

Signed and Sealed this

Twenty-fourth Day of September, 1996

Attest:

BRUCE LEHMAN

*Attesting Officer*      *Commissioner of Patents and Trademarks*